US012769362B2

(12) United States Patent
Connor

(10) Patent No.: US 12,769,362 B2
(45) Date of Patent: Oct. 20, 2026

(54) SMART WATCH WITH A CAMERA

(71) Applicant: Robert A. Connor, Wyoming, MN (US)

(72) Inventor: Robert A. Connor, Wyoming, MN (US)

(73) Assignee: Medibotics LLC, Ham Lake, MN (US)

( * ) Notice: Subject to any disclaimer, the term of this patent is extended or adjusted under 35 U.S.C. 154(b) by 0 days.

(21) Appl. No.: 19/097,640

(22) Filed: Apr. 1, 2025

(65) Prior Publication Data

US 2025/0231588 A1 Jul. 17, 2025

Related U.S. Application Data

(63) Continuation-in-part of application No. 18/888,099, filed on Sep. 17, 2024, which is a continuation-in-part of application No. 18/226,213, filed on Jul. 25, 2023, now Pat. No. 12,346,156, which is a continuation-in-part of application No. 17/871,952, filed on Jul. 24, 2022, now Pat. No. 11,747,769, which is a continuation-in-part of application No. 17/515,509, filed on Oct. 31, 2021, now abandoned, which is a continuation-in-part of application No. 16/926,748, filed on Jul. 12, 2020, now abandoned, said application No. 17/871,952 is a continuation-in-part of application No. 16/926,748, filed on Jul. 12, 2020, now abandoned, and a continuation-in-part of application No. 16/819,147, filed on Mar. 15, 2020, now Pat. No. 11,429,151.

(60) Provisional application No. 62/882,560, filed on Aug. 4, 2019, provisional application No. 62/876,213, filed on Jul. 19, 2019.

(51) Int. Cl.
*G06F 1/16* (2006.01)

(52) U.S. Cl.
CPC ............ *G06F 1/163* (2013.01); *G06F 1/1652* (2013.01); *G06F 1/1686* (2013.01)

(58) Field of Classification Search
CPC .... G06F 1/1647; G06F 1/1624; G06F 1/1652; G06F 1/1686; G06F 1/3265; G06F 1/1616; G06F 1/1649; G06F 3/041; G06F 1/163; G06F 2200/1614; G06F 2200/1637; G04G 17/00; G04G 21/00; G04G 17/045; G04G 17/08; G04G 17/083; G04G 21/02; A61B 5/7445; A61B 5/681; A61B 5/0075; A61B 5/053; A61B 2562/0219; A61B 5/1123; A61B 5/1118; A61B 2560/0242; A61B 5/1121
See application file for complete search history.

(56) References Cited

U.S. PATENT DOCUMENTS 7,558,057 B1 * 7/2009 Naksen ................ G06F 1/1613 361/679.56
8,279,716 B1 10/2012 Gossweiler et al.
(Continued)

*Primary Examiner* — Yaron Cohen

(57) ABSTRACT

Disclosed herein are wrist-worn devices with a camera which enable a person to record images of food or environmental scenes without contorting their arm. Devices can allow a camera to be moved independently from the rest of the device. A camera can be on a flip-up display with features which decrease the chances of the display snagging on an object and breaking off. A camera can be on the rim of an enclosure held on the dorsal side of a wrist with a bifurcating band, so that the band does not block the camera's view.

5 Claims, 11 Drawing Sheets

(56) References Cited

U.S. PATENT DOCUMENTS

| | | | |
|---|---|---|---|
| 8,379,488 | B1 | 2/2013 | Gossweiler et al. |
| 8,725,842 | B1 | 5/2014 | Al-Nasser |
| 8,902,714 | B2 | 12/2014 | Gossweiler et al. |
| 8,994,827 | B2 | 3/2015 | Mistry et al. |
| 9,030,446 | B2 | 5/2015 | Mistry et al. |
| 9,477,313 | B2 | 10/2016 | Mistry et al. |
| 9,740,904 | B2 | 8/2017 | Wang et al. |
| 9,740,906 | B2 | 8/2017 | Al-Nasser et al. |
| 10,331,083 | B1 | 6/2019 | Ness et al. |
| 11,287,779 | B2 | 3/2022 | Spencer et al. |
| 11,347,189 | B1 | 5/2022 | Herrera et al. |
| 11,571,048 | B1 | 2/2023 | Herrera |
| 12,127,641 | B1 | 10/2024 | Herrera |
| 2001/0017663 | A1 | 8/2001 | Yamaguchi et al. |
| 2013/0163390 | A1* | 6/2013 | Gossweiler, III ............ H04M 1/72436 368/10 |
| 2015/0241916 | A1 | 8/2015 | Choi et al. |
| 2017/0188668 | A1 | 7/2017 | Watterson et al. |
| 2018/0020193 | A1 | 1/2018 | Blum et al. |
| 2018/0063433 | A1 | 3/2018 | Blum et al. |
| 2018/0364557 | A1 | 12/2018 | Park et al. |
| 2019/0146550 | A1 | 5/2019 | Berardinelli |
| 2020/0012324 | A1 | 1/2020 | Sung et al. |
| 2020/0042037 | A1 | 2/2020 | Sun |
| 2020/0073336 | A1 | 3/2020 | Seo et al. |
| 2021/0333759 | A1 | 10/2021 | Vasavada et al. |
| 2022/0006924 | A1 | 1/2022 | Woodman et al. |
| 2023/0004129 | A1 | 1/2023 | Ershov et al. |

* cited by examiner

Fig. 3
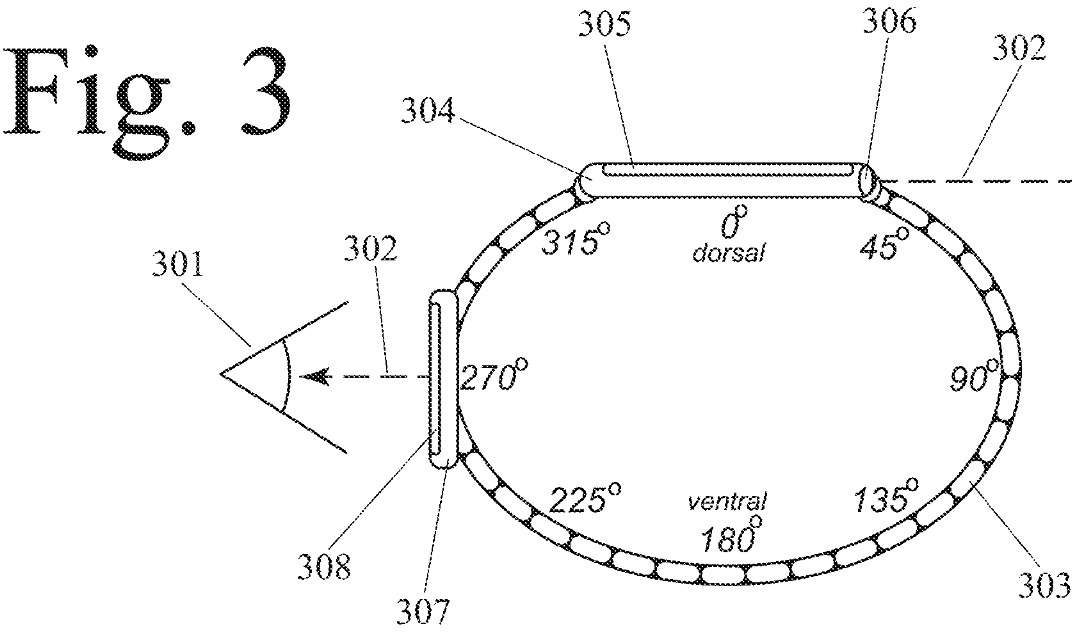
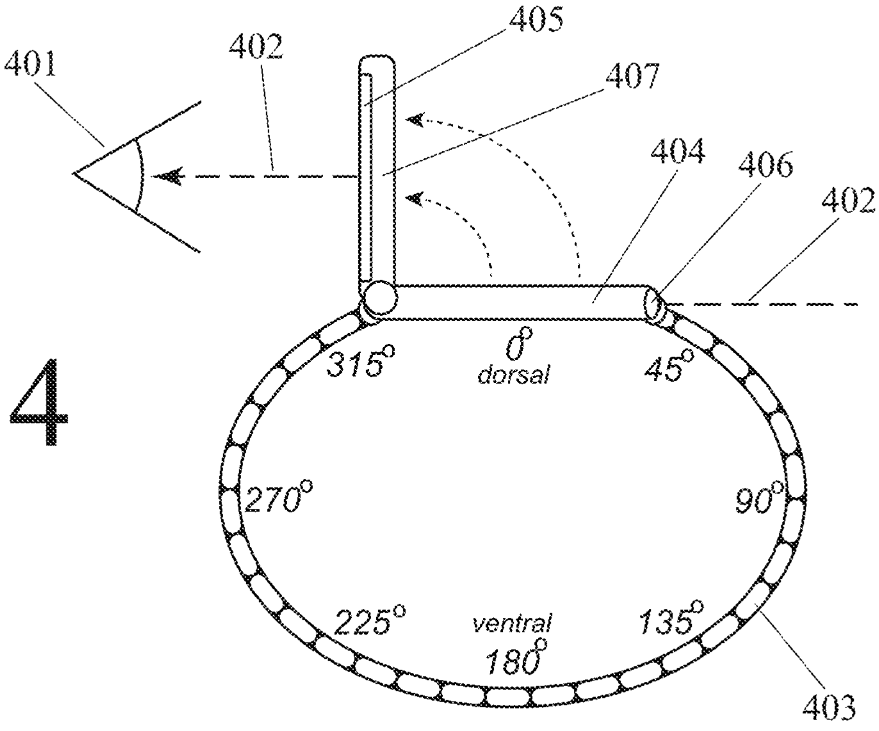
Fig. 4

SMART WATCH WITH A CAMERA

CROSS-REFERENCE TO RELATED APPLICATIONS

This application is a continuation in part of U.S. patent application Ser. No. 18/888,099 filed on 2024 Sep. 17. U.S. patent application Ser. No. 18/888,099 was a continuation in part of U.S. patent application Ser. No. 18/226,213 filed on 2023 Jul. 25. U.S. patent application Ser. No. 18/226,213 was a continuation in part of U.S. patent application Ser. No. 17/871,952 filed on 2022 Jul. 24 which issued as U.S. Pat. No. 11,747,769 on 2023 Jul. 5. U.S. patent application Ser. No. 17/871,952 was a continuation in part of U.S. patent application Ser. No. 17/515,509 filed on 2021 Oct. 31. U.S. patent application Ser. No. 17/871,952 was a continuation in part of U.S. patent application Ser. No. 16/926,748 filed on 2020 Jul. 12. U.S. patent application Ser. No. 17/871,952 was a continuation in part of U.S. patent application Ser. No. 16/819,147 filed on 2020 Mar. 15 which issued as U.S. Pat. No. 11,429,151 on 2022 Aug. 30. U.S. patent application Ser. No. 17/515,509 was a continuation in part of U.S. patent application Ser. No. 16/926,748 filed on 2020 Jul. 12. U.S. patent application Ser. No. 16/926,748 claimed the priority benefit of U.S. provisional patent application 62/876,213 filed on 2019 Jul. 19. U.S. patent application Ser. No. 16/819,147 claimed the priority benefit of U.S. provisional patent application 62/882,560 filed on 2019 Aug. 4. The entire contents of these applications are incorporated herein by reference.

FEDERALLY SPONSORED RESEARCH

Not Applicable

SEQUENCE LISTING OR PROGRAM

Not Applicable

BACKGROUND

Field of Invention

This invention relates to wrist-worn electronic devices.

INTRODUCTION

There are many applications for a camera on a wrist-worn device (e.g. smart watch). For example, the wrist can be a good location from which to record close-up images of food for monitoring nutritional intake. More generally, a wrist-worn device can enable image recording at times when it is inconvenient to carry a smart phone.

However, current wrist-worn devices (such as smart watches) were not designed to record images and there are challenges concerning where to locate a camera on a wrist-worn device. If one embeds a camera in a conventional display of a smart watch located on the dorsal side of a wrist and/or arm, then the camera may work for selfies but one would have to contort their arm to record images of nearby food. Also, to record images of environmental scenes, it is tough to see the display when the camera is pointed outward toward an environmental scene. Disclosed herein are novel devices which enable people to record images of food and environmental scenes from a camera on a wrist-worn device (e.g. smart watch) without having to contort their arm.

REVIEW OF THE RELEVANT ART

U.S. patent application publication 20010017663 (Yamaguchi et al., Aug. 30, 2001, "Portable Image Capturing Device") discloses a wrist-worn device in which a camera and an optical communication component are near to each other and in parallel. U.S. Pat. No. 8,279,716 (Gossweiler et al., Oct. 2, 2012, "Smart-Watch Including Flip Up Display"), U.S. Pat. No. 8,379,488 (Gossweiler et al., Feb. 19, 2013, "Smart-Watch Including Flip Up Display"), application publication 20130163390 (Gossweiler et al., Jun. 27, 2013, "Smart-Watch Including Flip Up Display"), and U.S. Pat. No. 8,902,714 (Gossweiler et al., Dec. 2, 2014, "Smart-Watch Including Flip Up Display") disclose a smart watch with a wristband, a base, and a flip up portion. U.S. Pat. No. 8,725,842 (Al-Nasser, May 13, 2014, "Smart Watch") discloses a smart watch with a band, a camera, a motion sensor, a display, a network unit, and a control unit.

U.S. Pat. No. 8,994,827 (Mistry et al., Mar. 31, 2015, "Wearable Electronic Device") discloses a device with a band and an image-capturing optical sensor. U.S. Pat. No. 9,030,446 (Mistry et al., May 12, 2015, "Placement of Optical Sensor on Wearable Electronic Device") a wearable device with an optical sensor so that an image of an object displayed on a touch-sensitive display is viewable while the object is also viewable without the wearable device blocking a view of the object. U.S. Pat. No. 9,477,313 (Mistry et al., Oct. 25, 2016, "User Gesture Input to Wearable Electronic Device Involving Outward-Facing Sensor of Device") discloses a wearable apparatus includes a sensor which arm movement and recognizes gestures.

U.S. patent application publication 20150241916 (Choi et al., Aug. 27, 2015, "Wearable Devices") discloses a wearable device with a camera module on an upper side. U.S. patent application publication 20170188668 (Watterson et al., Jul. 6, 2017, "Smart Watch Band") discloses a wrist band with a display and at least one replaceable module. U.S. Pat. No. 9,740,904 (Wang et al., Aug. 22, 2017, "Method of Using Camera Sensor Interface to Transfer Multiple Channels of Scan Data Using an Image Format") discloses a laser scanner and a camera sensor interface. U.S. Pat. No. 9,740,906 (Al-Nasser et al., Aug. 22, 2017, "Wearable Device") discloses a wearable device with a display and a barcode (or RFID) reader.

U.S. patent application publication 20180020193 (Blum et al., Jan. 18, 2018, "Wearable Band") discloses an electronic wearable device with a band and a camera assembly. U.S. patent application publication 20180063433 (Blum et al., Mar. 1, 2018, "Wearable Camera System") discloses a wearable camera system with a mobile charging unit. U.S. patent application publication 20180364557 (Park et al., Dec. 20, 2018, "Smart Watch and Method for Controlling Same") discloses a smart watch with a camera. U.S. patent application publication 20190146550 (Berardinelli, May 16, 2019, "Smartwatch Device and Method") discloses a smartwatch with an audio device and a motion sensor. U.S. Pat. No. 10,331,083 (Ness et al., Jun. 25, 2019, "Watch Band With Optical Sensor") discloses a camera at a distal end of a band that attaches a watch body to a user's wrist.

U.S. patent application publication 20200012324 (Sung et al., Jan. 9, 2020, "Electronic Device and Method for Changing Location of Preview Image According to Direction of Camera") discloses an electronic device including a first housing including a first face and a second face, a second housing including a third face and a fourth face, a folding part rotatably connecting the first housing and the second housing, a flexible display disposed on the first face and the third face, and a camera exposed through at least a portion of the fourth face. U.S. patent application publication 20200042037 (Sun, Feb. 6, 2020, "Wearable Display Device") discloses a wearable display with a flexible screen. U.S. patent application publication 20200073336 (Seo et al., Mar. 5, 2020, "Electronic Device for Controlling Watch Face of Smart Watch and Operation Method Therefor") discloses an electronic device with a camera module, a communication module, and a processor.

U.S. patent application publication 20210333759 (Vasavada et al., Oct. 28, 2021, "Split Architecture for a Wristband System and Related Devices and Methods") discloses a watch band, a watch body comprising at least one image sensor configured to capture a wide-angle image, a coupling mechanism configured to detachably couple the watch body to the watch band, and at least one biometric sensor. U.S. patent application publication 20220006924 (Woodman et al., Jan. 6, 2022, "Remote Image Capture and Mounting Ecosystem") discloses a system including an imaging device. U.S. Pat. No. 11,287,779 (Spencer et al., Mar. 29, 2022, "Modular System for Watch") discloses wearable electronic devices, such as watches, that are part of a modular system that provides a variety of different components and functions.

U.S. Pat. No. 11,347,189 (Herrera et al., May 31, 2022, "Watch Having a Camera") discloses a watch having a camera, wherein the camera can be on the back of a housing. U.S. Pat. No. 11,571,048 (Herrera, Feb. 7, 2023, "Watch Having a Release Mechanism") and U.S. Pat. No. 12,127,641 (Herrera, Oct. 29, 2024, "Watch Having a Release Mechanism") disclose a watch band having a first strap segment, a second strap segment, a nest portion secured between the first strap segment and the second strap segment, and an opening extending through the nest portion. U.S. patent application publication 20230004129 (Ershov et al., Jan. 5, 2023, "Watch With Band Device") discloses wearable electronic devices, such as watches, wherein a watch body and a band device can be used together or independently.

SUMMARY OF THE INVENTION

Disclosed herein are wrist-worn devices with a camera which enable a person to record images of food or environmental scenes without requiring the person to contort their arm in uncomfortable ways. In an example, a device can include a mechanism which allows the camera to be moved independently from the rest of the device. In an example, a camera can be on a flip-up display on the dorsal side of a wrist, preferably with a design which decreases the chances of the flip-up display snagging on an environmental object and breaking. In an example, a camera can be on the rim of a dorsal-side enclosure, preferably with a design in which the enclosure does not protrude too far out from the wrist and yet a watch band does not block the view of the camera. In another example, a camera can be slid around a circumferential track on a band to different locations on the circumference of the wrist.

BRIEF INTRODUCTION TO THE FIGURES

FIG. 3 shows a cross-sectional view of a wrist-worn device (e.g. smart watch) with a dorsal display, a dorsal camera on the rim of an enclosure, and a lateral display.

FIG. 4 shows a cross-sectional view of a wrist-worn device (e.g. smart watch) with a dorsal flip-up display and a dorsal camera on the rim of an enclosure.

DETAILED DESCRIPTION OF THE FIGURES

Figure 1:
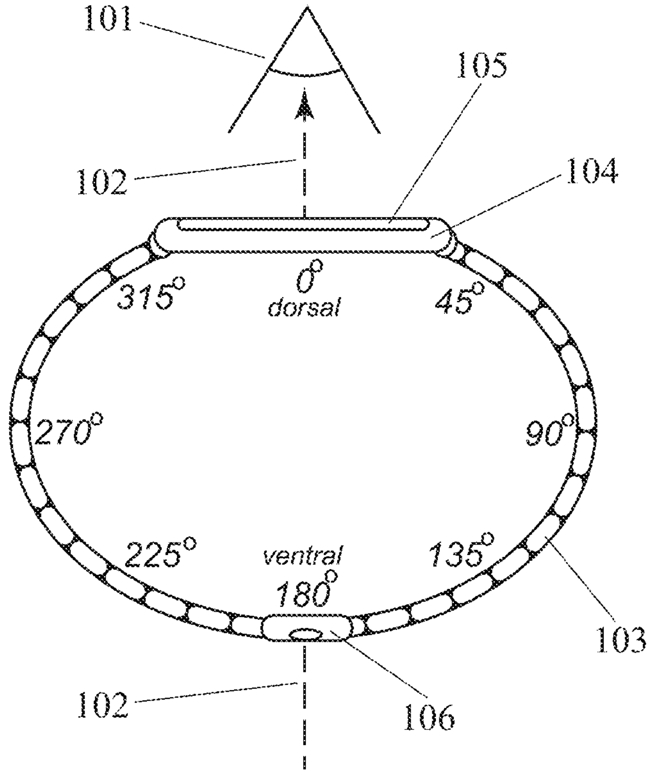
FIG. 1 shows a cross-sectional view of a wrist-worn device (e.g. smart watch) with a dorsal display and a ventral camera.

Before discussing the specific embodiments of this invention which are shown in FIGS. 1 through 24, this disclosure provides an introductory section which covers the general concepts, components, and methods which comprise this invention. Where relevant, these concepts, components, and methods can be applied as variations to the examples shown in FIGS. 1 through 24 which are discussed afterwards.

In an example, a wrist-worn device (e.g. smart watch) with a camera can comprise: an arcuate band which is worn on a person's wrist and/or arm; an enclosure which is held on a dorsal side of the person's wrist and/or arm by the band; a display on the enclosure; and a camera which is held on a ventral side of the person's wrist and/or arm by the band. In an example, the device can be a smart watch and the band can be a watch band. In an example, images recorded by the camera can be shown on the display. In another example, images recorded by the camera can be shown on a display via (augmented reality) eyewear. In an example, the device can further comprise a second camera located between the 45-degree and 135-degree coordinates of the circumference of the wrist and/or arm. In an example, the device can further comprise a second display located between the 225-degree and 315-degree coordinates of the circumference of the wrist and/or arm.

In an example, a wrist-worn device (e.g. smart watch) with a camera can comprise: an arcuate band which is worn on a person's wrist and/or arm; an enclosure which is held on a dorsal side of the person's wrist and/or arm by the band, wherein the enclosure further comprises a first section and a second section, wherein the enclosure has a first configuration in which the center of the second section is a first distance from the band, wherein the enclosure has a second configuration in which the center of the second section is a second distance from the band, and wherein the second distance is greater than the first distance; a display on the second section; and a camera on the second section.

In an example, the second section can flip out, pop out, pivot, and/or rotate away from the band in the second configuration. In an example, in the second section can be recessed within the first section in the first configuration and extend out from the first section in the second configuration. In an example, the second section can have a planoconvex shape. In an example, a straight side of the second section can be connected to the first section by a hinge, axle, or joint. In an example, the second section can unfold and/or unroll in the second configuration.

In an example, the enclosure can further comprise a third section which is connected to the second section, wherein the center of the third section is farther from the band in the second configuration than in the first configuration. In an example, the first section, the second section, and the third section can form a structure with a triangular cross-section in the second configuration. In an example, the plane of the second section and the plane of the third section can be parallel or coplanar in the first configuration and intersect at an angle between 40 degrees and 120 degrees in the second configuration.

In an example, a wrist-worn device (e.g. smart watch) with a camera can comprise: a bifurcating band which is worn on a person's wrist and/or arm; an enclosure, wherein portions of the band which connect to the enclosure bifurcate, thereby creating gaps, openings, and/or holes in the portions of the band which are connected to the enclosure; a display on the enclosure; and a camera on the rim of the enclosure. In an example, bifurcating branches of the band connected to the enclosure can be symmetric with respect to a plane of a central circumference of the band. In an example, the camera can be located on the plane of the central circumference of the band. In an example, the gap, opening, and/or hole can be arcuate. In an example, the gap, opening, and/or hole can have a conic-section shape.

In an example, a device can be a smart watch and a band can be a watch band. In an example, a device can be embodied in a wrist (or arm) cuff or sleeve. In an example, a device can be embodied in the cuff or sleeve of an article of clothing. In another example, a wrist-worn device (e.g. smart watch) with a camera can comprise: an arcuate band (e.g. a watch band) which is worn around at least two-thirds of the circumference of a person's wrist and/or arm; an enclosure (e.g. a watch housing) which is held on the dorsal side of the person's wrist and/or arm by the band; a display (e.g. a watch display) on the enclosure; and a camera which is held on the ventral side of the person's wrist and/or arm by the band.

In an example, a wrist-worn device (e.g. smart watch) with a camera can comprise: a band which is worn on a person's wrist and/or arm; an enclosure which is held by the band on the dorsal side of the person's wrist and/or arm; a display on the enclosure; a connection mechanism (e.g. a buckle, clasp, snap, button, or pin) which connects portions of the band on the ventral side of the person's wrist and/or arm; and a camera on the connection mechanism. In an example, a wrist-worn device (e.g. smart watch) with a camera can comprise: an arcuate band (e.g. watch band) which is worn around at least two-thirds of the circumference of a person's wrist and/or arm; an enclosure (e.g. watch housing) which is held on the ventral side of the person's wrist and/or arm by the band; a display (e.g. watch display) on the enclosure; and a camera which is held on the dorsal side of the person's wrist and/or arm by the band.

In one embodiment, a device can comprise at least two cameras including one camera located at the 0-degree coordinate and one camera located at the 180-degree coordinate. In another example, a device can comprise at least two cameras including one camera located at between the 315-degree and 45-degree coordinates and one camera located between the 135-degree and 225-degree coordinates. In an example, a wrist-worn device (e.g. smart watch) with a camera can comprise: a band which is worn on a person's wrist and/or arm; a first enclosure which is held by the band on the dorsal side of the person's wrist and/or arm; a first display on the first enclosure; a first camera on the first enclosure; a second enclosure which is held by the band on the ventral side of the person's wrist and/or arm; a second display on the second enclosure; and a second camera on the second enclosure; wherein images recorded by the first camera and the second camera are sequentially shown on the first display.

In an example, a wrist-worn device (e.g. smart watch) with a camera can comprise: a band which is worn on a person's wrist and/or arm; an enclosure on the band which is centered on a first circumferential coordinate of the band; a display on the enclosure; a first camera on the enclosure; and a second camera on the band which is centered on a second circumferential coordinate of the band, wherein the second coordinate is between 135 and 225 degrees away from than the first coordinate. In an example, a wrist-worn device (e.g. smart watch) with a camera can comprise: a band which is worn on a wrist and/or arm; a first camera on the band between the 45-degree and 135-degree coordinates; and a second camera on the band between the 225-degree and 315-degree coordinates. In another example, a wrist-worn device (e.g. smart watch) with a camera can comprise: a band which is worn on a wrist and/or arm; a first camera on the band at the 90-degree coordinate; and a second camera on the band at the 180-degree coordinate.

In an example, a wrist-worn device (e.g. smart watch) with a camera can comprise: a band worn around a person's wrist and/or arm; an enclosure on the band; a display on the outward-facing side of the enclosure; a first camera on the rim (e.g. narrow perimeter) of the enclosure, and a second camera on the rim of the enclosure, wherein the second camera is in a different quartile of the rim of the enclosure than the first camera. In one embodiment, a wrist-worn device (e.g. smart watch) with a camera can comprise: a band worn on a person's wrist and/or arm; a display on the band; a first camera on the band between the 45-degree and 135-degree coordinates; and a second camera on the band between the 135-degree and 225-degree coordinates, wherein the second camera is perpendicular to the first camera.

In an example, a wrist-worn device (e.g. smart watch) with a camera can comprise: an arcuate band worn around a person's wrist and/or arm; a first display on the band between the 315-degree and 45-degree coordinates; a second display on the band between the 225-degree and 315-degree coordinates; a first camera between the 45-degree and 135-degree coordinates; a second camera between the 135-degree and 225-degree coordinates; and a motion sensor, wherein images recorded by the first camera or the second camera are shown on the first display or the second display depending on the orientation of the band detected from data from the motion sensor.

In another example, a device can comprise an array of outward-facing cameras which are evenly distributed (e.g. equally space and/or equidistant from each other) around the circumference of a person's wrist and/or arm. In an example, a device can comprise an array of outward-facing cameras which are distributed around at least half of the circumference of a person's wrist and/or arm. In another example, a wrist-worn device (e.g. smart watch) with a camera can comprise: a band worn on a person's wrist and/or arm; an enclosure on the band; a display on the enclosure; and one or more cameras on the rim (e.g. narrow lateral perimeter) of the enclosure.

In an example, a wrist-worn device (e.g. smart watch) with a camera can comprise: a band which is worn on a person's wrist and/or arm; an enclosure on the band; a movable arm (e.g. protrusion) on or in the enclosure, wherein the movable arm has a first configuration which is recessed with the enclosure and a second configuration which extends out from the enclosure; a display on the enclosure; and a camera on the movable arm. In another example, a wrist-worn device (e.g. smart watch) with a camera can comprise: a band which is worn on a person's wrist and/or arm; an enclosure on the band; a movable arm (e.g. protrusion) on or in the enclosure, wherein the movable arm has a first configuration which extends out from the enclosure by a first distance and a second configuration which extends out from the enclosure by a second distance, wherein the second distance is greater than the first distance; a display on the enclosure; and a camera on the movable arm.

In an example, a wrist-worn device (e.g. smart watch) with a camera can comprise: a band which is worn on a person's wrist and/or arm; a display on the band; and a camera on the band, wherein the central focal vector of the camera is tangential to the circumference of the band. In one embodiment, a wrist-worn device (e.g. smart watch) with a camera can comprise: a band worn around a person's wrist and/or arm; an enclosure on the band; a display on the enclosure; and a camera on the rim (e.g. narrow perimeter) of the enclosure, wherein the central focal vector of the camera is tangential to the circumference of the band. In an example, a wrist-worn device (e.g. smart watch) with a camera can comprise: a band worn around a person's wrist and/or arm; an enclosure on the band; a display on the enclosure; and a camera on the rim (e.g. narrow perimeter) of the enclosure, wherein the central focal vector of the camera is orthogonal to the plane of the central circumference of the band.

In an example, a wrist-worn device (e.g. smart watch) with a camera can comprise: a band which is worn on a person's wrist and/or arm; a display on the band; a rotatable turret, wherein the turret has first configuration in which it is recessed into (an enclosure on) the band and a second configuration in which it extends out from (the enclosure on) the band; and a camera on the rotatable turret. In another example, a wrist-worn device (e.g. smart watch) with a camera can comprise: a band which is worn on a person's wrist and/or arm; a display on the band; a rotatable turret which protrudes from the band, wherein the turret is located between the 45-degree and 135-degree coordinates; and a camera on the rotatable turret. In an example, a wrist-worn device (e.g. smart watch) with a camera can comprise: a band which is worn on a person's wrist or arm; an enclosure on the band, a display on the enclosure; a rotatable protrusion (e.g. rotatable turret) which extends out from the enclosure in a radial direction; and a camera on the rotatable protrusion. In another example, a wrist-worn device (e.g. smart watch) with a camera can comprise: a band worn on a person's wrist and/or arm; an enclosure on the band; a display on the enclosure; a rotatable bevel or ring on the perimeter (e.g. rim) of the enclosure, and one or more cameras on bevel or ring.

In an example, a wrist-worn device (e.g. smart watch) with a camera can comprise: a band worn on a wrist and/or arm; a plurality of displays at different locations on the circumference of the band; and a motion sensor; wherein which content is shown on which displays is controlled by the orientation of the band based on analysis of data from the motion sensor. In another example, a wrist-worn device (e.g. smart watch) with a camera can comprise: an arcuate band worn around a person's wrist and/or arm; a display on the band between the 315-degree and 45-degree coordinates; and a camera on the band between the 45-degree and 135-degree coordinates, wherein images recorded by the camera are shown by the display. In one embodiment, images recorded by a camera on a device can be shown on the display on the device.

In an example, a wrist-worn device (e.g. smart watch) with a camera can comprise: a band which is worn on a person's wrist and/or arm; an first enclosure on the band; a first display on the first enclosure; a camera on the rim (e.g. narrow lateral perimeter) of the first enclosure, wherein the camera is located between the 0-degree and 45-degree coordinates; a second enclosure on the band; and a second display on the second enclosure, wherein images from the camera are shown on the second display. In an example, a wrist-worn device (e.g. smart watch) with a camera can comprise: a band which is worn on a person's wrist and/or arm; an first enclosure on the band; a first display on the first enclosure between the 315-degree and 45-degree coordinates; a camera on the rim (e.g. narrow lateral perimeter) of the first enclosure, wherein the camera is located at the 0-degree coordinate; a second enclosure on the band between the 225-degree and 315-degree coordinates; and a second display on the second enclosure, wherein images from the camera are shown on the second display.

In an example, a wrist-worn device (e.g. smart watch) with a camera can comprise: an arcuate band (e.g. watch band) which is worn around at least two-thirds of the circumference of a person's wrist and/or arm; a first enclosure (e.g. primary housing) which is held on the dorsal side of the person's wrist and/or arm by the band; a first display (e.g. primary display) on the first enclosure; a camera on a side of the first enclosure; a second enclosure (e.g. secondary housing) which is held between the dorsal and ventral sides of the person's wrist and/or arm by the band; and a second display (e.g. secondary display) on the second enclosure, wherein images recorded by the camera are shown on the second display.

In another example, a wrist-worn device (e.g. smart watch) with a camera can comprise: an arcuate band worn around a person's wrist and/or arm; a primary display on the band between the 315-degree and 45-degree coordinates; a secondary display on the band between the 225-degree and 315-degree coordinates; a motion sensor on the band; and a camera on the band between the 45-degree and 135-degree coordinates, wherein images recorded by the camera are shown by the secondary display or by the primary display, depending on the orientation of the band detected from data from the motion sensor.

In another example, a wrist-worn device (e.g. smart watch) with a camera can comprise: a band which is worn on a person's wrist and/or arm; an enclosure on the band; a pivoting component with a display which pivots, rotates, pops, and/or flips up from the enclosure; wherein the display is movably-connected (e.g. via a joint, hinge, or axle) to the enclosure at a location between the 315-degree and 0-degree coordinates; and a camera on the opposite side of the pivoting component from the display. In an example, a wrist-worn device (e.g. smart watch) with a camera can comprise: a band which is worn on a person's wrist and/or arm; an enclosure on the band; a pivoting component with a display which pivots, rotates, pops, and/or flips up from the enclosure; wherein one end of the display is movably-connected (e.g. via a joint, hinge, or axle) to the enclosure at a location between the 270-degree and 315-degree coordinates; and a camera on the opposite side of the pivoting component from the display.

In one embodiment, a wrist-worn device (e.g. smart watch) with a camera can comprise: a band which is worn on a person's wrist and/or arm; an enclosure which is held by the band on the dorsal side of the person's wrist and/or arm; a flip-up (e.g. flip-up, pop-up, pivoting, and/or rotatable) display on the enclosure, wherein the display is at least partially connected to the enclosure by a snap, clip, clasp, latch, prong, pin, spring, or magnet, wherein the display has a first configuration which is recessed into (or onto) the enclosure, wherein the display has a second configuration which extends out from the enclosure, and wherein the flip-up display is changed from the first configuration to the second configuration by finger pressure on the snap, clip, clasp, latch, prong, pin, spring, or magnet; and a camera on the display. In an example, a wrist-worn device (e.g. smart watch) with a camera can comprise: a band which is worn on a person's wrist and/or arm; and a flip-up and/or pop-up component (e.g. enclosure, display, and/or camera) on the band; wherein the component has a planoconvex cross-sectional shape.

In one embodiment, a wrist-worn device (e.g. smart watch) with a camera can comprise: a band which is worn on a person's wrist and/or arm; a flip-up or pop-up enclosure on the band with a planoconvex cross-sectional shape, wherein a straight edge of the enclosure is movably-connected to the band, wherein the enclosure has a first configuration in which the center of the enclosure is a first distance from the band, wherein the enclosure has a second configuration in which the center of the enclosure is a second distance from the band, wherein the second distance is greater than the first distance, and wherein the enclosure is changed from the first configuration to the second configuration by pivoting around the straight edge of the enclosure; a display on the enclosure; and a camera on the enclosure. In another example, a wrist-worn device (e.g. smart watch) with a camera can comprise: a band which is worn on a person's wrist and/or arm; and a flip-up and/or pop-up component (e.g. enclosure, display, and/or camera) on the band; wherein one end of the component pivots out from the band toward the right side of the wrist and/or arm.

In an example, a wrist-worn device (e.g. smart watch) with a camera can comprise: a band which is worn on a person's wrist and/or arm; and a flip-up and/or pop-up component (e.g. enclosure, display, and/or camera) on the band; wherein one end of the component pivots out from the band in a distal direction (e.g. away from the person's elbow). In another example, a wrist-worn device (e.g. smart watch) with a camera can comprise: a band which is worn on a person's wrist and/or arm; a flip-up or pop-up enclosure on the band; a display on a first side of the enclosure; and a camera on a second side of the enclosure, wherein the second side is parallel to the first side. In an example, a wrist-worn device (e.g. smart watch) with a camera can comprise: a band which is worn on a person's wrist and/or arm; and a flip-up and/or pop-up component (e.g. enclosure, display, and/or camera) on the band; wherein the component further comprises two movably-connected (e.g. jointed or hinged) sections, and wherein the two sections become coplanar as the component extends out from the device.

In an example, a flip-up and/or pop-up component (e.g. enclosure, display, or camera) on a wrist-worn device can have a cross-sectional shape which is a conic section. In an example, a flip-up and/or pop-up component (e.g. enclosure, display, or camera) on a wrist-worn device can have one end which pivots out from the device toward the left side of the band. In an example, a flip-up and/or pop-up component (e.g. enclosure, display, or camera) on a wrist-worn device can unfold as it extends out from the device. In another example, a flip-up or pop-up component (e.g. enclosure and/or display) on a band can be compelled by a spring, magnet, or other mechanism to extend out at an angle between 45 degrees and 135 degrees relative to the band.

In an example, a wrist-worn device (e.g. smart watch) with a camera can comprise: a band which is worn around a person's wrist and/or arm; a display on the band; wherein the band further comprises a first band section and a second band section; wherein the first band section is closer to the surface of the wrist and/or arm than the second band section, wherein the band has a first configuration in which two ends of the second band section are connected to the first band and the second band section overlaps (and is contiguous with) the first band section, wherein the band has a second configuration in which a first end of the second band section is connected to the first band section and a second end of the second band section pivots, rotates, and/or extends out away from the first band section; and a camera on the second band section.

In another example, a wrist-worn device (e.g. smart watch) with a camera can comprise: a band which is worn on a person's wrist and/or arm; an enclosure on the band with a planoconvex cross-sectional shape, wherein a straight edge of the enclosure is movably-connected to the band, wherein the enclosure has a first configuration in which both the straight edge of the enclosure and an arcuate (e.g. semi-circular, half-elliptical, or half rounded-vertex rectangular) edge of the enclosure are contiguous with the band, wherein the enclosure has a second configuration in which the straight edge of the enclosure remains contiguous with the band but the arcuate edge of the enclosure extends out from the band, and wherein the enclosure is changed from the first configuration to the second configuration by pivoting around the straight edge; a display on the enclosure; and a camera on the enclosure.

In an example, a wrist-worn device (e.g. smart watch) with a camera can comprise: a band which is worn on a person's wrist and/or arm; a pivoting enclosure on the band, wherein the pivoting enclosure has a first configuration with at least 75% of the enclosure between the 315-degree and 45-degree coordinates and a second configuration with at least 75% of the enclosure between the 270-degree and 315-degree coordinates, and wherein the enclosure pivots from the first configuration to the second configuration; two displays on opposite sides of the pivoting enclosure; and a camera on the pivoting enclosure and/or the band. In one embodiment, a wrist-worn device (e.g. smart watch) with a camera can comprise: a band which is worn on a person's wrist and/or arm; a pivoting enclosure on the band, wherein the pivoting enclosure has a first configuration on the dorsal side of the wrist and/or arm and a second configuration on a lateral (e.g. between dorsal and ventral) side of the wrist and/or arm, and wherein the enclosure pivots from the first configuration to the second configuration; two displays on opposite sides of the pivoting enclosure; and a camera on the pivoting enclosure and/or the band In an example, a wrist-worn device (e.g. smart watch) with a camera can comprise: a band which is worn on a person's wrist and/or arm; a pivoting enclosure on the band; a display on a first side of the enclosure; and a camera on a second side of the enclosure, wherein the second side is opposite the first side. In an example, a wrist-worn device (e.g. smart watch) with a camera can comprise: an arcuate band (e.g. watch band) which is worn around at least two-thirds of the circumference of a person's wrist and/or arm; an enclosure (e.g. watch housing) which is held on the dorsal side of the person's wrist and/or arm by the band; a pivoting arm which pivots (e.g. pivots, rotates, and/or pops) up and/out from the enclosure; a display (e.g. watch face) on the pivoting arm; and a camera which is held between the dorsal and ventral sides of the person's wrist and/or arm by the band, wherein images recorded by the camera are shown on the display.

In another example, a wrist-worn device (e.g. smart watch) with a camera can comprise: an arcuate band (e.g. watch band) which is worn around at least two-thirds of the circumference of a person's wrist and/or arm; an enclosure (e.g. watch housing) which is held on the dorsal side of the person's wrist and/or arm by the band; a pivoting arm which pivots (e.g. pivots, rotates, and/or pops) up and/out from the enclosure; a display (e.g. watch face) on a first side of the pivoting arm; and a camera on a second side (e.g. opposite the first side) of the pivoting arm, wherein images recorded by the camera are shown on the display.

In an example, a wrist-worn device (e.g. smart watch) with a camera can comprise: an arcuate band (e.g. watch band) which is worn around at least two-thirds of the circumference of a person's wrist and/or arm; an enclosure (e.g. watch housing) which is held on the dorsal side of the person's wrist and/or arm by the band; wherein the enclosure further comprises a first section which is stationary relative to the band; a pivoting and/or sliding second section; and a pivoting and/or sliding third section; wherein the enclosure has a first configuration in which the first section, the second section, and the third section are substantially parallel to each other; and wherein the enclosure has a second configuration in which the first section, the second section, and the third section form a triangular prism which protrudes out from the band; a display on the second section; and a camera on the second section, wherein images recorded by the camera are shown on the display.

In another example, a wrist-worn device (e.g. smart watch) with a camera can comprise: a band that is worn on a person's wrist and/or arm; an enclosure on the band; a display which is connected to the enclosure, wherein a first plane best fits the display when the display is in a first configuration, wherein a second plane best fits the display when the display is in a second configuration, wherein a third plane best fits the enclosure, wherein the first plane is parallel to the third plane, and wherein the second plane intersects the third plane at an acute angle; and a camera on the display. In an example, a wrist-worn device (e.g. smart watch) with a camera can comprise: a band which is worn on a person's wrist and/or arm; and a camera; wherein the camera has a first configuration with a first orientation and/or central focal vector, wherein the camera has a second configuration with a second orientation and/or central focal vector, and wherein the camera is automatically changed from the first configuration to the second configuration in order to remain focused toward a selected object in the environment (e.g. food).

In another example, a wrist-worn device (e.g. smart watch) with a camera can comprise: a band which is worn on a person's wrist and/or arm, wherein the band spans between 50% and 90% of the circumference of the person's wrist or arm; an enclosure which is held on the person's wrist and/or arm by the band, wherein the device has a first configuration in which the enclosure is connected to the band by both a first end of the band and a second end of the band, wherein the device has a second configuration in which the enclosure is connected to the band only by the first end of the band (and not the second end of the enclosure), and wherein the enclosure can be moved back and forth between the first and second configurations; a display on the enclosure; and a camera on the enclosure.

In an example, a wrist-worn device (e.g. smart watch) with a camera can comprise: a band which is worn on a person's wrist and/or arm; a flexible arcuate arm which spans a portion of the circumference of the band; a display on the flexible arcuate arm; and a camera on the flexible arcuate arm; wherein the flexible arcuate arm has a first configuration in which a first (retracted) portion of the arm is in contact with the band; wherein the flexible arcuate arm has a second (extended) configuration in which a second portion of the arm is in contact with the band; and wherein the second portion is less than the first portion.

In an example, a wrist-worn device (e.g. smart watch) with a camera can comprise: a band worn on a person's wrist and/or arm; a threaded circular enclosure on the band, wherein the threaded circular enclosure has a first configuration which is a first distance from the band and a second configuration which is a second distance from the band, and wherein the circular enclosure is changed from the first configuration to the second configuration by being rotated; a display on the enclosure; and a camera on the enclosure and/or the band. In one embodiment, a wrist-worn device (e.g. smart watch) with a camera can comprise: a band worn on a person's wrist and/or arm; an enclosure, wherein the enclosure is connected to the band by a flexible member (e.g. strip, cable, cord, or wire), wherein the enclosure has a first configuration in which it is connected to the band by the flexible member and one or more snaps, clasps, clips, latches, pins, plugs, hook-and-loop materials, or buckles, and wherein the enclosure has a second configuration in which it is only connected to the band by the flexible member; a display on the band; and a camera on the enclosure.

In another example, a wrist-worn device (e.g. smart watch) with a camera can comprise: a band worn on a person's wrist and/or arm; an enclosure on the band; a two-part pop-up component on the enclosure, wherein the pop-up component has a recessed configuration in which a first part of the pop-up component and a second part of the pop-up component are parallel to each other, and wherein the pop-up component has an extended configuration in which the planes of the first part of the pop-up component and the second part of the pop-up component intersect at an acute angle; a display on the first part of the pop-up component; and a camera on the second part of the pop-up component.

In an example, a wrist-worn device (e.g. smart watch) with a camera can comprise: an arcuate band (e.g. watch band) which is worn around at least two-thirds of the circumference of a person's wrist and/or arm; an enclosure (e.g. watch housing) which is held on the dorsal side of the person's wrist and/or arm by the band; a display (e.g. watch face) on the enclosure; a movable projection (e.g. arm) which extends out radially from the enclosure, wherein the projection has a longitudinal axis, wherein the projection has a first configuration in which the longitudinal axis is orthogonal to a central plane of the circumference of the band, and wherein the project has a second configuration in which the longitudinal axis is parallel to the central plane of the circumference of the band; and a camera on the projection. In another example, a second section of an enclosure can unfold and/or unroll in a second configuration.

In an example, a wrist-worn device (e.g. smart watch) with a camera can comprise: a band which is worn on a person's wrist and/or arm; a wedge-shaped enclosure on the band; a display on the distal side of the wedge-shaped enclosure, wherein the distal side faces away from the surface of the person's wrist and/or arm and the proximal side faces toward the surface of the person's wrist; and a camera on a widest lateral side of the wedge-shaped enclosure, wherein a lateral side is between the distal and proximal sides of the enclosure. In an example, a second section of an enclosure can have a planoconvex shape.

In an example, a device can be a modular smart watch, including a modular smart watch housing and a modular smart watch band. In another example, a device can comprise the combination of a modular watch enclosure and a modular watch band, wherein the modular watch enclosure can be used with other watch bands and the modular watch band can be used with other watch enclosures. In an example, a detachable camera can be connected to a wrist band by a cable, wire, cord, or strap. In another example, a device can comprise a band with at least six connection ports at different locations around the circumference of the band, wherein one or more modular cameras can be plugged into one or more of these connection ports. In an example, a device can comprise a band with six connection ports at different locations around the circumference of the band, wherein one or more modular cameras can be plugged into one or more of these connection ports.

In one embodiment, a wrist-worn device (e.g. smart watch) with a camera can comprise: a band that is worn on a person's wrist and/or arm; an enclosure on the band; a display on the enclosure; and a camera, wherein the camera has a first configuration in which it is attached to the band and a second configuration in which it is detached from the band; and a cable, wire, or cord which is connected the camera and connected to the band in both the first configuration and the second configuration. In an example, a wrist-worn device (e.g. smart watch) with a camera can comprise: a band which is work on a person's wrist and/or arm, wherein the band has a circumferential array of connection ports or sockets; an enclosure, wherein the band provides electronic communication pathways (e.g. wires) between the enclosure and the connection ports or sockets; a display on the enclosure; and a camera which can be selectively and detachably plugged into any of the ports or sockets in the array, wherein images recorded by the camera are shown on the display when the camera is plugged into a connection port or socket.

In an example, a wrist-worn device (e.g. smart watch) with a camera can comprise: a band which is worn on a person's wrist and/or arm, wherein the band spans between 50% and 90% of the circumference of the person's wrist or arm; an enclosure; a display on the enclosure; and a camera on the enclosure; wherein a first end of the enclosure is permanently-connected to the band; wherein a second end of the enclosure is detachably-connected to the band by a snap, clip, latch, clasp, pin, or buckle; wherein the device has a first configuration in which the second end of the enclosure is connected to the band; wherein the device has a second configuration in which the second end of the enclosure is detached from the band; and wherein the device can be reversibly changed between the first configuration and the second configuration by moving the snap, clip, latch, clasp, pin, or buckle.

In an example, a wrist-worn device (e.g. smart watch) with a camera can comprise: a band which is worn on a person's wrist and/or arm, wherein there is an arcuate array of ports, slots, openings, or holes on the band which spans at least half of the circumference of the band; a modular display which can be removably-attached to a port, slot, opening, or hole in the array; and a modular camera which can be removably-attached to a port, slot, opening, or hole in the array. In another example, a wrist-worn device (e.g. smart watch) with a camera can comprise: a band worn on a person's wrist and/or arm; a display on the band; and a camera with a first configuration in which the camera is attached to the band and a second configuration in which the camera is detached from the band, wherein the camera is in wireless communication with the display so that images recorded by the camera are shown on the display. In an example, one of an enclosure can be reversibly-detached from a band in order to pivot the other end of the enclosure outward from the band.

In another example, a wrist-worn device (e.g. smart watch) with a camera can comprise: a band which is worn on a person's wrist and/or arm; a sliding enclosure on the band, wherein the sliding enclosure has a first configuration on the dorsal side of the wrist and/or arm and a second configuration on a lateral (e.g. between dorsal and ventral) side of the wrist and/or arm, and wherein the enclosure slides from the first configuration to the second configuration; a display on the sliding enclosure; and a camera on the sliding enclosure and/or the band.

In an example, a wrist-worn device (e.g. smart watch) with a camera can comprise: a band which is worn on a person's wrist and/or arm; a display on the band; and a camera on the band, wherein the circumferential coordinate of the camera can be manually changed by sliding the camera along a track or channel around a portion of the circumference of the band, wherein the camera has a first configuration in which the camera is locked into place at a selected circumferential coordinate, wherein the camera has a second configuration which is unlocked and able to slide around the circumference of the band to different circumferential coordinates, and wherein the camera is changed from its first (locked) configuration to its second (unlocked and slidable) configuration by the application of finger pressure.

In another example, a wrist-worn device (e.g. smart watch) with a camera can comprise: a band which is worn on a person's wrist and/or arm; a sliding enclosure on the band, wherein the sliding enclosure has a first configuration between the 315-degree and 45-degree coordinates and a second configuration between the 270-degree and 315-degree coordinates, and wherein the enclosure slides from the first configuration to the second configuration; a display on the sliding enclosure; and a camera on the sliding enclosure and/or the band. In an example, a wrist-worn device (e.g. smart watch) with a camera can comprise: a band which is worn on a person's wrist and/or arm; an enclosure on the band; a display on the enclosure; a camera on the band; and a track or channel around at least a portion of the circumference of the band, wherein the track of channel is located in the middle of the width of the band, and wherein the camera slides along the track or channel to different locations on the circumference of the band.

In one embodiment, a wrist-worn device (e.g. smart watch) with a camera can comprise: a band which is worn on a person's wrist and/or arm; a display on the band; and a camera on the band, wherein the circumferential coordinate of the camera can be manually changed by sliding the camera along a track or channel around a portion of the circumference of the band. In an example, a wrist-worn device (e.g. smart watch) with a camera can comprise: a band which is worn on a person's wrist and/or arm; a display on the band; and a camera on the band, wherein the camera can slide along a track or channel which spans between 25% and 50% of the circumference of the person's wrist and/or arm. In an example, a wrist-worn device (e.g. smart watch) with a camera can comprise: a band worn on a person's wrist and/or arm; a display on the band; and a camera on the band which can be moved (e.g. slid along a track or channel) between the 90-degree and 180-degree coordinates.

In an example, a wrist-worn device (e.g. smart watch) with a camera can comprise: an inner band which is worn on a person's wrist and/or arm; an outer band which is worn on the person's wrist and/or arm, wherein the inner band is at least partially nested within the circumference of the outer band; a first enclosure on the outer band; a second enclosure on the outer band, wherein the second enclosure is movably-connected to the first enclosure (e.g. by an axle, joint, or hinge); a display on the first enclosure; and a camera on the second enclosure, wherein the first and second enclosures can be moved (e.g. pivoted and/or rotated) away from the inner band while remaining connected to the outer band.

In another example, a wrist-worn device (e.g. smart watch) with a camera can comprise: an inner band which is worn around at least two-thirds of a person's wrist and/or arm; an outer band which is worn around at least two-thirds of the person's wrist and/or arm, wherein the outer band is farther from the surface of the person's wrist and/or arm than the inner band, wherein the outer band is more flexible, elastic, and/or undulating than the inner band, wherein the device has a first configuration in which the outer band is connected to the inner band at a first number of locations, wherein the device has a second configuration in which the outer band is connected to the inner band at a second number of locations, wherein the second number is less than the first number, wherein the device can be manually changed between the first configuration and the second configuration; a display on the outer band; and a camera on the outer band, wherein in the second configuration the camera can be tilted, pivoted, and/or rotated relative to the wrist and/or arm so that the central focal vector of the camera can be pointed in different directions without the person having to contort their wrist and/or arm.

In an example, a wrist-worn device (e.g. smart watch) with a camera can comprise: an inner band which is worn on a person's wrist and/or arm; a foldable two-section enclosure on the band, wherein the foldable two-section enclosure has a recessed configuration in which two ends of the foldable enclosure which are connected to the band are a first distance apart from each other, wherein the foldable two-section enclosure has an extended configuration in which the two ends are a second distance apart from each other, wherein the second distance is less than the first distance; a display on the foldable two-section enclosure; and a camera on the foldable two-section enclosure.

In another example, a wrist-worn device (e.g. smart watch) with a camera can comprise: an inner band which is worn around at least two-thirds of a person's wrist and/or arm; an outer band which is worn around at least two-thirds of the person's wrist and/or arm, wherein the outer band is farther from the surface of the person's wrist and/or arm than the inner band, and wherein the inner band is nested within the outer band; an enclosure on the inner band or outer band; a display on the enclosure; and a camera on the enclosure; wherein the device has a first configuration in which the outer band is connected to the inner band at a first number of locations, wherein the device has a second configuration in which the outer band is connected to the inner band at a second number of locations, wherein the second number is less than the first number, and wherein the device can be manually changed between the first configuration and the second configuration.

In an example, a wrist-worn device (e.g. smart watch) with a camera can comprise: an inner band which is worn around at least two-thirds of a person's wrist and/or arm; an outer band which is worn on the person's wrist and/or arm, wherein the outer band spans less of the circumference of the person's wrist and/or arm than the inner band; a display on the outer band; and a camera on the outer band. In an example, a wrist-worn device (e.g. smart watch) with a camera can comprise: an inner band which is worn around at least two-thirds of a person's wrist and/or arm; an outer band which is worn on the person's wrist and/or arm, wherein the outer band comprises a plurality of flexibly-connected segments; a display on the outer band; and a camera on the outer band. In one embodiment, an outer band can be farther from the surface of the wrist and/or arm than an inner band.

In an example, a wrist-worn device (e.g. smart watch) with a camera can comprise: a band which is worn on a person's wrist and/or arm, wherein the band further comprises a ring which rotates around at least a portion of the circumference of the band; a display on the band; and a camera on the ring. In another example, a wrist-worn device (e.g. smart watch) with a camera can comprise: a band which is worn on a person's wrist and/or arm; an enclosure on the band, wherein the enclosure can be rotated in a plane which is tangential to the circumference of the band; a display on the enclosure; and a camera on the enclosure. In one embodiment, a wrist-worn device (e.g. smart watch) with a camera can comprise: a band worn around a person's wrist and/or arm; an enclosure on the band, wherein the enclosure is centrally-connected to the band (e.g. via a central axis or bearing) so that the enclosure can rotate on the band; a display on the enclosure; and a camera on the rim (e.g. narrow perimeter) of the enclosure.

In another example, a wrist-worn device (e.g. smart watch) with a camera can comprise: a band worn on a person's wrist and/or arm, wherein the band further comprises an inner rotatable ring around the circumference of the band; an enclosure on the band; a display on the enclosure; and a camera on the ring. In an example, a wrist-worn device (e.g. smart watch) with a camera can comprise: a band worn on a person's wrist and/or arm, wherein the band further comprises a rotatable ring around the circumference of the band; an enclosure on the band; a display on the enclosure; and a camera on the ring. In an example, a wrist-worn device (e.g. smart watch) with a camera can comprise: a band worn on a person's wrist and/or arm, wherein the band further comprises a rotatable partial ring around a portion of the circumference of the band; an enclosure on the band; a display on the enclosure; and a camera on the ring.

In an example, a wrist-worn device (e.g. smart watch) with a camera can comprise: a first band which is worn around a person's wrist and/or arm; a second band which is worn around the person's wrist and/or arm, wherein the first band and the second band are movably-connected in a manner which enables the first band to rotate relative to the second band; a display on the first band; and a camera on the second band. In an example, a wrist-worn device (e.g. smart watch) with a camera can comprise: a two-ring band which is worn on a person's wrist and/or arm; wherein the two-ring band further comprises a first ring and a second ring, wherein the plane of the second ring and the plane of the first ring are parallel, wherein the second ring is farther from the person's elbow than the second ring, and wherein the second ring is connected to the first ring in a manner which enables the second ring to rotate relative to the first ring; a display on the first ring; and a camera on the second ring.

In another example, a wrist-worn device (e.g. smart watch) with a camera can comprise: a bifurcating band which is worn on a person's wrist and/or arm; an enclosure, wherein portions of the band which connect to the enclosure bifurcate, thereby creating gaps, openings, and/or holes in the portions of the band which are connected to the enclosure; a display on the enclosure; and a camera on the rim of the enclosure. In an example, a gap, opening, and/or hole between the branches of a bifurcating portion of a band can be have a parabolic shape. In another example, a gap, opening, and/or hole in a bifurcating band can be arcuate. In an example, bifurcating branches of a band near an enclosure can be symmetric with respect to the plane of a central (with respect to width) circumference of the band and a camera on the enclosure can be centered on this plane, thereby enabling the enclosure to have low profile (e.g. not stick out very far from the band) without having the band obscure the central focal vector of a camera on the rim of the enclosure. In one embodiment, the width of a gap, opening, and/or hole between the branches of a bifurcating portion of a band can be between 60% and 80% of the width of non-bifurcating portions the band. In an example, the thickness of an enclosure held on a wrist and/or arm by a band can be between 100% and 150% of thickness of the band.

In one embodiment, a wrist-worn device (e.g. smart watch) with a camera can comprise: a band which is worn on a person's wrist and/or arm; an enclosure on the band; a display on the enclosure; and a plurality of cameras on the band, wherein a particular camera in the array is selected to be activated to record images by a user action selected from the following group of actions: touching or swiping the display, hand and/or arm gesture detected by a motion sensor, hand and/or arm gesture detected by an EMG sensor, rotating a bezel or ring on the enclosure, and voice command recognition.

In another example, a wrist-worn device (e.g. smart watch) with a camera can comprise: a band which is worn on a person's wrist and/or arm; an enclosure which is held by the band on the dorsal side of the person's wrist and/or arm; a flip-up (e.g. flip-up, pop-up, pivoting, and/or rotatable) display on the enclosure, wherein the display is at least partially connected to the enclosure by a snap, clip, clasp, latch, prong, pin, spring, or magnet, wherein the display has a first configuration which is recessed into (or onto) the enclosure, wherein the display has a second configuration which extends out from the enclosure, and wherein the flip-up display is changed from the first configuration to the second configuration by finger pressure on the snap, clip, clasp, latch, prong, pin, spring, or magnet; and a camera on the display, enclosure, and/or band; wherein the camera is activated to start recording images when the display is changed from the first configuration to the second configuration.

In an example, a wrist-worn device (e.g. smart watch) with a camera can comprise: a band which is worn on a person's wrist and/or arm; an enclosure on the band; a display on the enclosure; a motion sensor in the enclosure; and a camera on the enclosure; wherein the camera is activated to start and stop recording images by detection of selected gestures and/or motions from analysis of data from the motion sensor. In another example, a wrist-worn device (e.g. smart watch) with a camera can comprise: a band which is worn on a person's wrist and/or arm; an enclosure on the band; a display on the enclosure; a motion sensor in the enclosure; and a camera on the band; wherein the camera is activated to record images by detection of a selected gesture and/or motion from analysis of data from the motion sensor. In an example, a device can comprise; a band which is worn on a person's wrist and/or arm; and a camera on the band, wherein the camera is triggered (e.g. activated) to record images based on data from one or more of the following components: accelerometer, gyroscope, inclinometer, microphone, blood pressure sensor, heart rate sensor, ECG sensor, EMG sensor, temperature sensor, and pressure sensor.

In another example, a wrist-worn device (e.g. smart watch) with a camera can comprise: a band which is worn on a person's wrist and/or arm; and a camera; wherein the camera has a first configuration with a first orientation and/or central focal vector, wherein the camera has a second configuration with a second orientation and/or central focal vector, and wherein the camera is changed from the first configuration to the second configuration by the actuator in order to remain focused toward a selected object in the environment (e.g. food).

In an example, a wrist-worn device (e.g. smart watch) with a camera can comprise: a band which is worn on a person's wrist and/or arm; an enclosure on the band, a motion sensor I the enclosure; a camera on the enclosure; a reflective or refractive component (e.g. mirror or lens) whose movement changes the central focal vector of the camera; and an actuator; wherein the orientation and/or position of the reflective or refractive component is changed by the actuator in order to keep the central focal vector of the camera directed toward a selected environmental object (e.g. food) as the band moves. In an example, a wrist-worn device (e.g. smart watch) with a camera can comprise: a band which is worn on a person's wrist and/or arm; a motion sensor on the band; a camera on the band; and an actuator; wherein the actuator moves the focal vector of the camera to maintain a constant focal direction relative to the environment even when the based moves based on analysis of data from the motion sensor.

In an example, a wrist-worn device (e.g. smart watch) with a camera can comprise: a band which is worn on a person's wrist and/or arm; a display on the band; a camera on the band; a motion sensor on the band; and an actuator on the band; wherein the actuator changes the direction of the central focal vector of the camera to keep a selected environmental object in images recorded by the camera based on data from the motion sensor. In one embodiment, a wrist-worn device (e.g. smart watch) with a camera can comprise: a band which is worn on a person's wrist and/or arm; a display on the band; a camera on the band; a motion sensor on the band; and an actuator on the band; wherein the actuator moves the camera to keep the camera pointed in the same direction relative to the environment even when the band moves.

In an example, a wrist-worn device (e.g. smart watch) with a camera can comprise: a band which is worn on a person's wrist and/or arm; a display on the band; a camera on the band; and an actuator on the band; wherein the actuator moves the camera based on analysis of images recorded by the camera in order to keep a selected environmental object in those images, even if the band is moved. In one embodiment, a wrist-worn device (e.g. smart watch) with a camera can comprise: a band which is worn on a person's wrist and/or arm; a display on the band; a camera on the band; a motion sensor on the band; an actuator on the band; and a lens (or prism) through which the camera records images, wherein the actuator moves the lens (or prism) to keep the camera focused in the same direction relative to the environment even when the band moves.

In another example, a wrist-worn device (e.g. smart watch) with a camera can comprise: a band which is worn on a person's wrist and/or arm; a display on the band; a camera on the band; and an actuator on the band; a mirror or lens, wherein the actuator moves the mirror or lens based on analysis of images recorded by the camera in order to keep a selected environmental object in those images, even if the band is moved. In an example, a wrist-worn device (e.g. smart watch) with a camera can comprise: a band worn on a person's wrist and/or arm; an enclosure on the band; a display on the enclosure; a camera on the enclosure and/or on the band; a lens or mirror; and an actuator; wherein the focal direction of the camera is changed by movement of the lens or mirror, and wherein the lens or mirror is moved by the actuator to maintain the same focal direction relative to the environment even if the band moves.

In another example, a wrist-worn device (e.g. smart watch) with a camera can comprise: a band which is worn on a person's wrist and/or arm; an enclosure on the band; a display on the enclosure; a rotating bezel or ring on the enclosure; and a camera on the band, wherein the focal direction of the camera is changed by rotation of the bezel or ring. In an example, a device can further comprise one or more components selected from the group consisting of: battery, data processor, EMG sensor, light emitter, motion sensor, photodetector, spectroscopic sensor, wireless data receiver, and wireless data transmitter.

In an example, a device can be a smart watch, including the smart watch housing and the watch band which are integrated together. In an example, a device can be embodied in a wrist band (e.g. fitness band). In an example, a camera on the rim of an enclosure can be located on the plane of the central circumference of a band. In another example, a wrist-worn device (e.g. smart watch) with a camera can comprise: an arcuate band which is worn on a person's wrist and/or arm; an enclosure which is held on a dorsal side of the person's wrist and/or arm by the band; a display on the enclosure; and a camera which is held on a ventral side of the person's wrist and/or arm by the band. In one embodiment, a wrist-worn device (e.g. smart watch) with a camera can comprise: a band worn on a person's wrist and/or arm; a display on the band; and a camera on the band between the 45-degree and 135-degree coordinates.

In another example, a device can comprise at least two cameras including one camera located at the 90-degree coordinate and one camera located at the 180-degree coordinate. In an example, a device can comprise at least two cameras including one camera located at between the 45-degree and 135-degree coordinates and one camera located between the 135-degree and 225-degree coordinates. In one embodiment, a wrist-worn device (e.g. smart watch) with a camera can comprise: a band which is worn around at least two-thirds of the circumference of a person's wrist and/or arm; a first display which is held by the band on the dorsal side of the person's wrist and/or arm; a second display which is held by the band between dorsal and ventral sides of the person's wrist and/or arm; a first camera which is held by the band on the ventral side of the person's wrist and/or arm; and a second camera which is held by the band between the dorsal and ventral sides of the person's wrist and/or arm, on the opposite side of the wrist and/or arm from the second display.

In an example, a wrist-worn device (e.g. smart watch) with a camera can comprise: a band which is worn on a person's wrist and/or arm; a first enclosure which is held by the band on the dorsal side of the person's wrist and/or arm; a first display on the first enclosure; a first camera on the first enclosure; a second enclosure which is held by the band on the ventral side of the person's wrist and/or arm; a second display on the second enclosure; and a second camera on the second enclosure; wherein images recorded by the first camera are shown on the first display. In an example, a wrist-worn device (e.g. smart watch) with a camera can comprise: a band which is worn on a person's wrist and/or arm; an enclosure on the band which is centered on a first circumferential coordinate of the band; a display on the enclosure; a first camera on the enclosure; and a second camera on the band which is centered on a second circumferential coordinate of the band, wherein the second coordinate is 90-degrees away from the first coordinate.

In an example, a wrist-worn device (e.g. smart watch) with a camera can comprise: a band which is worn on a wrist and/or arm; a first camera on the band between the 45-degree and 135-degree coordinates; and a second camera on the band between the 135-degree and 225-degree coordinates. In an example, a wrist-worn device (e.g. smart watch) with a camera can comprise: a band worn around a person's wrist and/or arm; an enclosure on the band; a display on the outward-facing side of the enclosure; a first camera on the rim (e.g. narrow perimeter) of the enclosure, and a second camera on the rim of the enclosure, wherein the second camera is on the opposite side of the enclosure from the first camera. In an example, a wrist-worn device (e.g. smart watch) with a camera can comprise: a band worn on a person's wrist and/or arm; a display on the band; a first camera on the band between the 45-degree and 135-degree coordinates with a first central focal vector; and a second camera on the band between the 135-degree and 225-degree coordinates with a second central focal vector, wherein the second central focal vector is perpendicular to the first central focal vector.

In another example, a wrist-worn device (e.g. smart watch) with a camera can comprise: an arcuate band (e.g. watch band) which is worn around at least two-thirds of the circumference of a person's wrist and/or arm; an enclosure (e.g. watch housing) which is held on the dorsal side of the person's wrist and/or arm by the band; a display (e.g. watch display) on the enclosure; a first camera which is held between the dorsal and ventral sides of the person's wrist and/or arm by the band; and a second camera which is held between the dorsal and ventral sides of the person's wrist and/or arm, on the opposite side of the wrist and/or arm from the first camera by the band.

In an example, a device can enable a person to change the images shown on a selected display from those of a first camera (e.g. facing toward the person) to those of a second camera (e.g. facing away from the person), or vice versa, by one or more actions selected from the group consisting of: making a selected hand motion or gesture; rotating a bezel or ring on a display and/or housing; rotating a knob on a display and/or housing; touching and/or swiping a display in a selected manner or location; touching and/or swiping a selected icon on a display screen; and voice command.

In another example, a device can comprise an array of outward-facing cameras which are distributed around the circumference of a person's wrist and/or arm. In one embodiment, a device can comprise at least three cameras including one camera located at the 90-degree coordinate, one camera located at the 180-degree coordinate, and one camera located at the 270-degree coordinate. In another example, a device can further comprise electroconductive pathways (e.g. wires) which connect electronic components (e.g. displays and cameras) at different locations on its circumference.

In an example, a wrist-worn device (e.g. smart watch) with a camera can comprise: a band which is worn on a person's wrist and/or arm; an enclosure on the band; a movable arm (e.g. protrusion) on or in the enclosure, wherein the movable arm has a first configuration which is recessed with the enclosure and a second configuration which extends out from the enclosure in a plane which is tangential to the circumference of the band; a display on the enclosure; and a camera on the movable arm. In one embodiment, a central focal vector of a camera on the band can be colinear with a central imaging vector of a display on the band. In an example, a wrist-worn device (e.g. smart watch) with a camera can comprise: a band which is worn on a person's wrist and/or arm; a display on the band; and a camera on the band, wherein the central focal vector of the camera is orthogonal and/or perpendicular to the circumference of the band.

In an example, a wrist-worn device (e.g. smart watch) with a camera can comprise: a band worn around a person's wrist and/or arm; an enclosure on the band; a display on the enclosure; and a camera on the rim (e.g. narrow perimeter) of the enclosure, wherein the central focal vector of the camera is parallel to the plane of the central circumference of the band. In an example, a wrist-worn device (e.g. smart watch) with a camera can comprise: an arcuate band (e.g. watch band) which is worn around at least two-thirds of the circumference of a person's wrist and/or arm; an enclosure (e.g. watch housing) which is held on the dorsal side of the person's wrist and/or arm by the band; a display (e.g. watch display) on the enclosure; and a camera on a side (e.g. the rim and/or narrow lateral side) of the enclosure, wherein the camera can be moved to point outward in different directions (e.g. along different focal vectors from the center of the enclosure).

In another example, a wrist-worn device (e.g. smart watch) with a camera can comprise: a band which is worn on a person's wrist and/or arm; a display on the band; a rotatable turret, wherein the turret has first configuration in which it extends a first distance out from the band and a second configuration in which it extends a second distance out from the band, and wherein the second distance is greater than the first distance; and a camera on the rotatable turret. In an example, a wrist-worn device (e.g. smart watch) with a camera can comprise: a band which is worn on a person's wrist and/or arm; a display on the band; a rotatable turret which protrudes from the band, wherein the turret is located between the 135-degree and 225-degree coordinates; and a camera on the rotatable turret. In another example, a wrist-worn device (e.g. smart watch) with a camera can comprise: a band worn on a person's wrist and/or arm; an enclosure on the band; a display on the enclosure; a rotatable ring or bezel on the housing; an actuator; and a camera on the ring or bezel, wherein the ring or bezel is automatically rotated by the actuator to change the central focal vector of the camera.

In an example, a wrist-worn device (e.g. smart watch) with a camera can comprise: a band which is worn on a wrist and/or arm; an enclosure on the band; a display on the enclosure; and a camera on the band, wherein the display functions as a view finder for the camera. In another example, a wrist-worn device (e.g. smart watch) with a camera can comprise: an arcuate band worn around a person's wrist and/or arm; a display which is held on the dorsal side of the wrist and/or arm by the band; and a camera which is held on the ventral side of the wrist and/or arm by the band, wherein images recorded by the camera are shown by the display. In an example, a system can comprise: a band which is worn on a person's wrist and/or arm; a camera on the band; and augmented reality eyewear, wherein images recorded by the camera are shown to the person by the augmented reality eyewear. In an example, wherein images recorded by a camera on a wrist-worn device can be shown on a display in eyewear with which the wrist-worn device is in electronic communication.

In an example, a wrist-worn device (e.g. smart watch) with a camera can comprise: a band which is worn on a person's wrist and/or arm; an first enclosure on the band; a first display on the first enclosure; a camera on the rim (e.g. narrow lateral perimeter) of the first enclosure, wherein the camera is located between the 0-degree and 45-degree coordinates; a second enclosure on the band between the 225-degree and 315-degree coordinates; and a second display on the second enclosure, wherein images from the camera are shown on the second display. In one embodiment, a wrist-worn device (e.g. smart watch) with a camera can comprise: a band which is worn on a person's wrist and/or arm; a first display on a dorsal side of the band; a second display between the dorsal and ventral sides of the band, wherein the plane of the second display is perpendicular to the plane of the first display; a camera which is held between the dorsal and ventral sides of the band on the opposite side of the circumference of the band from the second display.

In another example, a wrist-worn device (e.g. smart watch) with a camera can comprise: an arcuate band worn around a person's wrist and/or arm; a primary display on the band between the 315-degree and 45-degree coordinates; a secondary display on the band between the 225-degree and 315-degree coordinates; and a camera on the band between the 45-degree and 135-degree coordinates, wherein images recorded by the camera can be shown by the secondary display. In an example, a device can further comprise a second display which is located between the 225-degree and 315-degree coordinates of the circumference of a person's wrist and/or arm.

In another example, a wrist-worn device (e.g. smart watch) with a camera can comprise: a band which is worn on a person's wrist and/or arm; an enclosure on the band; a pivoting component with a display which pivots, rotates, pops, and/or flips up from the enclosure; wherein one end of the display is movably-connected (e.g. via a joint, hinge, or axle) to the enclosure at a location between the 315-degree and 0-degree coordinates; and a camera on the opposite side of the pivoting component from the display. In another example, a wrist-worn device (e.g. smart watch) with a camera can comprise: a band which is worn on a person's wrist and/or arm; an enclosure on the band; a pivoting component with a display which pivots, rotates, pops, and/or flips up from the enclosure; wherein one end of the display is movably-connected (e.g. via a joint, hinge, or axle) to the enclosure at a location between the 45-degree and 90-degree coordinates; and a camera on the opposite side of the pivoting component from the display.

In an example, a wrist-worn device (e.g. smart watch) with a camera can comprise: a band which is worn on a person's wrist and/or arm; an enclosure which is held by the band on the dorsal side of the person's wrist and/or arm; a flip-up (e.g. flip-up, pop-up, pivoting, and/or rotatable) display on the enclosure, wherein the display is at least partially connected to the enclosure by a snap, clip, clasp, latch, prong, pin, spring, or magnet, wherein the display has a first configuration which is recessed into (or onto) the enclosure, wherein the display has a second configuration which extends out from the enclosure, and wherein the flip-up display is changed from the first configuration to the second configuration by finger pressure on the snap, clip, clasp, latch, prong, pin, spring, or magnet; and a camera on the enclosure.

In an example, a wrist-worn device (e.g. smart watch) with a camera can comprise: a band which is worn on a person's wrist and/or arm; a flip-up or pop-up enclosure on the band with a planoconvex cross-sectional shape, wherein the planoconvex shape is a portion of a quadrilateral with rounded-vertexes, wherein a straight edge of the enclosure is movably-connected to the band, wherein the enclosure has a first configuration in which the center of the enclosure is a first distance from the band, wherein the enclosure has a second configuration in which the center of the enclosure is a second distance from the band, wherein the second distance is greater than the first distance, and wherein the enclosure is changed from the first configuration to the second configuration by pivoting around the straight edge of the enclosure; a display on the enclosure; and a camera on the enclosure.

In an example, a wrist-worn device (e.g. smart watch) with a camera can comprise: a band which is worn on a person's wrist and/or arm; and a flip-up and/or pop-up component (e.g. enclosure, display, and/or camera) on the band; wherein the component has a planoconvex cross-sectional shape, and wherein a straight edge of the component is connected to the rest of the band via an axle, hinge, and/or joint. In an example, a wrist-worn device (e.g. smart watch) with a camera can comprise: a band which is worn on a person's wrist and/or arm; and a flip-up and/or pop-up component (e.g. enclosure, display, and/or camera) on the band; wherein one end of the component pivots out from the band toward the left side of the wrist and/or arm. In another example, a wrist-worn device (e.g. smart watch) with a camera can comprise: a band which is worn on a person's wrist and/or arm; a flip-up or pop-up enclosure on the band; a display on a first side of the enclosure; and a camera on a second side of the enclosure, wherein the second side is opposite the first side.

In an example, a wrist-worn device (e.g. smart watch) with a camera can comprise: a band which is worn on a person's wrist and/or arm; and a flip-up and/or pop-up component (e.g. enclosure, display, and/or camera) on the band; wherein the component unfolds and/or unrolls when it extends out from the band. In another example, a wrist-worn device (e.g. smart watch) with a camera can comprise: a band worn on a person's wrist and/or arm; an enclosure on the band; a pivoting (e.g. pivoting, rotating, pop-up, or flip-up) component on the enclosure, wherein the pivoting component has a first configuration in which it is recessed into the enclosure and a second configuration in which it extends out from the enclosure; a display on a first side of the pivoting component; and a camera on a second side of the pivoting component, wherein the second side is opposite the first side.

In one embodiment, a flip-up and/or pop-up component (e.g. enclosure, display, or camera) on a wrist-worn device can further comprise two sections which unfold into a coplanar configuration when the components extend out from the device. In an example, a flip-up and/or pop-up component (e.g. enclosure, display, or camera) on a wrist-worn device can have one end which pivots out from the device in a proximal direction (e.g. toward a person's elbow and away from their fingers). In one embodiment, a flip-up and/or pop-up component (e.g. enclosure, display, or camera) on a wrist-worn device can unroll as it extends out from the device. In an example, a second section of an enclosure can flip out, pop out, pivot, and/or rotate away from a band in a second configuration.

In another example, a wrist-worn device (e.g. smart watch) with a camera can comprise: a band which is worn around a person's wrist and/or arm; a display on the band; wherein the band further comprises a first band section and a second band section; wherein the first band section is closer to the surface of the wrist and/or arm than the second band section, wherein the band has a first configuration in which the second band section overlaps (and is contiguous with) the first band section, wherein the band has a second configuration in which one end of the second band section pivots, rotates, and/or extends out away from the first band section; and a camera on the second band section.

In an example, a wrist-worn device (e.g. smart watch) with a camera can comprise: a band which is worn on a person's wrist and/or arm; a pivoting enclosure with a planoconvex cross-sectional shape on the band, wherein a straight side of the enclosure is pivotably-connected (e.g. by an axle) to the band and a convex side of the enclosure can be pivoted out (e.g. up) from the band; a display on the pivoting enclosure; and a camera on the pivoting enclosure. In another example, a wrist-worn device (e.g. smart watch) with a camera can comprise: a band which is worn on a person's wrist and/or arm; a pivoting enclosure on the band, wherein the pivoting enclosure has a first configuration on the dorsal side of the wrist and/or arm and a second configuration on a lateral (e.g. between dorsal and ventral) side of the wrist and/or arm; two displays on opposite sides of the pivoting enclosure; and a camera on the pivoting enclosure and/or the band.

In an example, a wrist-worn device (e.g. smart watch) with a camera can comprise: a band which is worn on a person's wrist and/or arm; a pivoting enclosure on the band, wherein the pivoting enclosure has a first configuration between the 315-degree and 45-degree coordinates and a second configuration between the 270-degree and 315-degree coordinates; two displays on opposite sides of the pivoting enclosure; and a camera on the pivoting enclosure and/or the band. In another example, a wrist-worn device (e.g. smart watch) with a camera can comprise: a band which is worn on a person's wrist and/or arm; a pivoting enclosure on the band; a display on a first side of the enclosure; and a camera on a second side of the enclosure, wherein the second side is perpendicular to the first side.

In an example, a wrist-worn device (e.g. smart watch) with a camera can comprise: an arcuate band (e.g. watch band) which is worn around at least two-thirds of the circumference of a person's wrist and/or arm; an enclosure (e.g. watch housing) which is held on the dorsal side of the person's wrist and/or arm by the band; a pivoting arm which pivots (e.g. pivots, rotates, and/or pops) up and/out from the enclosure; a display (e.g. watch face) on the pivoting arm; and a camera on the pivoting arm, wherein images recorded by the camera are shown on the display.

In an example, a wrist-worn device (e.g. smart watch) with a camera can comprise: an arcuate band (e.g. watch band) which is worn around at least two-thirds of the circumference of a person's wrist and/or arm; a pivoting enclosure (e.g. watch housing) which is held on the dorsal side of the person's wrist and/or arm by the band, wherein the pivoting enclosure has a first configuration in which the enclosure is primarily on the dorsal side of the wrist and/or arm, wherein the pivoting enclosure has a second configuration in which the enclosure is primarily on a side of the wrist and/or arm between the dorsal and ventral sides of the wrist and/or arm, and wherein the pivoting enclosure is pivoted (e.g. pivoted and/or rotated) from the first configuration to the second configuration; a first display on a first side of the pivoting enclosure; a second display on a second side of the pivoting enclosure; and a camera which is held between the dorsal and ventral sides of the person's wrist and/or arm by the band, wherein images recorded by the camera are shown on the first display when the pivoting enclosure is in the first configuration and are shown on the second display when the pivoting enclosure is in the second configuration.

In an example, a wrist-worn device (e.g. smart watch) with a camera can comprise: an arcuate band (e.g. watch band) which is worn around at least two-thirds of the circumference of a person's wrist and/or arm; an enclosure (e.g. watch housing) which is held on the dorsal side of the person's wrist and/or arm by the band; wherein the enclosure further comprises a first section which is stationary relative to the band; a pivoting and/or sliding second section; and a pivoting and/or sliding third section; wherein the enclosure has a first configuration in which the first section, the second section, and the third section are substantially parallel to each other; and wherein the enclosure has a second configuration in which the first section, the second section, and the third section are not substantially parallel and the enclosure protrudes out from the band; a display on the second section; and a camera on the third section, wherein images recorded by the camera are shown on the display.

In one embodiment, a wrist-worn device (e.g. smart watch) with a camera can comprise: a band that is worn on a person's wrist and/or arm; an enclosure on the band; a display which is connected to the enclosure, wherein the display has a first configuration which is parallel to the enclosure and a second configuration which is tilted relative to the enclosure; and a camera on the display. In an example, a wrist-worn device (e.g. smart watch) with a camera can comprise: a band which is worn on a person's wrist and/or arm; a motion sensor; and a camera; wherein the camera has a first configuration with a first orientation and/or central focal vector, wherein the camera has a second configuration with a second orientation and/or central focal vector, and wherein the camera is automatically changed from the first configuration to the second configuration based on analysis of data from the motion sensor in order to remain focused on an environmental object as the band moves.

In one embodiment, a wrist-worn device (e.g. smart watch) with a camera can comprise: a band which is worn on a person's wrist and/or arm; a flexible arcuate arm which spans a portion of the circumference of the band; a display on the flexible arcuate arm; and a camera on the flexible arcuate arm; wherein the flexible arcuate arm has a first configuration in which the arm is a first average distance from the band; wherein the flexible arcuate arm has a second (extended) configuration in which the arm is a second average distance from the band; and wherein the second average distance is greater than the first average distance.

In an example, a wrist-worn device (e.g. smart watch) with a camera can comprise: a band which is worn on a person's wrist and/or arm; a flexible arcuate arm which spans a portion of the circumference of the band; a display on the flexible arcuate arm; and a camera on the flexible arcuate arm; wherein the flexible arcuate arm has a first configuration in which a first (retracted) portion of the arm is in contact with the band; wherein the flexible arcuate arm has a second (extended) configuration in which a second portion of the arm is in contact with the band; and wherein the second portion is less than half of the first portion. In another example, a wrist-worn device (e.g. smart watch) with a camera can comprise: a band worn on a person's wrist and/or arm; an enclosure on the band; a folding display on the enclosure, wherein the folding display has an unfolded configuration in which it protrudes a first distance from the band and a folded configuration in which it protrudes a second distance from the band, wherein the second distance is greater than the first distance; and a camera on the display and/or on the band.

In an example, a wrist-worn device (e.g. smart watch) with a camera can comprise: a band worn on a person's wrist and/or arm; an enclosure on the band, wherein the enclosure has a first configuration in which it is attached to the band at two ends and a second configuration in which it is attached to the band at only one end, and wherein the enclosure is changed from the first configuration to the second configuration by finger pressure on a snap, clasp, clip, latch, pin, plug, buckle, or hook-and-loop material; a display on the enclosure; and a camera on the enclosure.

In another example, a wrist-worn device (e.g. smart watch) with a camera can comprise: a band worn on a person's wrist and/or arm; an enclosure on the band; a two-part pop-up component on the enclosure, wherein the pop-up component has a recessed configuration in which a first part of the pop-up component and a second part of the pop-up component are parallel to each other, and wherein the pop-up component has an extended configuration in which the planes of the first part of the pop-up component and the second part of the pop-up component intersect at an obtuse angle; a display on the first part of the pop-up component; and a camera on the second part of the pop-up component.

In an example, a wrist-worn device (e.g. smart watch) with a camera can comprise: an arcuate band which is worn on a person's wrist and/or arm; an enclosure which is held on a dorsal side of the person's wrist and/or arm by the band, wherein the enclosure further comprises a first section and a second section, wherein the enclosure has a first configuration in which the center of the second section is a first distance from the band, wherein the enclosure has a second configuration in which the center of the second section is a second distance from the band, and wherein the second distance is greater than the first distance; a display on the second section; and a camera on the second section. In an example, an enclosure can further comprises a third section which is connected to a second section, wherein the center of the third section is farther from a band in the second configuration than in a first configuration.

In an example, a display can have a convex (e.g. circular, oval, or ellipsoidal) shape. In one embodiment, a straight side of a second section of an enclosure can be connected to a first section of the enclosure by a hinge, axle, or joint. In an example, a device can be a modular watch band which can be used with (and electronically linked to) different types and/or brands of smart watch housings. In another example, a device can comprise the combination of a modular enclosure and a modular band, wherein the modular enclosure can be used with other bands and the modular band can be used with other enclosures.

In one embodiment, a device can comprise a band with at least four connection ports at different locations around the circumference of the band, wherein one or more modular electronic components can be plugged into one or more of these connection ports, and wherein modular electronic components are selected from the group consisting of: camera, display, battery, light emitter, light receiver, spectroscopic sensor, motion sensor, or other sensor. In another example, a device can comprise a band with connection ports at different locations around the circumference of the band, wherein one or more modular electronic components can be plugged into one or more of these connection ports, and wherein modular electronic components are selected from the group consisting of: camera, display, battery, light emitter, light receiver, spectroscopic sensor, motion sensor, or other sensor.

In an example, a wrist-worn device (e.g. smart watch) with a camera can comprise: a band that is worn on a person's wrist and/or arm; an enclosure on the band; a display on the enclosure; and a camera, wherein the camera has a first configuration in which it is attached to the enclosure and a second configuration in which it is detached from the enclosure; and a cable, wire, or cord which is connected the camera and connected to the band in both the first configuration and the second configuration. In an example, a wrist-worn device (e.g. smart watch) with a camera can comprise: a band that is worn on a person's wrist and/or arm; a display on the band; and a camera, wherein the camera has a first configuration in which it is attached to the band and a second configuration in which it is detached from the band.

In an example, a wrist-worn device (e.g. smart watch) with a camera can comprise: a band which is work on a person's wrist and/or arm, wherein the band has a circumferential array of connection ports or sockets; an enclosure, wherein the band provides electronic communication pathways (e.g. wires) between the enclosure and the connection ports or sockets; a display on the enclosure; and a camera which can be selectively and detachably plugged into any of the ports or sockets in the array, wherein images recorded by the camera are transmitted to the display via the communication pathway when the camera is plugged into a connection port or socket.

In an example, a wrist-worn device (e.g. smart watch) with a camera can comprise: a band which is worn on a person's wrist and/or arm; an enclosure on the band; a display on the enclosure; a camera on the band; and a track or channel around at least a portion of the circumference of the band, wherein the camera slides along the track or channel to different locations on the circumference of the band, and a locking mechanism wherein the camera can be reversibly-locked at a location on the circumference of the band. In an example, a wrist-worn device (e.g. smart watch) with a camera can comprise: a band which is worn on a person's wrist and/or arm, wherein there is an arcuate array of ports, slots, openings, or holes on the band which spans at least half of the circumference of the band; a modular display which can be removably-attached to a first port, slot, opening, or hole selected from the array; and a modular camera which can be removably-attached to a second port, slot, opening, or hole selected from the array. In another example, a device can further comprise a locking mechanism which reversibly locks a display in a second configuration at a selected angle, wherein the locking mechanism is selected from the group consisting of: snap, clip, clasp, latch, prong, pin, spring, and magnet.

In an example, a wrist-worn device (e.g. smart watch) with a camera can comprise: a band which is worn on a person's wrist and/or arm; a display on the band; and a camera on the band, wherein the circumferential coordinate of the camera can be manually changed. In another example, a wrist-worn device (e.g. smart watch) with a camera can comprise: a band which is worn on a person's wrist and/or arm; a sliding enclosure on the band, wherein the sliding enclosure has a first configuration on the dorsal side of the wrist and/or arm and a second configuration on a lateral (e.g. between dorsal and ventral) side of the wrist and/or arm, and wherein the enclosure slides from the first configuration to the second configuration; a display on the sliding enclosure; and a camera on the sliding enclosure and/or the band.

In one embodiment, a wrist-worn device (e.g. smart watch) with a camera can comprise: a band which is worn on a person's wrist and/or arm; a display on the band; a camera on the band; and a locking mechanism; wherein the band has a first configuration in which the camera is locked by the locking mechanism at a selected circumferential coordinate on the band, wherein the band has a second configuration in which the camera is unlocked and able to slide (e.g. along a track or channel) around the circumference of the band to different circumferential coordinates on the band, and wherein the band is changed from the first configuration to the second configuration by a finger pressing on the locking mechanism.

In an example, a wrist-worn device (e.g. smart watch) with a camera can comprise: a band which is worn on a person's wrist and/or arm; an enclosure on the band; a display on the enclosure; a circumferential track or channel on the band; and a camera which slides circumferentially along the track or channel. In one embodiment, a wrist-worn device (e.g. smart watch) with a camera can comprise: a band which is worn on a person's wrist and/or arm; an enclosure on the band; a display on the enclosure; a track (or channel) around at least a portion of the circumference of the band; a sliding camera with a locking mechanism, wherein the camera can slide along the track (or channel) to different locations on the band or be located by the locking mechanism at a specific location on the band.

In an example, a wrist-worn device (e.g. smart watch) with a camera can comprise: a band which is worn on a person's wrist and/or arm; a display on the band; and a camera on the band, wherein the circumferential coordinate of the camera can be manually changed by sliding the camera along a track or channel around a portion of the circumference of the band, wherein the track or channel is in the center of the width of the band. In an example, a wrist-worn device (e.g. smart watch) with a camera can comprise: a band which is worn on a person's wrist and/or arm; a display on the band; and a camera on the band, wherein the camera can slide along a track or channel which spans at least 50% of the circumference of the person's wrist and/or arm. In another example, a wrist-worn device (e.g. smart watch) with a camera can comprise: an arcuate band (e.g. watch band) which is worn around at least two-thirds of the circumference of a person's wrist and/or arm; an enclosure (e.g. watch housing) which is held on the dorsal side of the person's wrist and/or arm by the band; a display (e.g. watch face) on the enclosure; and a camera which can be moved (e.g. slid) to different positions around a portion of the circumference.

In an example, a wrist-worn device (e.g. smart watch) with a camera can comprise: an inner band which is worn on a person's wrist and/or arm; an outer band which is worn on the person's wrist and/or arm, wherein the inner band is at least partially nested within the circumference of the outer band; an enclosure on the outer band; a display on the enclosure; and a camera on the enclosure, wherein the enclosure can be moved (e.g. pivoted and/or rotated) away from the inner band while remaining connected to the outer band.

In another example, a wrist-worn device (e.g. smart watch) with a camera can comprise: an inner band which is worn around at least two-thirds of a person's wrist and/or arm; an outer band which is worn around at least two-thirds of the person's wrist and/or arm, wherein the outer band is farther from the surface of the person's wrist and/or arm than the inner band, and wherein the outer band is more elastic and/or flexible than the inner band; an enclosure on the outer band; a display on the enclosure; and a camera on the enclosure; wherein the device has a first configuration in which the outer band is connected to the inner band at a first number of locations, wherein the device has a second configuration in which the outer band is connected to the inner band at a second number of locations, wherein the second number is less than the first number, wherein the device can be manually changed between the first configuration and the second configuration, and wherein the enclosure can be tilted, pivoted, and/or rotated relative to the wrist and/or arm in the second configuration so that the central focal vector of the camera can be pointed in different directions without the person having to contort their wrist and/or arm.

In an example, a wrist-worn device (e.g. smart watch) with a camera can comprise: an inner band which is worn on a person's wrist and/or arm; a foldable two-section enclosure on the band, wherein the foldable two-section enclosure has a recessed configuration in which two ends of the foldable enclosure which are connected to the band are a first distance apart from each other, wherein the foldable two-section enclosure has an extended configuration in which the two ends are a second distance apart from each other, wherein the second distance is less than the first distance; a display on a first section of the foldable two-section enclosure; and a camera on a second section of the foldable two-section enclosure.

In another example, a wrist-worn device (e.g. smart watch) with a camera can comprise: an inner band which is worn around at least two-thirds of a person's wrist and/or arm; an outer band which is worn around at least two-thirds of the person's wrist and/or arm, wherein the outer band is farther from the surface of the person's wrist and/or arm than the inner band, and wherein the outer band is more elastic and/or flexible than the inner band; an enclosure on the inner band or outer band; a display on the enclosure; and a camera on the enclosure; wherein the device has a first configuration in which the outer band is connected to the inner band at a first number of locations, wherein the device has a second configuration in which the outer band is connected to the inner band at a second number of locations, wherein the second number is less than the first number, and wherein the device can be manually changed between the first configuration and the second configuration.

In an example, a wrist-worn device (e.g. smart watch) with a camera can comprise: an inner band which is worn around at least two-thirds of a person's wrist and/or arm; an outer band which is worn on the person's wrist and/or arm, wherein the outer band spans less of the circumference of the person's wrist and/or arm than the inner band, and wherein the outer band is more flexible, elastic, and/or undulating than the inner band; a display on the outer band; and a camera on the outer band. In an example, a device can have a first configuration in which an outer band is connected to an inner band at a first number of locations and a second configuration in which the outer band is connected to the inner band at a second number of locations, wherein the second number is less than the first number. In another example, an outer band can be more flexible, elastic, and/or undulating than an inner band.

In one embodiment, a wrist-worn device (e.g. smart watch) with a camera can comprise: a band which is worn on a person's wrist and/or arm; an enclosure on the band, wherein the enclosure can be rotated relative to the band; a display on the enclosure; and a camera on the enclosure. In another example, a wrist-worn device (e.g. smart watch) with a camera can comprise: a band which is worn on a person's wrist and/or arm; an enclosure on the band, wherein the enclosure can be rotated around its center; a display on the enclosure; and a camera on the enclosure. In an example, a wrist-worn device (e.g. smart watch) with a camera can comprise: a band worn on a person's wrist and/or arm, wherein the band further comprises an inner rotatable ring around the circumference of the band; an enclosure on the ring; a display on the enclosure; and a camera on the enclosure.

In another example, a wrist-worn device (e.g. smart watch) with a camera can comprise: a band worn on a person's wrist and/or arm, wherein the band further comprises a rotatable ring around the circumference of the band; an enclosure on the ring; a display on the enclosure; and a camera on the enclosure. In one embodiment, a wrist-worn device (e.g. smart watch) with a camera can comprise: a band worn on a person's wrist and/or arm, wherein the band further comprises a rotatable partial ring around a portion of the circumference of the band; an enclosure on the ring; a display on the enclosure; and a camera on the enclosure. In an example, a wrist-worn device (e.g. smart watch) with a camera can comprise: a display; a first band (or ring) worn on a person's wrist and/or arm; a second band (or ring) worn on the person's wrist and/or arm; wherein the first band and the second band are nested and/or concentric, wherein the first band is closer to the surface of the person's wrist and/or arm than the second band, and wherein the second band can be rotated (at least partially) around the first band; and a camera on the second band.

In an example, a wrist-worn device (e.g. smart watch) with a camera can comprise: a first band which is worn around a person's wrist and/or arm; a second band which is worn around the person's wrist and/or arm, wherein plane of the first band and the plane of the second band are parallel to each other, wherein the first band and the second band are movably-connected in a manner which enables one band (e.g. the first band) to rotate relative to the other band (e.g. the second band); a display on the first band; and a camera on the second band. In an example, a wrist-worn device (e.g. smart watch) with a camera can comprise: a two-ring band which is worn on a person's wrist and/or arm; wherein the two-ring band further comprises a first ring and a second ring, wherein the plane of the second ring and the plane of the first ring are parallel, wherein the second ring is closer to the person's elbow than the second ring, and wherein the second ring is connected to the first ring in a manner which enables the second ring to rotate relative to the first ring; a display on the first ring; and a camera on the second ring.

In an example, a wrist-worn device (e.g. smart watch) with a camera can comprise: a bifurcating band which is worn on a person's wrist and/or arm; an enclosure on the band, wherein portions of the band which connect to the enclosure bifurcate, thereby creating a gap, opening, and/or hole in the portions of the band which are connected to the enclosure; a display on the enclosure; and a camera on the rim (e.g. narrow perimeter) of the enclosure. In another example, a gap, opening, and/or hole between the branches of a bifurcating portion of a band can be have a half-elliptical shape. In an example, a gap, opening, and/or hole in a bifurcating band can have a conic-section shape. In another example, bifurcating branches of a band near an enclosure can be symmetric with respect to the plane of a central (with respect to width) circumference of the band. In one embodiment, the width of a gap, opening, and/or hole between the branches of a bifurcating portion of a band can be between 50% and 90% of the width of non-bifurcating portions the band. In an example, the thickness of an enclosure held on a wrist and/or arm by a band can be no more than three times the thickness of the band.

In one embodiment, a wrist-worn device (e.g. smart watch) with a camera can comprise: a band which is worn on a person's wrist and/or arm; an enclosure which is held by the band on the dorsal side of the person's wrist and/or arm; a flip-up (e.g. flip-up, pop-up, pivoting, and/or rotatable) display with a first configuration which is recessed into (or onto) the enclosure and a second configuration which extends out from the enclosure, wherein the flip-up display is changed from its first configuration to its second configuration by finger pressure on a portion of the display; and a camera on the display, enclosure, and/or band; wherein the camera is activated to start recording images when the display is changed from the first configuration to the second configuration.

In an example, a wrist-worn device (e.g. smart watch) with a camera can comprise: a band which is worn on a person's wrist and/or arm; an enclosure on the band; a display on the enclosure; a motion sensor in the enclosure; and a camera on the enclosure; wherein the camera is triggered to start recording images by detection of a first gesture and/or motion from analysis of data from the motion sensor and wherein the camera is triggered to stop recording images by detection of a second gesture and/or motion from analysis of data from the motion sensor. In an example, a wrist-worn device (e.g. smart watch) with a camera can comprise: a band which is worn on a person's wrist and/or arm; an enclosure on the band; a display on the enclosure; a motion sensor in the enclosure; and a camera on the band; wherein the camera is activated to start and stop recording images by detection of selected gestures and/or motions from analysis of data from the motion sensor. In another example, a wrist-worn device (e.g. smart watch) with a camera can comprise: a band which is worn on a person's wrist or arm; an enclosure on the band, a display on the enclosure; a motion sensor; and a camera on the enclosure or the band, wherein the camera is activated by a gesture detected by analysis of data from the motion sensor.

In an example, a wrist-worn device (e.g. smart watch) with a camera can comprise: a band which is worn on a person's wrist and/or arm; a motion sensor; an actuator; and a camera; wherein the camera has a first configuration with a first orientation and/or central focal vector, wherein the camera has a second configuration with a second orientation and/or central focal vector, and wherein the camera is changed from the first configuration to the second configuration by the actuator based on analysis of data from the motion sensor. In another example, a wrist-worn device (e.g. smart watch) with a camera can comprise: a band which is worn on a person's wrist and/or arm; and a camera; wherein the camera has a first configuration with a first orientation and/or central focal vector, wherein the camera has a second configuration with a second orientation and/or central focal vector, and wherein the camera is changed from the first configuration to the second configuration by the actuator in order to remain focused toward a selected object in the environment (e.g. food) as the band moves.

In an example, a wrist-worn device (e.g. smart watch) with a camera can comprise: a band which is worn on a person's wrist and/or arm; a camera on the band; and an actuator; wherein the actuator moves the focal vector of the camera to maintain a constant focus on a selected object in the environment even when the based moves based on real-time analysis of images from the camera. In another example, a wrist-worn device (e.g. smart watch) with a camera can comprise: a band which is worn on a person's wrist and/or arm; a camera on the band; and an actuator; wherein the actuator moves the focal vector of the camera to maintain a constant focal direction relative to the environment even when the based moves based on real-time analysis of images from the camera. In an example, a wrist-worn device (e.g. smart watch) with a camera can comprise: a band which is worn on a person's wrist and/or arm, wherein the band has a track or channel around at least a portion of its circumference; and an outward-facing camera which is automatically moved by an actuator along the track or channel to different locations on the circumference of the band.

In an example, a wrist-worn device (e.g. smart watch) with a camera can comprise: a band which is worn on a person's wrist and/or arm; a display on the band; a camera on the band; a motion sensor on the band; and an actuator on the band; wherein the actuator moves the camera to keep the camera focused on a selected object in the environment even when the band moves. In one embodiment, a wrist-worn device (e.g. smart watch) with a camera can comprise: a band which is worn on a person's wrist and/or arm; a display on the band; a camera on the band; a motion sensor on the band; an actuator on the band; and a mirror from which the camera records images, wherein the actuator moves the mirror to keep the camera focused in the same direction relative to the environment even when the band moves.

In an example, a wrist-worn device (e.g. smart watch) with a camera can comprise: a band which is worn on a person's wrist and/or arm; a display on the band; a camera on the band; a motion sensor on the band; and an actuator on the band; and a lens (or prism) through which the camera records images, wherein the actuator moves the lens (or prism) to a selected environmental object in images recorded by the camera. In one embodiment, a wrist-worn device (e.g. smart watch) with a camera can comprise: a band worn on a person's wrist and/or arm; an enclosure on the band; a display on the enclosure; a camera on the enclosure and/or on the band; a lens or mirror; and an actuator; wherein the focal direction of the camera is changed by movement of the lens or mirror, and wherein the lens or mirror is moved by the actuator. In an example, a device can further comprise an actuator which moves an enclosure and/or display from a first (e.g. retracted) configuration to a second (e.g. extended) configuration. In another example, a wrist-worn device (e.g. smart watch) with a camera can comprise: a band which is worn on a person's wrist and/or arm; an enclosure on the band; a display on the enclosure; a rotating bezel or ring on the enclosure; and a camera on the band, wherein the focal zoom of the camera is changed by rotation of the bezel or ring.

In an example, a device can be embodied in a smart watch and/or watch band. In another example, a device can be embodied in a wrist bracelet. In an example, a wrist-worn device (e.g. smart watch) with a camera can comprise: a band worn around a person's wrist and/or arm; an enclosure on the band; a display on the outward-facing side of the enclosure; and a camera on the rim (e.g. narrow perimeter) of the enclosure. In an example, a wrist-worn device (e.g. smart watch) with a camera can comprise: a band which is worn on a person's wrist and/or arm; an enclosure which is held by the band on the dorsal side of the person's wrist and/or arm; a display on the enclosure; a connection mechanism (e.g. a buckle, clasp, snap, button, or pin) which connects ends of the band on the ventral side of the person's wrist and/or arm; and a camera on the connection mechanism. In an example, a wrist-worn device (e.g. smart watch) with a camera can comprise: a band worn on a person's wrist and/or arm; a display on the band; and a camera on the band between the 135-degree and 225-degree coordinates.

In an example, a device can comprise at least two cameras including one camera located at the 90-degree coordinate and one camera located at the 270-degree coordinate. In one embodiment, a device can comprise at least two cameras including one camera located at between the 45-degree and 135-degree coordinates and one camera located between the 225-degree and 315-degree coordinates. In an example, a wrist-worn device (e.g. smart watch) with a camera can comprise: a band which is worn on a person's wrist and/or arm; a first enclosure which is held by the band on the dorsal side of the person's wrist and/or arm; a first display on the first enclosure; a first camera on the first enclosure; a second enclosure which is held by the band on the ventral side of the person's wrist and/or arm; a second display on the second enclosure; and a second camera on the second enclosure; wherein images recorded by the first camera and the second camera are simultaneously shown on the first display.

In another example, a wrist-worn device (e.g. smart watch) with a camera can comprise: a band which is worn on a person's wrist and/or arm; an enclosure on the band which is centered on a first circumferential coordinate of the band; a display on the enclosure; a first camera on the enclosure; and a second camera on the band which is centered on a second circumferential coordinate of the band, wherein the second coordinate is 180-degrees away from the first coordinate. In one embodiment, a wrist-worn device (e.g. smart watch) with a camera can comprise: a band which is worn on a person's wrist and/or arm; an enclosure on the band which is centered on a first circumferential coordinate of the band; a display on the enclosure; a first camera on the enclosure; and a second camera on the band which is centered on a second circumferential coordinate of the band, wherein the second coordinate is between 45 and 135 degrees away from than the first coordinate.

In another example, a wrist-worn device (e.g. smart watch) with a camera can comprise: a band which is worn on a wrist and/or arm; a first camera on the band at the 90-degree coordinate; and a second camera on the band at the 270-degree coordinate. In another example, a wrist-worn device (e.g. smart watch) with a camera can comprise: a band worn around a person's wrist and/or arm; an enclosure on the band; a display on the outward-facing side of the enclosure; a first camera on the rim (e.g. narrow perimeter) of the enclosure, and a second camera on the rim of the enclosure, wherein the second camera is on a different side of the enclosure from the first camera. In an example, a wrist-worn device (e.g. smart watch) with a camera can comprise: a band worn on a person's wrist and/or arm; a display on the band; a first camera on the band between the 45-degree and 135-degree coordinates; and a second camera on the band between the 135-degree and 225-degree coordinates.

In an example, a wrist-worn device (e.g. smart watch) with a camera can comprise: an arcuate band (e.g. watch band) which is worn around at least two-thirds of the circumference of a person's wrist and/or arm; an enclosure (e.g. watch housing) which is held on the dorsal side of the person's wrist and/or arm by the band; a display (e.g. watch display) on the enclosure; a first camera which is held between the dorsal and ventral sides of the person's wrist and/or arm by the band; and a second camera which is held between on the ventral side of the person's wrist and/or arm by the band. In an example, a device can further comprise a second camera which is located between the 45-degree and 135-degree coordinates of the circumference of a person's wrist and/or arm.

In an example, a device can comprise an array of outward-facing cameras which are distributed around at least two-thirds of the circumference of a person's wrist and/or arm. In an example, a wrist-worn device (e.g. smart watch) with a camera can comprise: a band which is worn on a wrist and/or arm; a plurality of displays at different locations on the circumference of the band; a plurality of cameras at different locations on the circumference of the band; and a motion sensor; wherein the selection of camera images are shown on which displays is controlled by the orientation of the band based on analysis of data from the motion sensor.

In an example, a wrist-worn device (e.g. smart watch) with a camera can comprise: a band that is worn on a person's wrist and/or arm; an enclosure on the band; and a movable arm which is connected to the enclosure, wherein a first plane best fits the movable arm when the arm is in a first configuration, wherein a second plane best fits the movable arm when the arm is in a second configuration, wherein a third plane best fits the enclosure, wherein the first plane is parallel to the third plane, and wherein the second plane intersects the third plane at an acute angle; a display on the movable arm; and a camera on the movable arm. In another example, a wrist-worn device (e.g. smart watch) with a camera can comprise: a band which is worn on a person's wrist and/or arm; an enclosure on the band; a display on the enclosure; a movable arm (e.g. protrusion) on or in the enclosure, wherein the movable arm has a first configuration which is recessed with the enclosure and a second configuration which extends out from the enclosure in a plane which is parallel to the plane of the display; and a camera on the movable arm.

In one embodiment, a central focal vector of a camera on the band can be parallel to a central imaging vector of a display on the band. In another example, a wrist-worn device (e.g. smart watch) with a camera can comprise: a band which is worn on a person's wrist and/or arm; a display on the band; and a camera on the band, wherein the central focal vector of the camera is colinear with a radial vector extending out from the virtual center of the band. In an example, a wrist-worn device (e.g. smart watch) with a camera can comprise: a band worn around a person's wrist and/or arm; an enclosure on the band; a display on the enclosure; and a camera on the rim (e.g. narrow perimeter) of the enclosure, wherein the central focal vector of the camera is parallel to a line which is tangential to the circumference of the band.

In one embodiment, a wrist-worn device (e.g. smart watch) with a camera can comprise: a band which is worn on a person's wrist or arm; an enclosure on the band; a display on the enclosure; a rotating bezel or ring on the enclosure; and a camera on the rotating bezel or ring. In an example, a wrist-worn device (e.g. smart watch) with a camera can comprise: a band which is worn on a person's wrist and/or arm; a display on the band; a rotatable turret which protrudes from the band; and a camera on the rotatable turret. In an example, a wrist-worn device (e.g. smart watch) with a camera can comprise: a band which is worn on a person's wrist or arm; an enclosure on the band, a display on the enclosure; a rotatable protrusion (e.g. rotatable turret) which extends out from the enclosure; and a camera on the rotatable protrusion. In an example, a wrist-worn device (e.g. smart watch) with a camera can comprise: a band worn on a person's wrist and/or arm; a rotatable enclosure on the band; a display on the enclosure; and one or more cameras on the rim (e.g. narrow lateral perimeter) of the enclosure.

In another example, a wrist-worn device (e.g. smart watch) with a camera can comprise: a band which is worn on a wrist and/or arm; an enclosure on the band; a display on the enclosure; and a camera on the enclosure, wherein the display functions as a view finder for the camera. In an example, a wrist-worn device (e.g. smart watch) with a camera can comprise: an arcuate band worn around a person's wrist and/or arm; a display on the band between the 315-degree and 45-degree coordinates; and a camera on the band between the 135-degree and 225-degree coordinates, wherein images recorded by the camera are shown by the display. In another example, a system can comprise: a band which is worn on a person's wrist and/or arm; a camera on the band; and a phone, wherein images recorded by the camera are shown on the phone.

In an example, a wrist-worn device (e.g. smart watch) with a camera can comprise: a band which is worn on a person's wrist and/or arm; a first enclosure which is held on a dorsal side of the person's wrist and/or arm by the band; a second enclosure which is held between the dorsal and ventral sides of the person's wrist and/or arm by the band, wherein the plane of the secondary enclosure is orthogonal to the plane of the first enclosure; a third enclosure which is held between the dorsal and ventral sides of the person's wrist and/or arm by the band, wherein the plane of the third enclosure is orthogonal to the plane of the first enclosure; a first display on the first enclosure; a second display on the second enclosure; and a camera on the third enclosure.

In an example, a wrist-worn device (e.g. smart watch) with a camera can comprise: a band which is worn on a person's wrist and/or arm; an first enclosure on the band; a first display on the first enclosure between the 315-degree ad 45-degree coordinates; a camera on the rim (e.g. narrow lateral perimeter) of the first enclosure, wherein the camera is located between the 0-degree and 45-degree coordinates; a second enclosure on the band between the 225-degree and 315-degree coordinates; and a second display on the second enclosure, wherein images from the camera are shown on the second display.

In one embodiment, a wrist-worn device (e.g. smart watch) with a camera can comprise: an arcuate band (e.g. a watch band) which is worn around at least two-thirds of the circumference of a person's wrist and/or arm; a first enclosure (e.g. primary housing) which is held on the dorsal side of the person's wrist and/or arm by the band; a first display (e.g. primary display) on the first enclosure; a second enclosure (e.g. secondary housing) which is held between the dorsal and ventral sides of the person's wrist and/or arm by the band; a second display (e.g. secondary display) on the second enclosure; and a camera which is held between the dorsal and ventral sides of the person's wrist and/or arm by the band, wherein the camera is on the opposite side of the band from the second enclosure, and wherein images recorded by the camera are displayed on the second display.

In an example, a wrist-worn device (e.g. smart watch) with a camera can comprise: an arcuate band worn around a person's wrist and/or arm; a primary display on the band between the 315-degree and 45-degree coordinates; a secondary display on the band between the 225-degree and 315-degree coordinates, wherein the secondary display is smaller than the primary display; and a camera on the band between the 45-degree and 135-degree coordinates, wherein images recorded by the camera can be shown by the secondary display.

In one embodiment, a band with a flip-up or pop-up component (e.g. enclosure and/or display) can include a locking mechanism which enables the component to be selectively locked at a 45, 60, 75, or 90 degree angle relative to the band. In an example, a wrist-worn device (e.g. smart watch) with a camera can comprise: a band which is worn on a person's wrist and/or arm; an enclosure on the band; a pivoting component with a display which pivots, rotates, pops, and/or flips up from the enclosure; wherein one end of the display is movably-connected (e.g. via a joint, hinge, or axle) to the enclosure at a location between the 0-degree and 45-degree coordinates; and a camera on the opposite side of the pivoting component from the display. In another example, a wrist-worn device (e.g. smart watch) with a camera can comprise: a band which is worn on a person's wrist and/or arm; an enclosure on the band; a pivoting component with a display which pivots, rotates, pops, and/or flips up from the enclosure; and a camera on the opposite side of the pivoting component from the display.

In an example, a wrist-worn device (e.g. smart watch) with a camera can comprise: a band which is worn on a person's wrist and/or arm; an enclosure which is held by the band on the dorsal side of the person's wrist and/or arm; a flip-up (e.g. flip-up, pop-up, pivoting, and/or rotatable) display on the enclosure, wherein the display is at least partially connected to the enclosure by a snap, clip, clasp, latch, prong, pin, spring, or magnet, wherein the display has a first configuration which is recessed into (or onto) the enclosure, wherein the display has a second configuration which extends out from the enclosure, and wherein the flip-up display is changed from the first configuration to the second configuration by finger pressure on the snap, clip, clasp, latch, prong, pin, spring, or magnet; and a camera which is held by the band on the ventral side of the person's wrist and/or arm.

In another example, a wrist-worn device (e.g. smart watch) with a camera can comprise: a band which is worn on a person's wrist and/or arm; a flip-up or pop-up enclosure on the band with a planoconvex cross-sectional shape, wherein the planoconvex shape is a portion of a circle or oval, wherein a straight edge of the enclosure is movably-connected to the band, wherein the enclosure has a first configuration in which the center of the enclosure is a first distance from the band, wherein the enclosure has a second configuration in which the center of the enclosure is a second distance from the band, wherein the second distance is greater than the first distance, and wherein the enclosure is changed from the first configuration to the second configuration by pivoting around the straight edge of the enclosure; a display on the enclosure; and a camera on the enclosure.

In an example, a wrist-worn device (e.g. smart watch) with a camera can comprise: a band which is worn on a person's wrist and/or arm; and a flip-up and/or pop-up component (e.g. enclosure, display, and/or camera) on the band; wherein the component has a cross-sectional shape which is a conic section. In an example, a wrist-worn device (e.g. smart watch) with a camera can comprise: a band which is worn on a person's wrist and/or arm; and a flip-up and/or pop-up component (e.g. enclosure, display, and/or camera) on the band; wherein one end of the component pivots out from the band in a proximal direction (e.g. toward the person's elbow). In an example, a wrist-worn device (e.g. smart watch) with a camera can comprise: a band which is worn on a person's wrist and/or arm; a flip-up or pop-up enclosure on the band; a display on a first side of the enclosure; and a camera on a second side of the enclosure, wherein the second side is perpendicular to the first side.

In an example, a wrist-worn device (e.g. smart watch) with a camera can comprise: a band which is worn on a person's wrist and/or arm; and a flip-up and/or pop-up component (e.g. enclosure, display, and/or camera) on the band; wherein the component further comprises two movably-connected (e.g. jointed or hinged) sections, and wherein the component unfolds as it extends out from the device. In one embodiment, a flip-up and/or pop-up component (e.g. enclosure, display, or camera) on a wrist-worn device can have a planoconvex cross-sectional shape, wherein a straight edge of the shape is connected to the ban via an axle, joint, or hinge and an arcuate edge of the shape extends outward from the device.

In an example, a flip-up and/or pop-up component (e.g. enclosure, display, or camera) on a wrist-worn device can have one end which pivots out from the device toward the right side of the band. In one embodiment, a flip-up and/or pop-up component (e.g. enclosure, display, or camera) on a wrist-worn device can have one end which pivots out from the device in a distal direction (e.g. away from a person's elbow and toward their fingers). In another example, a flip-up and/or pop-up component (e.g. enclosure, display, or camera) on a wrist-worn device can further comprise two sections which unfold when the components extend out from the device. In an example, an enclosure can comprise a first section, a second section, and a third section which form a structure with a triangular cross-section in a second configuration.

In another example, a wrist-worn device (e.g. smart watch) with a camera can comprise: a band which is worn on a person's wrist and/or arm; an enclosure on the band with a planoconvex cross-sectional shape, wherein a straight side of the enclosure is movably-connected to the band, wherein the enclosure has a first configuration in which both the straight side of the enclosure and an arcuate side of the enclosure are contiguous with the band, wherein the enclosure has a second configuration in which the straight side of the enclosure remains contiguous with the band but the arcuate side of the enclosure extends out from the band, and wherein the enclosure is changed from the first configuration to the second configuration by pivoting around the straight side; a display on the enclosure; and a camera on the enclosure.

In another example, a wrist-worn device (e.g. smart watch) with a camera can comprise: a band which is worn on a person's wrist and/or arm; a pivoting enclosure on the band, wherein the pivoting enclosure has a first configuration with at least 75% of the enclosure between the 315-degree and 45-degree coordinates and a second configuration with at least 75% of the enclosure between the 270-degree and 315-degree coordinates; two displays on opposite sides of the pivoting enclosure; and a camera on the pivoting enclosure and/or the band. In an example, a wrist-worn device (e.g. smart watch) with a camera can comprise: a band which is worn on a person's wrist and/or arm; a pivoting enclosure on the band, wherein the pivoting enclosure has a first configuration on the dorsal side of the wrist and/or arm and a second configuration on a lateral (e.g. between dorsal and ventral) side of the wrist and/or arm, and wherein the enclosure pivots from the first configuration to the second configuration; two displays on opposite sides of the pivoting enclosure; and a camera on the pivoting enclosure and/or the band.

In an example, a wrist-worn device (e.g. smart watch) with a camera can comprise: a band which is worn on a person's wrist and/or arm; a pivoting enclosure on the band, wherein the pivoting enclosure has a first configuration between the 315-degree and 45-degree coordinates and a second configuration between the 270-degree and 315-degree coordinates, and wherein the enclosure pivots from the first configuration to the second configuration; two displays on opposite sides of the pivoting enclosure; and a camera on the pivoting enclosure and/or the band. In an example, a wrist-worn device (e.g. smart watch) with a camera can comprise: a band which is worn on a person's wrist and/or arm; a pivoting enclosure on the band; a display on a first side of the enclosure; and a camera on a second side of the enclosure, wherein the second side is parallel to the first side.

In an example, a wrist-worn device (e.g. smart watch) with a camera can comprise: an arcuate band (e.g. watch band) which is worn around at least two-thirds of the circumference of a person's wrist and/or arm; an enclosure (e.g. watch housing) which is held on the dorsal side of the person's wrist and/or arm by the band; a pivoting arm which pivots (e.g. pivots, rotates, and/or pops) up and/out from the enclosure; a display (e.g. watch face) on the pivoting arm;

and a camera on the rim (e.g. narrow perimeter) of the enclosure, wherein images recorded by the camera are shown on the display.

In an example, a wrist-worn device (e.g. smart watch) with a camera can comprise: an arcuate band (e.g. watch band) which is worn around at least two-thirds of the circumference of a person's wrist and/or arm; an enclosure (e.g. watch housing) which is held on the dorsal side of the person's wrist and/or arm by the band; wherein the enclosure further comprises a first section which is stationary relative to the band; a pivoting and/or sliding second section; and a pivoting and/or sliding third section; wherein the enclosure has a first configuration in which the first section, the second section, and the third section are substantially parallel to each other; and wherein the enclosure has a second configuration in which the first section, the second section, and the third section form a triangular prism which protrudes out from the band; a display on the second section; and a camera on the third section, wherein images recorded by the camera are shown on the display.

In another example, a wrist-worn device (e.g. smart watch) with a camera can comprise: an arcuate band (e.g. watch band) which is worn around at least two-thirds of the circumference of a person's wrist and/or arm; an enclosure (e.g. watch housing) on the band; a display on a first side of the enclosure; and a camera on a second side (e.g. opposite the first side) of the enclosure, wherein images recorded by the camera are shown on the display; wherein the device has a first configuration in which the center of the enclosure is a first distance from the circumference of the wrist and/or arm, wherein the device has a second configuration in which the center of the enclosure is a second distance from the circumference of the wrist and/or arm, wherein the second distance is greater than (e.g. at least twice) the first distance, and wherein the enclosure is changed from the first configuration to the second configuration by being pivoted out from the circumference of the wrist and/or arm.

In one embodiment, a wrist-worn device (e.g. smart watch) with a camera can comprise: a band which is worn on a person's wrist and/or arm; a motion sensor; and a camera; wherein the camera has a first configuration with a first orientation and/or central focal vector, wherein the camera has a second configuration with a second orientation and/or central focal vector, and wherein the camera is automatically changed from the first configuration to the second configuration based on analysis of data from the motion sensor. In another example, a wrist-worn device (e.g. smart watch) with a camera can comprise: a band which is worn on a person's wrist and/or arm; and a camera; wherein the camera has a first configuration with a first orientation and/or central focal vector, wherein the camera has a second configuration with a second orientation and/or central focal vector, and wherein the camera is automatically changed from the first configuration to the second configuration in order to remain focused toward a selected object in the environment (e.g. food) as the band moves.

In an example, a wrist-worn device (e.g. smart watch) with a camera can comprise: a band which is worn on a person's wrist and/or arm; a flexible arcuate arm which spans a portion of the circumference of the band; a display on the flexible arcuate arm; and a camera on the flexible arcuate arm; wherein the flexible arcuate arm has a first configuration in which the arm is a first average distance from the band; wherein the flexible arcuate arm has a second (extended) configuration in which the arm is a second average distance from the band; and wherein the second average distance is more than twice the first average distance.

In one embodiment, a wrist-worn device (e.g. smart watch) with a camera can comprise: a band worn on a person's wrist and/or arm; a circular enclosure on the band, wherein the circular enclosure has a first configuration which is a first distance from the band and a second configuration which is a second distance from the band, and wherein the circular enclosure is changed from the first configuration to the second configuration by being rotated; a display on the enclosure; and a camera on the enclosure and/or the band. In an example, a wrist-worn device (e.g. smart watch) with a camera can comprise: a band worn on a person's wrist and/or arm; an enclosure, wherein the enclosure is connected to the band by a flexible member (e.g. strip, cable, cord, or wire), wherein the enclosure has a first configuration in which it is connected to the band by the flexible member and one or more snaps, clasps, clips, latches, pins, plugs, hook-and-loop materials, or buckles, and wherein the enclosure has a second configuration in which it is only connected to the band by the flexible member; a display on the enclosure; and a camera on the enclosure.

In an example, a wrist-worn device (e.g. smart watch) with a camera can comprise: a band worn on a person's wrist and/or arm; an enclosure on the band, wherein the enclosure has a first configuration in which it is attached to the band at two ends and a second configuration in which it is attached to the band at only one end, and wherein the enclosure is changed from the first configuration to the second configuration by finger pressure on a latch, clasp, clip, pin, snap, or buckle; a display on the enclosure; and a camera on the band. In an example, a wrist-worn device (e.g. smart watch) with a camera can comprise: an arcuate band (e.g. watch band) which is worn around at least two-thirds of the circumference of a person's wrist and/or arm; an enclosure (e.g. watch housing) which is held on the dorsal side of the person's wrist and/or arm by the band; a display (e.g. watch display) on the enclosure; a movable projection (e.g. arm), wherein the projection has a first configuration which is retracted into the enclosure and a second configuration which extends out from the enclosure; and a camera on the movable projection.

In another example, a second section of an enclosure can be recessed within a first section of the enclosure in a first configuration and extend out from the first section in a second configuration. In an example, the plane of a second section of an enclosure and the plane of a third section of the enclosure can be parallel or coplanar in a first configuration and intersect at an angle between 40 degrees and 120 degrees in a second configuration. In another example, a display can have a cross-sectional shape which is a quadrilateral with rounded vertexes. In an example, an enclosure on a band can be substantially flat in a retracted first configuration and have a polygonal (e.g. triangular) cross-sectional shape an extended second configuration.

In one embodiment, a device can be embodied in a modular smart watch band. In an example, a wrist-worn device (e.g. smart watch) with a camera can comprise: a modular band which is worn on a person's wrist and/or arm; and a camera on the modular band; wherein the modular band can be used with (e.g. physically attached to and in wireless electromagnetic communication with) different types and/or brands of smart watch displays, and wherein images from the camera can be display on those different types and/or brands of smart watch displays.

In one embodiment, a device can comprise a band with at least four connection ports at different locations around the circumference of the band, wherein one or more modular cameras can be plugged into one or more of these connection ports. In an example, a device can comprise a band with four connection ports at different locations around the circumference of the band, wherein one or more modular cameras can be plugged into one or more of these connection ports. In an example, a wrist-worn device (e.g. smart watch) with a camera can comprise: a band that is worn on a person's wrist and/or arm; a display on the band; and a camera, wherein the camera has a first configuration in which it is attached to the band and a second configuration in which it is detached from the band; and a cable, wire, or cord which is connected the camera and connected to the band in both the first configuration and the second configuration.

In another example, a wrist-worn device (e.g. smart watch) with a camera can comprise: a band which is work on a person's wrist and/or arm, wherein the band has a circumferential array of connection ports or sockets; and a camera which can be selectively and detachably plugged into any of the ports or sockets in the array. In an example, a wrist-worn device (e.g. smart watch) with a camera can comprise: a band which is worn on a person's wrist and/or arm, wherein the band spans between 50% and 90% of the circumference of the person's wrist or arm; an enclosure; a display on the enclosure; and a camera on the enclosure; wherein a first end of the enclosure is permanently-connected to the band, wherein a second end of the enclosure is detachably-connected to the band, wherein the device has a first configuration in which the second end of the enclosure is connected to the band, wherein the device has a second configuration in which the second end of the enclosure is detached from the band, and wherein the device can be reversibly changed between the first configuration and the second configuration.

In another example, a wrist-worn device (e.g. smart watch) with a camera can comprise: a band which is worn on a person's wrist and/or arm, wherein there is an arcuate array of ports, slots, openings, or holes on the band which spans at least half of the circumference of the band; a modular display which can be removably-attached to any port, slot, opening, or hole in the array; and a modular camera which can be removably-attached to any port, slot, opening, or hole in the array. In an example, a wrist-worn device (e.g. smart watch) with a camera can comprise: a band which is worn on a person's wrist and/or arm, wherein there is an arcuate array of ports, slots, openings, or holes on the band which spans at least half of the circumference of the band; a display on the band; and a camera which can be removably-attached to any port, slot, opening, or hole in the array. In an example, a device can include a modular camera which can be reversibly-connected to (e.g. plugged into) one of several different ports around the circumference of a band worn on a person's wrist and/or arm.

In an example, a wrist-worn device (e.g. smart watch) with a camera can comprise: a band which is worn on a person's wrist and/or arm; a sliding enclosure on the band, wherein the sliding enclosure has a first configuration with at least 75% of the enclosure between the 315-degree and 45-degree coordinates and a second configuration with at least 75% of the enclosure between the 270-degree and 315-degree coordinates, and wherein the enclosure slides from the first configuration to the second configuration; a display on the sliding enclosure; and a camera on the sliding enclosure and/or the band.

In one embodiment, a wrist-worn device (e.g. smart watch) with a camera can comprise: a band which is worn on a person's wrist and/or arm; a foldable enclosure, wherein a first end of the foldable enclosure is movably-attached to the band (e.g. able to slide along the circumference of the band), wherein a second end of the foldable enclosure is movably-attached to the band (e.g. able to slide along the circumference of the band), wherein the foldable enclosure has a retracted configuration in which the first end is a first distance from the second end, wherein the foldable enclosure has an extended configuration in which the first end is a second distance from the second end, and wherein the second distance is less than the first distance; a display on the foldable enclosure; and a camera on the foldable enclosure.

In an example, a wrist-worn device (e.g. smart watch) with a camera can comprise: a band which is worn on a person's wrist and/or arm; a display on the band; a camera on the band; and a locking mechanism, wherein the locking mechanism is clip, clasp, clamp, latch, prong, snap, pin, spring, or magnet; wherein the band has a first configuration in which the camera is locked by the locking mechanism at a selected circumferential coordinate on the band, wherein the band has a second configuration in which the camera is unlocked and able to slide (e.g. along a track or channel) around the circumference of the band to different circumferential coordinates on the band, and wherein the band is changed from the first configuration to the second configuration by a finger pressing on the locking mechanism.

In one embodiment, a wrist-worn device (e.g. smart watch) with a camera can comprise: a band which is worn on a person's wrist and/or arm; an enclosure on the band; a display on the enclosure; a camera on the band; and a track or channel around at least a portion of the circumference of the band, wherein the camera slides along the track or channel to different locations on the circumference of the band. In another example, a wrist-worn device (e.g. smart watch) with a camera can comprise: a band which is worn on a person's wrist and/or arm; a display on the band; and a camera on the band, wherein the circumferential coordinate of the camera can be manually changed by sliding the camera around a portion of the circumference of the band.

In an example, a wrist-worn device (e.g. smart watch) with a camera can comprise: a band which is worn on a person's wrist and/or arm; a display on the band; and a camera on the band, wherein the camera can slide along a track or channel which spans between 50% and 75% of the circumference of the person's wrist and/or arm. In another example, a wrist-worn device (e.g. smart watch) with a camera can comprise: a band worn on a person's wrist and/or arm; a sliding component which slides around at least a portion of the circumference of the band; and a camera on the sliding component. In an example, a wrist-worn device (e.g. smart watch) with a camera can comprise: a display; an inner band (or ring) worn on a person's wrist and/or arm; an outer band (or ring) worn on the person's wrist and/or arm; wherein the first band and the second band are nested, and wherein the second band can be rotated around (a portion of the circumference of) the first band; and a camera on the second band.

In an example, a wrist-worn device (e.g. smart watch) with a camera can comprise: an inner band which is worn around at least two-thirds of a person's wrist and/or arm; an outer band which is worn around at least two-thirds of the person's wrist and/or arm, wherein the outer band is farther from the surface of the person's wrist and/or arm than the inner band, wherein the device has a first configuration in which the outer band is connected to the inner band at a first number of locations, wherein the device has a second configuration in which the outer band is connected to the inner band at a second number of locations, wherein the second number is less than the first number, wherein the device can be manually changed between the first configuration and the second configuration; a display on the outer band; and a camera on the outer band, wherein in the second configuration the camera can be tilted, pivoted, and/or rotated relative to the wrist and/or arm so that the central focal vector of the camera can be pointed in different directions without the person having to contort their wrist and/or arm.

In an example, a wrist-worn device (e.g. smart watch) with a camera can comprise: an inner band which is worn around at least two-thirds of a person's wrist and/or arm; an outer band which is worn around at least two-thirds of the person's wrist and/or arm, wherein the outer band is farther from the surface of the person's wrist and/or arm than the inner band, and wherein the outer band is more elastic and/or flexible than the inner band; a display on the inner band or the outer band; and a camera on the outer band; wherein the device has a first configuration in which the outer band is connected to the inner band at a first number of locations, wherein the device has a second configuration in which the outer band is connected to the inner band at a second number of locations, wherein the second number is less than the first number, wherein the device can be manually changed between the first configuration and the second configuration, wherein the camera can be tilted, pivoted, and/or rotated relative to the wrist and/or arm in the second configuration so that the central focal vector of the camera can be pointed in different directions without the person having to contort their wrist and/or arm.

In an example, a wrist-worn device (e.g. smart watch) with a camera can comprise: an inner band which is worn around at least two-thirds of a person's wrist and/or arm; an outer band which is worn around at least two-thirds of the person's wrist and/or arm, wherein the outer band is farther from the surface of the person's wrist and/or arm than the inner band; an enclosure on the inner band or outer band; a display on the enclosure; and a camera on the enclosure; wherein the device has a first configuration in which the outer band is connected to the inner band at a first number of locations, wherein the device has a second configuration in which the outer band is connected to the inner band at a second number of locations, wherein the second number is less than the first number, and wherein the device can be manually changed between the first configuration and the second configuration.

In another example, a wrist-worn device (e.g. smart watch) with a camera can comprise: an inner band which is worn around at least two-thirds of a person's wrist and/or arm; an outer band which is worn around at least two-thirds of the person's wrist and/or arm, wherein the outer band is more flexible, elastic, and/or undulating than the inner band; a display on the outer band; and a camera on the outer band. In an example, a wrist-worn device (e.g. smart watch) with a camera can comprise: an inner band which is worn around at least two-thirds of a person's wrist and/or arm; a flexibly-segmented outer band which is worn on the person's wrist and/or arm, wherein the flexibly-segmented outer band spans less of the circumference of the person's wrist and/or arm than the inner band; a display on the outer band; and a camera on the outer band. In another example, an enclosure can be contiguous with an inner band in the first configuration and can extend out (e.g. pivot or rotate outward) from the inner band in a second configuration. In an example, an outer band can span less of the circumference of a wrist and/or arm than an inner band.

In one embodiment, a wrist-worn device (e.g. smart watch) with a camera can comprise: a band which is worn on a person's wrist and/or arm; an enclosure on the band, wherein the enclosure can be rotated relative to the band; a display on the enclosure; and a camera on the rim (e.g. narrow side perimeter) of the enclosure. In an example, a wrist-worn device (e.g. smart watch) with a camera can comprise: a band worn around a person's wrist and/or arm; an enclosure on the band, wherein the enclosure can be rotated on the band; a display on the enclosure; and a camera on the rim (e.g. narrow perimeter) of the enclosure. In an example, a wrist-worn device (e.g. smart watch) with a camera can comprise: a band worn on a person's wrist and/or arm, wherein the band further comprises an inner rotatable ring around the circumference of the band; an enclosure on the ring; a display on the enclosure; and a camera on the ring. In an example, a wrist-worn device (e.g. smart watch) with a camera can comprise: a band worn on a person's wrist and/or arm, wherein the band further comprises a rotatable ring around the circumference of the band; an enclosure on the ring; a display on the enclosure; and a camera on the ring. In another example, a wrist-worn device (e.g. smart watch) with a camera can comprise: a band worn on a person's wrist and/or arm, wherein the band further comprises a rotatable partial ring around a portion of the circumference of the band; an enclosure on the ring; a display on the enclosure; and a camera on the ring.

In an example, a wrist-worn device (e.g. smart watch) with a camera can comprise: a first band (or ring) which is worn on a person's wrist and/or arm; a second band (or ring) which is worn on the person's wrist and/or arm, wherein first band and the second band are parallel to each other, wherein the first band and the second band are movably-connected in a manner which enables one band (e.g. the first band or second band) to rotate relative to the other band (e.g. the second band or first band); a display on the first band; and a camera on the second band. In another example, a wrist-worn device (e.g. smart watch) with a camera can comprise: a first band which is worn around a person's wrist and/or arm; a second band which is worn around the person's wrist and/or arm, wherein the first band and the second band are movably-connected in a manner which enables the second band to rotate relative to the first band; a display on the first band; and a camera on the second band.

In an example, a wrist-worn device (e.g. smart watch) with a camera can comprise: a band which is worn on a person's wrist and/or arm, wherein the band has a central circumference along the centers of its width; an enclosure on the band, wherein portions of the band which connect to the enclosure are bifurcated to create a gap, opening, and/or hole along a section of the central circumference of the band; a display on the enclosure; and a camera on the enclosure, wherein the camera is on the rim (e.g. narrow lateral perimeter) of the enclosure, wherein the camera is in the same plane as the central circumference of the band so that a central focal vector of the camera passes through the gap, opening, and/or hole created by the bifurcation of the band.

In an example, a gap, opening, and/or hole between the branches of a bifurcating portion of a band can be have an arcuate shape. In one embodiment, a gap, opening, and/or hole between the branches of a bifurcating portion of a band can be have a conic-section shape. In an example, bifurcating branches of a band connected to an enclosure can be symmetric with respect to a plane of a central circumference of the band. In an example, bifurcating branches of a band near an enclosure can be symmetric with respect to the plane of a central (with respect to width) circumference of the band and a camera on the enclosure can be centered on this plane. In another example, the thickness of an enclosure held on a wrist and/or arm by a band can be less than twice the thickness of the band.

In an example, a wrist-worn device (e.g. smart watch) with a camera can comprise: a band which is worn on a person's wrist and/or arm; an enclosure on the band; a display on the enclosure; a rotating bezel or ring on the enclosure; and a plurality of cameras around the circumference of the band, wherein rotation of the bezel or ring changes which camera is activated to record images. In another example, a wrist-worn device (e.g. smart watch) with a camera can comprise: a band which is worn on a person's wrist and/or arm; an enclosure which is held by the band on the dorsal side of the person's wrist and/or arm; a flip-up (e.g. flip-up, pop-up, pivoting, and/or rotatable) display with a first configuration which is recessed into (or onto) the enclosure and a second configuration which extends out from the enclosure, wherein the flip-up display is changed from its first configuration to its second configuration by finger pressure on a snap, clip, clasp, latch, prong, pin, spring, or magnet connected to the display; and a camera on the display, enclosure, and/or band; wherein the camera is activated to start recording images when the display is changed from the first configuration to the second configuration.

In an example, a wrist-worn device (e.g. smart watch) with a camera can comprise: a band which is worn on a person's wrist and/or arm; an enclosure on the band; a display on the enclosure; a motion sensor in the enclosure; and a camera on the band; wherein the camera is triggered to start recording images by detection of a first gesture and/or motion from analysis of data from the motion sensor and wherein the camera is triggered to stop recording images by detection of a second gesture and/or motion from analysis of data from the motion sensor.

In one embodiment, a wrist-worn device (e.g. smart watch) with a camera can comprise: a band which is worn on a person's wrist and/or arm; an enclosure on the band; a display on the enclosure; a motion sensor in the enclosure; and a camera on the enclosure; wherein the camera is activated to record images by detection of a selected gesture and/or motion from analysis of data from the motion sensor. In another example, a wrist-worn device (e.g. smart watch) with a camera can comprise: a band worn on a person's wrist and/or arm; a display on the band; a motion sensor; a first camera on the band between the 45-degree and 135-degree coordinates; and a second camera on the band between the 135-degree and 225-degree coordinates, wherein the first camera or the second camera is activated to record images based on data from the motion sensor.

In an example, a wrist-worn device (e.g. smart watch) with a camera can comprise: a band which is worn on a person's wrist and/or arm; a motion sensor; an actuator; and a camera; wherein the camera has a first configuration with a first orientation and/or central focal vector, wherein the camera has a second configuration with a second orientation and/or central focal vector, and wherein the camera is changed from the first configuration to the second configuration by the actuator to remain focused on a selected object in the environment (e.g. food) as the band moves.

In another example, a wrist-worn device (e.g. smart watch) with a camera can comprise: a band which is worn on a person's wrist and/or arm; a motion sensor on the band; a camera on the band; a reflective or refractive component (e.g. mirror or lens) whose movement changes the central focal vector of the camera; and an actuator; wherein the orientation and/or position of the reflective or refractive component is changed by the actuator in order to keep the central focal vector of the camera directed toward a selected environmental object (e.g. food) as the band moves. In an example, a wrist-worn device (e.g. smart watch) with a camera can comprise: a band which is worn on a person's wrist and/or arm; a motion sensor on the band; a camera on the band; and an actuator; wherein the actuator moves the focal vector of the camera to maintain a constant focus on a selected object in the environment even when the based moves based on analysis of data from the motion sensor.

In an example, a wrist-worn device (e.g. smart watch) with a camera can comprise: a band which is worn on a person's wrist and/or arm; a display on the band; a camera on the band; a motion sensor on the band; and an actuator on the band; wherein the actuator changes the direction of the central focal vector of the camera to keep this central focal vector pointed in the same direction relative to the environment even when the band moves. In an example, a wrist-worn device (e.g. smart watch) with a camera can comprise: a band which is worn on a person's wrist and/or arm; a display on the band; a camera on the band; and an actuator; wherein images recorded by the camera are analyzed by artificial intelligence and/or machine learning to identify the location of a selected environmental object in the images, and wherein the actuator moves the camera, a lens, or a mirror in order to keep the selected environmental object in subsequent images recorded by the camera, even if the band is moved.

In an example, a wrist-worn device (e.g. smart watch) with a camera can comprise: a band which is worn on a person's wrist and/or arm; a display on the band; a camera on the band; and an actuator on the band; wherein the actuator moves the camera to keep a selected environmental object in images recorded by the camera. In one embodiment, a wrist-worn device (e.g. smart watch) with a camera can comprise: a band which is worn on a person's wrist and/or arm; a display on the band; a camera on the band; a motion sensor on the band; and an actuator on the band; and a mirror from which the camera records images, wherein the actuator moves the mirror to a selected environmental object in images recorded by the camera.

In an example, a wrist-worn device (e.g. smart watch) with a camera can comprise: a band which is worn on a person's wrist and/or arm; a display on the band; a camera on the band; and an actuator on the band; a mirror or lens, wherein the actuator moves the mirror or lens to keep a selected environmental object in images recorded by the camera. In an example, a wrist-worn device (e.g. smart watch) with a camera can comprise: a band worn on a person's wrist and/or arm; an enclosure on the band; a display on the enclosure; a camera on the enclosure and/or on the band; a lens or mirror; and an actuator; wherein the focal direction of the camera is changed by movement of the lens or mirror, and wherein the lens or mirror is moved by the actuator to maintain a focal direction toward an environmental object even if the band moves.

In an example, a wrist-worn device (e.g. smart watch) with a camera can comprise: a band which is worn on a person's wrist and/or arm; an enclosure on the band; a display on the enclosure; a rotating bezel or ring on the enclosure; and a camera on the band, wherein the focal distance of the camera is changed by rotation of the bezel or ring. In an example, a device can further comprise one or more components selected from the group consisting of: data processor, wireless data transmitter, wireless data receiver, battery, accelerometer, gyroscope, inclinometer, microphone or sound sensor, blood pressure sensor, heart rate sensor, ECG sensor, EMG sensor, temperature sensor, and pressure sensor.

FIG. 1 shows a lateral view of a wrist-worn device (e.g. smart watch) with a camera comprising: an arcuate band (e.g. watch band) 103 which is worn around at least two-thirds of the circumference of a person's wrist and/or arm; an enclosure (e.g. watch housing) 104 which is held on the dorsal side of the person's wrist and/or arm by the band; a display (e.g. watch display) 105 on the enclosure; and a camera 106 which is held on the ventral side of the person's wrist and/or arm by the band. FIG. 1 also shows a digitally-transmitted line of sight 102 between the person's eye 101 and the environment, wherein this digitally-transmitted line of sight is transmitted via the camera 106 which records images of the environment and the display 105 which displays these images to the person's eye. In an example, images from the camera can also be shown on a wirelessly-connected separate device such as a phone or augmented reality eyewear.

As shown in FIG. 1, compass coordinates can be defined for locations around the circumference of the person's wrist and/or arm. These coordinates can help to more precisely specify the locations of device components. In this disclosure, the 0-degree coordinate is defined as being on the center of the dorsal side of the person's wrist and/or arm. The 180-degree coordinate is defined as being opposite the 0-degree coordinate, on the ventral side of the person's wrist and/or arm. The 90-degree and 270-degree coordinates are midway around the circumference of the person's wrist and/or arm between the 0-degree and 180-degree coordinates. FIG. 1 also shows other compass coordinates (including the 45-degree, 135-degree, 225-degree, and 315-degree coordinates) filled in between the already-defined (0-degree, 90-degree, 180-degree, and 270-degree) coordinates. In this example, the enclosure and display are between the 315-degree and 45-degree coordinates. In this example, the camera is between the 135-degree and 225-degree coordinates.

In an example, this wrist-worn device can be the integrated combination of a smart watch and its band. In an example, this wrist-worn device can comprise the combination of a modular watch enclosure and a modular band, wherein the modular watch enclosure can be used with other bands and the modular band can be used with other watch enclosures. In other examples, a wrist worn device can be a bracelet, a wrist band, a fitness band, a cuff, or a sleeve.

In an example, a wrist-worn device can be a modular watch band with a ventral-side camera which is in electronic communication with a smart watch enclosure, wherein the enclosure is selected from among different types and/or brands of smart watch enclosures. In an example, a modular smart watch band with a camera can comprise: a band which is worn around at least two-thirds of the circumference of a person's wrist and/or arm, wherein the band holds a watch enclosure with a display on the dorsal side of the person's wrist and/or arm; and a camera on the band on the ventral side of the person's wrist. Relevant variations discussed elsewhere in the disclosure or in priority-linked disclosures can also be applied to this example.

Figure 2:
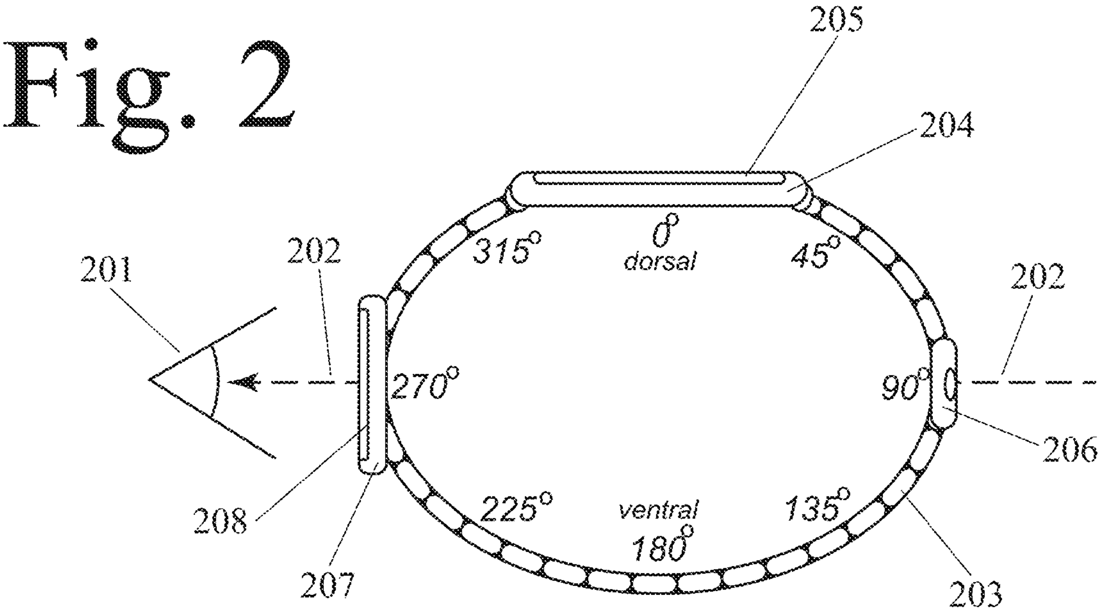
FIG. 2 shows a cross-sectional view of a wrist-worn device (e.g. smart watch) with a dorsal first display, a lateral second display, and a lateral camera.

FIG. 2 shows a lateral view of a wrist-worn device (e.g. smart watch) with a camera comprising: an arcuate band (e.g. watch band) 203 which is worn around at least two-thirds of the circumference of a person's wrist and/or arm; a first enclosure (e.g. primary housing) 204 which is held on the dorsal side of the person's wrist and/or arm by the band; a first display (e.g. primary display) 205 on the first enclosure; a second enclosure (e.g. secondary housing) 207 which is held between the dorsal and ventral sides of the person's wrist and/or arm by the band; a second display (e.g. secondary display) 208 on the second enclosure; and a camera 206 which is held between the dorsal and ventral sides of the person's wrist and/or arm by the band, wherein the camera is on the opposite side of the circumference of the band from the second enclosure, and wherein images recorded by the camera are shown on the second display. FIG. 2 also shows a digitally-transmitted line of sight 202 between the person's eye 201 and the environment, wherein this digitally-transmitted line of sight is transmitted via the camera 206 which records images of the environment and the second display 208 which displays these images to the person's eye. In an example, images from the camera can also be shown on the first display or on a wirelessly-connected separate device such as a phone or augmented reality eyewear.

In this example, the first enclosure and first display are between the 315-degree and 45-degree coordinates. In this example, the second enclosure and second display are between the 225-degree and 315-degree coordinates. In this example, the camera is between the 45-degree and 135-degree coordinates.

In an example, this wrist-worn device can be the integrated combination of a smart watch and its band. In an example, this wrist-worn device can comprise the combination of a modular watch enclosure and a modular watch band, wherein the modular watch enclosure can be used with other watch bands and the modular watch band can be used with other watch enclosures. In other examples, a wrist worn device can be a bracelet, a wrist band, a fitness band, a cuff, or a sleeve. In an example, a wrist-worn device can be a modular watch band with a camera and a (secondary) display which is in electronic communication with a (primary) smart watch enclosure, wherein the enclosure is selected from among different types and/or brands of smart watch enclosures. Relevant variations discussed elsewhere in the disclosure or in priority-linked disclosures can also be applied to this example.

FIG. 3 shows a lateral view of a wrist-worn device (e.g. smart watch) with a camera comprising: an arcuate band (e.g. watch band) 303 which is worn around at least two-thirds of the circumference of a person's wrist and/or arm; a first enclosure (e.g. primary housing) 304 which is held on the dorsal side of the person's wrist and/or arm by the band; a first display (e.g. primary display) 305 on the first enclosure; a camera 306 on a side (e.g. a rim and/or lateral side) of the first enclosure; a second enclosure (e.g. secondary housing) 307 which is held between the dorsal and ventral sides of the person's wrist and/or arm by the band; and a second display (e.g. secondary display) 308 on the second enclosure, wherein images recorded by the camera are shown on the second display.

FIG. 3 also shows a digitally-transmitted line of sight 302 between the person's eye 301 and the environment, wherein this digitally-transmitted line of sight is transmitted via the camera 306 which records images of the environment and the second display 308 which displays these images to the person's eye. In an example, images from the camera can also be shown on the first display or on a wirelessly-connected separate device such as a phone or augmented reality eyewear.

In this example, the first enclosure and first display are between the 315-degree and 45-degree coordinates. In this example, the second enclosure and second display are between the 225-degree and 315-degree coordinates. In this example, the central focal vector of the camera is in a plane which is parallel to the plane containing the central circumference of the band. In this example, the central focal vector of the camera is also substantially-tangential to the curvature of the band. In another example, the central focal vector of the camera can be in a plane which is orthogonal to the plane containing the central circumference of the band. In an example, the camera can be recessed within the enclosure. In an example, the camera can be reversibly-moved from a first configuration which is recessed within the enclosure to a second configuration which extends out from the enclosure.

In an example, this wrist-worn device can be the integrated combination of a smart watch and its band. In an example, this wrist-worn device can comprise the combination of a modular watch enclosure and a modular watch band, wherein the modular watch enclosure can be used with other watch bands and the modular watch band can be used with other watch enclosures. In other examples, a wrist worn device can be a bracelet, a wrist band, a fitness band, a cuff, or a sleeve. Relevant variations discussed elsewhere in the disclosure or in priority-linked disclosures can also be applied to this example.

FIG. 4 shows a lateral view of a wrist-worn device (e.g. smart watch) with a camera comprising: an arcuate band (e.g. watch band) 403 which is worn around at least two-thirds of the circumference of a person's wrist and/or arm; an enclosure (e.g. watch housing) 404 which is held on the dorsal side of the person's wrist and/or arm by the band; a pivoting arm 407 which pivots (e.g. pivots, rotates, and/or "pops") up and/out from the enclosure; a display (e.g. watch display) 405 on the pivoting component; and a camera 406 on a side (e.g. rim or narrow lateral side) of the enclosure, wherein images recorded by the camera are shown on the display.

FIG. 4 also shows a digitally-transmitted line of sight 402 between the person's eye 401 and the environment, wherein this digitally-transmitted line of sight is transmitted via the camera 406 which records images of the environment and the display 405 which shows these images to the person's eye. In an example, images from the camera can also be shown on a wirelessly-connected separate device such as a phone or augmented reality eyewear.

In this example, the enclosure is between the 315-degree and 45-degree coordinates. In this example, the central focal vector of the camera is in a plane which is parallel to the plane containing the central circumference of the band. In this example, the central focal vector of the camera is also substantially-tangential to the curvature of the band. In another example, the central focal vector of the camera can be in a plane which is orthogonal to the plane containing the central circumference of the band. In an example, the camera can be recessed within the enclosure. In an example, the camera can be reversibly-moved from a first configuration which is recessed within the enclosure to a second configuration which extends out from the enclosure.

In an example, one end of the pivoting arm can be movably-attached to the enclosure by a joint or axle, allowing the pivoting arm to pivot and/or rotate out from the enclosure. In an example, the pivoting arm can have a first configuration in which it recedes into the enclosure and a second configuration in which it extends out from the enclosure. In an example, the pivoting arm can have a width which is less than the width of the enclosure. In an example, the pivoting arm can be movably-attached to the enclosure by a safety break-away mechanism (e.g. a magnetic connection) so that it detaches rather than breaks if it is hit while it is extended.

In an example, the pivoting arm can be compelled by a spring, magnet, or other mechanism to extend out from the enclosure at an angle between 45 degrees and 135 degrees. In an example, the pivoting arm can be compelled by a spring, magnet, or other mechanism to extend out from the enclosure at one of a plurality of selected angles ranging between 45 degrees and 135 degrees. In an example, the pivoting arm can be reversibly fixed and/or locked at one of the plurality of selected angles.

In an example, this wrist-worn device can be the integrated combination of a smart watch and its band. In an example, this wrist-worn device can comprise the combination of a modular watch enclosure and a modular watch band, wherein the modular watch enclosure can be used with other watch bands and the modular watch band can be used with other watch enclosures. In other examples, a wrist worn device can be a bracelet, a wrist band, a fitness band, a cuff, or a sleeve. Relevant variations discussed elsewhere in the disclosure or in priority-linked disclosures can also be applied to this example.

Figure 5:
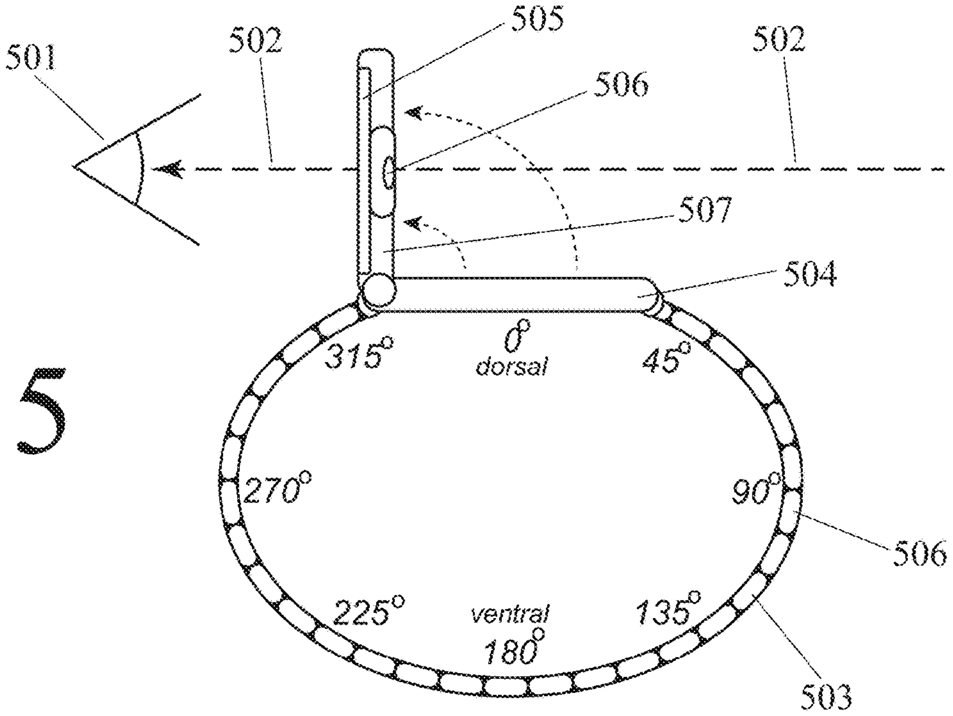
FIG. 5 shows a cross-sectional view of a wrist-worn device (e.g. smart watch) with a dorsal flip-up display and camera.

FIG. 5 shows a lateral view of a wrist-worn device (e.g. smart watch) with a camera comprising: an arcuate band (e.g. watch band) 503 which is worn around at least two-thirds of the circumference of a person's wrist and/or arm; an enclosure (e.g. watch housing) 504 which is held on the dorsal side of the person's wrist and/or arm by the band; a pivoting arm 507 which pivots (e.g. pivots, rotates, and/or "pops") up and/out from the enclosure; a display (e.g. watch display) 505 on a first side (of the pivoting arm; and a camera 506 on a second side (e.g. opposite side) of the pivoting arm, wherein images recorded by the camera are shown on the display.

FIG. 5 also shows a digitally-transmitted line of sight 502 between the person's eye 501 and the environment, wherein this digitally-transmitted line of sight is transmitted via the camera 506 which records images of the environment and the display 505 which shows these images to the person's eye. In an example, images from the camera can also be shown on a wirelessly-connected separate device such as a phone or augmented reality eyewear.

In this example, the enclosure is between the 315-degree and 45-degree coordinates. In this example, the camera is on a second side of the pivoting arm which is opposite the first side of the pivoting component. In an example, the pivoting arm has a first configuration in which it is substantially parallel to the enclosure and a second configuration in which it extends out from the enclosure. In an example, the first side of the pivoting arm (on which the display is located) faces away from the wrist and/or arm in the first configuration and the second side of the pivoting arm (on which the camera is located) faces toward the wrist and/or arm in the first configuration. In this example, the central focal vector of the camera is in a plane which is parallel to the plane containing the central circumference of the band. In another example, the central focal vector of the camera can be in a plane which is orthogonal to the plane containing the central circumference of the band.

In an example, one end of the pivoting arm can be movably-attached to the enclosure by a joint or axle, allowing the pivoting arm to pivot and/or rotate out from the enclosure. In an example, the pivoting arm can have a first configuration in which it recedes into the enclosure and a second configuration in which it extends out from the enclosure. In an example, the pivoting arm can have a width which is less than the width of the enclosure. In an example, the pivoting arm can be movably-attached to the enclosure by a safety break-away mechanism (e.g. a magnetic connection) so that it detaches rather than breaks if it is hit while it is extended.

In an example, the pivoting arm can be compelled by a spring, magnet, or other mechanism to extend out from the enclosure at an angle between 45 degrees and 135 degrees. In an example, the pivoting arm can be compelled by a spring, magnet, or other mechanism to extend out from the enclosure at one of a plurality of selected angles ranging between 45 degrees and 135 degrees. In an example, the pivoting arm can be reversibly fixed and/or locked at one of the plurality of selected angles.

In an example, this wrist-worn device can be the integrated combination of a smart watch and its band. In an example, this wrist-worn device can comprise the combination of a modular watch enclosure and a modular watch band, wherein the modular watch enclosure can be used with other watch bands and the modular watch band can be used with other watch enclosures. In other examples, a wrist worn device can be a bracelet, a wrist band, a fitness band, a cuff, or a sleeve. Relevant variations discussed elsewhere in the disclosure or in priority-linked disclosures can also be applied to this example.

Figure 6:
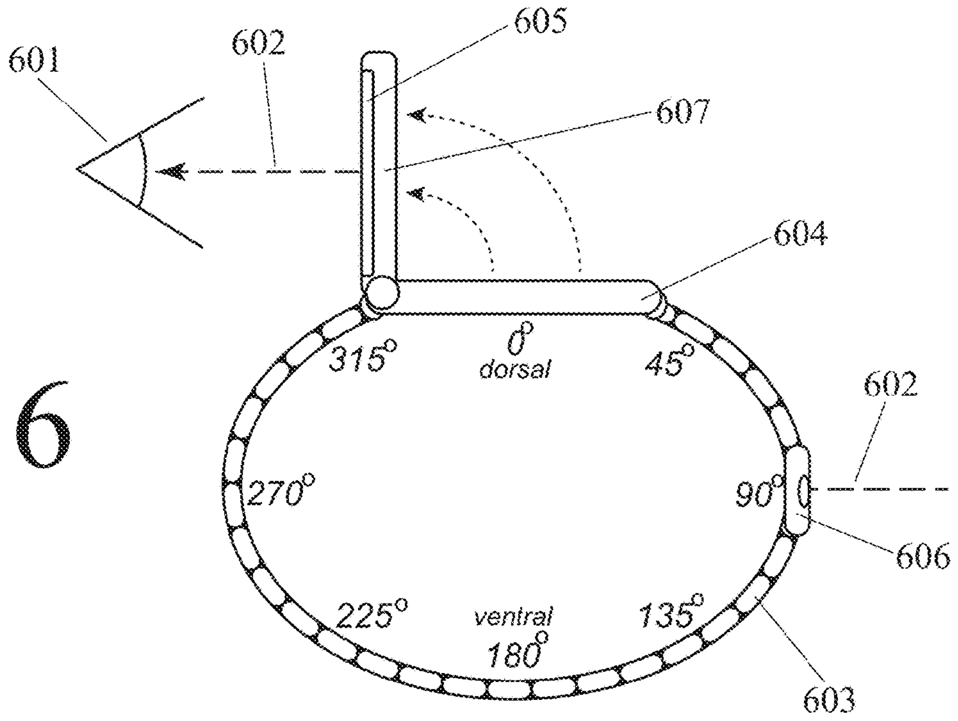
FIG. 6 shows a cross-sectional view of a wrist-worn device (e.g. smart watch) with a dorsal flip-up display and a lateral camera.

FIG. 6 shows a lateral view of a wrist-worn device (e.g. smart watch) with a camera comprising: an arcuate band (e.g. watch band) 603 which is worn around at least two-thirds of the circumference of a person's wrist and/or arm; an enclosure (e.g. watch housing) 604 which is held on the dorsal side of the person's wrist and/or arm by the band; a pivoting arm 607 which pivots (e.g. pivots, rotates, and/or "pops") up and/out from the enclosure; a display (e.g. watch display) 605 on the pivoting arm; and a camera 606 which is held between the dorsal and ventral sides of the person's wrist and/or arm by the band, wherein images recorded by the camera are shown on the display.

FIG. 6 also shows a digitally-transmitted line of sight 602 between the person's eye 601 and the environment, wherein this digitally-transmitted line of sight is transmitted via the camera 606 which records images of the environment and the display 605 which shows these images to the person's eye. In an example, images from the camera can also be shown on a wirelessly-connected separate device such as a phone or augmented reality eyewear.

In this example, the enclosure is between the 315-degree and 45-degree coordinates. In this example, the central focal vector of the camera is in a plane which is parallel to the plane containing the central circumference of the band. In another example, the central focal vector of the camera can be in a plane which is orthogonal to the plane containing the central circumference of the band.

In an example, one end of the pivoting arm can be movably-attached to the enclosure by a joint or axle, allowing the pivoting arm to pivot and/or rotate out from the enclosure. In an example, the pivoting arm can have a first configuration in which it recedes into the enclosure and a second configuration in which it extends out from the enclosure. In an example, the pivoting arm can have a width which is less than the width of the enclosure. In an example, the pivoting arm can be movably-attached to the enclosure by a safety break-away mechanism (e.g. a magnetic connection) so that it detaches rather than breaks if it is hit while it is extended.

In an example, the pivoting arm can be compelled by a spring, magnet, or other mechanism to extend out from the enclosure at an angle between 45 degrees and 135 degrees. In an example, the pivoting arm can be compelled by a spring, magnet, or other mechanism to extend out from the enclosure at one of a plurality of selected angles ranging between 45 degrees and 135 degrees. In an example, the pivoting arm can be reversibly fixed and/or locked at one of the plurality of selected angles.

In an example, this wrist-worn device can be the integrated combination of a smart watch and its band. In an example, this wrist-worn device can comprise the combination of a modular watch enclosure and a modular watch band, wherein the modular watch enclosure can be used with other watch bands and the modular watch band can be used with other watch enclosures. In other examples, a wrist worn device can be a bracelet, a wrist band, a fitness band, a cuff, or a sleeve. Relevant variations discussed elsewhere in the disclosure or in priority-linked disclosures can also be applied to this example.

Figure 7:
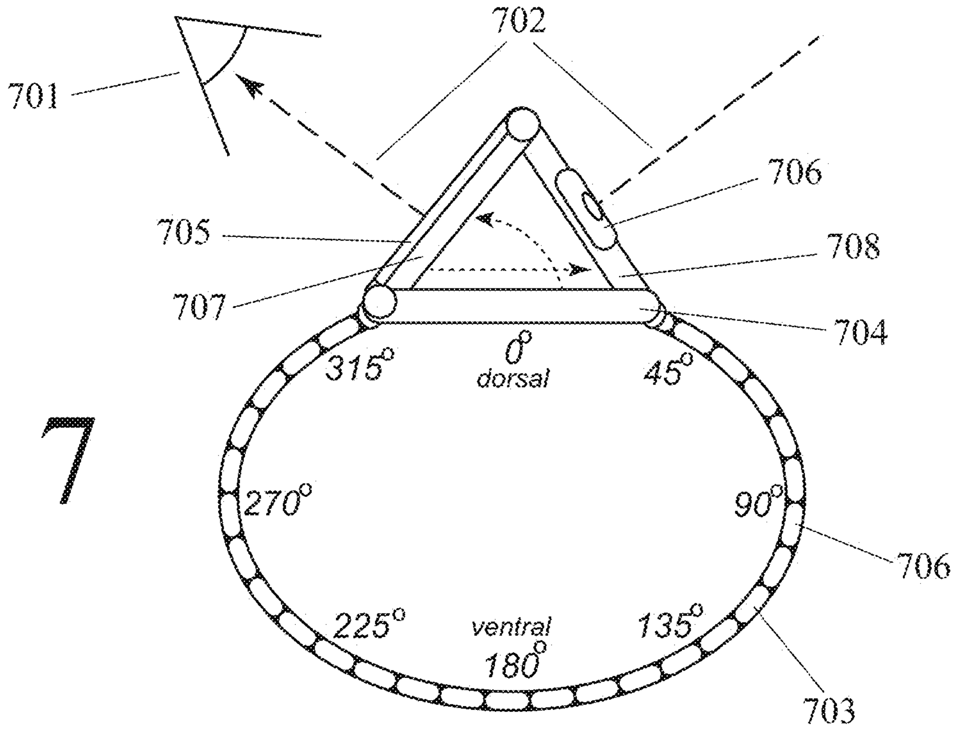
FIG. 7 shows a cross-sectional view of a wrist-worn device (e.g. smart watch) with a dorsal triangular flip-up display and camera.

FIG. 7 shows a lateral view of a wrist-worn device (e.g. smart watch) with a camera comprising: an arcuate band (e.g. watch band) 703 which is worn around at least two-thirds of the circumference of a person's wrist and/or arm; an enclosure (e.g. watch housing) which is held on the dorsal side of the person's wrist and/or arm by the band; wherein the enclosure further comprises a first section 704 which is stationary relative to the band, a pivoting and/or sliding second section 707, and a pivoting and/or sliding third section 708; wherein the enclosure has a first configuration in which the first section, the second section, and the third section are substantially parallel to each other; wherein the enclosure has a second configuration in which the first section, the second section, and the third section are not substantially parallel and the enclosure protrudes out from the band; a display 705 on the second section; and a camera 706 on the third section, wherein images recorded by the camera are shown on the display.

FIG. 7 also shows a digitally-transmitted line of sight 702 between the person's eye 701 and the environment, wherein this digitally-transmitted line of sight is transmitted via the camera 606 which records images of the environment and the display 705 which shows these images to the person's eye. In an example, images from the camera can also be shown on a wirelessly-connected separate device such as a phone or augmented reality eyewear. In this example, the enclosure is between the 315-degree and 45-degree coordinates.

In an example, one end of the first pivoting and/or sliding section can be movably-attached to the enclosure by a joint or axle and one end of the second pivoting and/or sliding section can be movably-attached to the first pivoting and/or sliding section by a joint or axle. In an example, a second end of the second pivoting and/or sliding section can slide within the enclosure. In an example, the enclosure can be substantially flat in the first configuration and can have a polygonal (e.g. triangular) cross-sectional shape in the second configuration.

In an example, this wrist-worn device can be the integrated combination of a smart watch and its band. In an example, this wrist-worn device can comprise the combination of a modular watch enclosure and a modular watch band, wherein the modular watch enclosure can be used with other watch bands and the modular watch band can be used with other watch enclosures. In other examples, a wrist worn device can be a bracelet, a wrist band, a fitness band, a cuff, or a sleeve. Relevant variations discussed elsewhere in the disclosure or in priority-linked disclosures can also be applied to this example.

Figure 8:
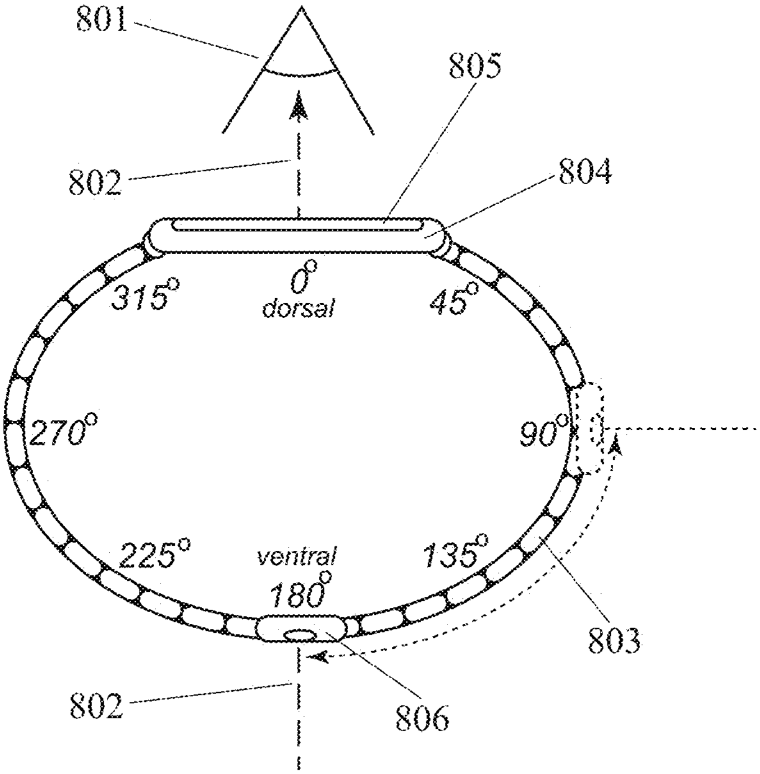
FIG. 8 shows a cross-sectional view of a wrist-worn device (e.g. smart watch) with a dorsal display and a circumferentially-sliding camera.

FIG. 8 shows a lateral view of a wrist-worn device (e.g. smart watch) with a camera comprising: an arcuate band (e.g. watch band) 803 which is worn around at least two-thirds of the circumference of a person's wrist and/or arm; an enclosure (e.g. watch housing) 804 which is held on the dorsal side of the person's wrist and/or arm by the band; a display (e.g. watch display) 805 on the enclosure; and a camera 806 which can be moved (e.g. slid) to different positions around a portion of the circumference.

FIG. 8 also shows a digitally-transmitted line of sight 802 between the person's eye 801 and the environment, wherein this digitally-transmitted line of sight is transmitted via the camera 806 which records images of the environment and the display 805 which displays these images to the person's eye. In an example, images from the camera can also be shown on a wirelessly-connected separate device such as a phone or augmented reality eyewear.

In this example, the enclosure and display are between the 315-degree and 45-degree coordinates. In this example, the camera can moved (e.g. slid) between the 90-degree and 180-degree coordinates. In an example, the band can have a channel, track, or groove along which the camera slides to different locations on the circumference of the band. In an example, the camera can be slid manually to different locations around the portion of the circumference of the band and be reversibly-locked into place at these locations. In another example, the band can have a plurality of ports on different locations on the circumference of the band into which the camera can be inserted.

In an example, this wrist-worn device can be the integrated combination of a smart watch and its band. In an example, this wrist-worn device can comprise the combination of a modular watch enclosure and a modular watch band, wherein the modular watch enclosure can be used with other watch bands and the modular watch band can be used with other watch enclosures. In other examples, a wrist worn device can be a bracelet, a wrist band, a fitness band, a cuff, or a sleeve. In an example, a wrist-worn device can be a modular watch band with a movable camera which is in electronic communication with a smart watch enclosure, wherein the enclosure is selected from among different types and/or brands of smart watch enclosures. Relevant variations discussed elsewhere in the disclosure or in priority-linked disclosures can also be applied to this example.

Figure 9:
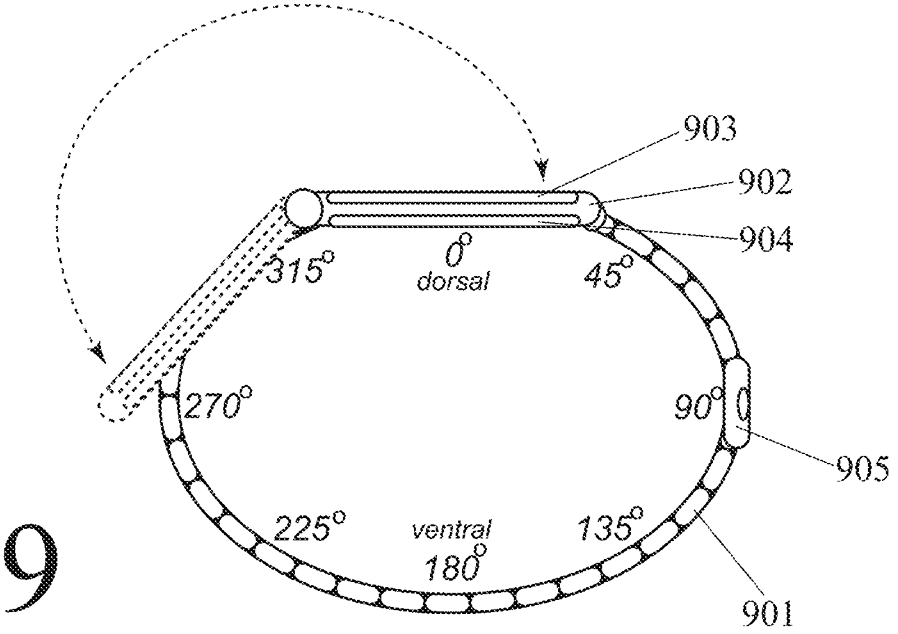
FIG. 9 shows a cross-sectional view of a wrist-worn device (e.g. smart watch) with a dorsal-to-lateral pivoting display and a lateral camera.

FIG. 9 shows a lateral view of a wrist-worn device (e.g. smart watch) with a camera comprising: an arcuate band (e.g. watch band) 901 which is worn around at least two-thirds of the circumference of a person's wrist and/or arm; a pivoting enclosure (e.g. watch housing) 902 which is held on the dorsal side of the person's wrist and/or arm by the band, wherein the pivoting enclosure has a first configuration in which the enclosure is primarily on the dorsal side of the wrist and/or arm, wherein the pivoting enclosure has a second configuration in which the enclosure is primarily on a side of the wrist and/or arm between the dorsal and ventral sides of the wrist and/or arm, and wherein the pivoting enclosure is pivoted (e.g. pivoted and/or rotated) from the first configuration to the second configuration; a first display 903 on a first side of the pivoting enclosure; a second display 904 on a second side of the pivoting enclosure; and a camera 905 which is held between the dorsal and ventral sides of the person's wrist and/or arm by the band, wherein images recorded by the camera are shown on the first display when the pivoting enclosure is in the first configuration and are shown on the second display when the pivoting enclosure is in the second configuration. In an example, images from the camera can also be shown on a wirelessly-connected separate device such as a phone or augmented reality eyewear.

In this example, the enclosure is between the 315-degree and 45-degree coordinates in the first configuration and between the 270-degree and 0-degree coordinates in the second configuration. In this example, the enclosure pivots and/or rotates around a joint or axle near the 315-degree coordinate (e.g. where "near" can be defined as between the 300-degree and 330-degree coordinates). In this example, the first display faces away from the wrist and/or arm in the first configuration and faces toward the wrist and/or arm in the second configuration. In this example, the second display faces toward the wrist and/or arm in the first configuration and faces away from the wrist and/or arm in the second configuration.

In an example, this wrist-worn device can be the integrated combination of a smart watch and its band. In an example, this wrist-worn device can comprise the combination of a modular watch enclosure and a modular watch band, wherein the modular watch enclosure can be used with other watch bands and the modular watch band can be used with other watch enclosures. In other examples, a wrist worn device can be a bracelet, a wrist band, a fitness band, a cuff, or a sleeve. Relevant variations discussed elsewhere in the disclosure or in priority-linked disclosures can also be applied to this example.

Figure 10:
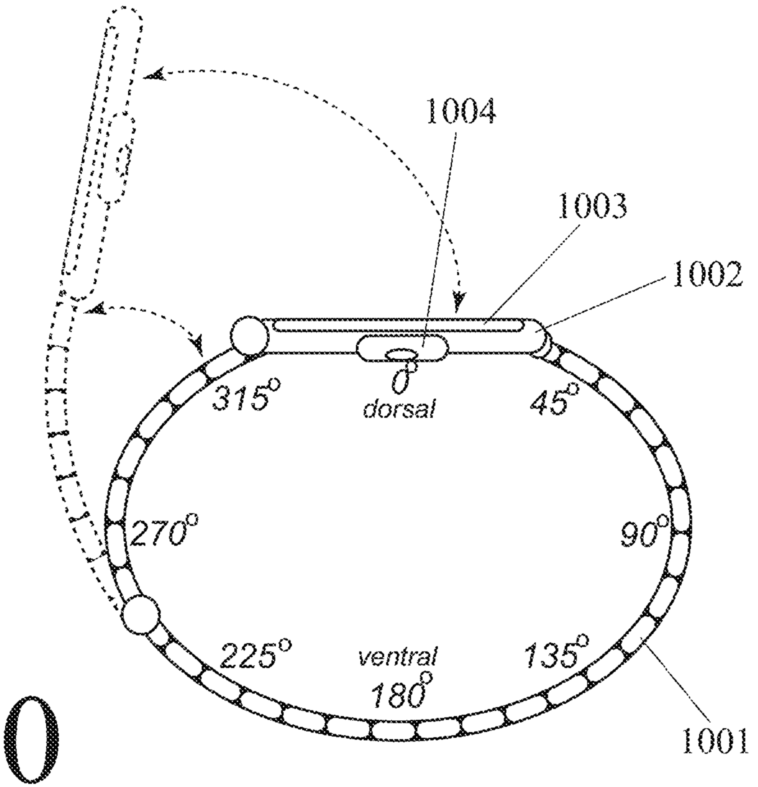
FIG. 10 shows a cross-sectional view of a wrist-worn device (e.g. smart watch) with a display and camera on an outward-pivoting arcuate section.

FIG. 10 shows a lateral view of a wrist-worn device (e.g. smart watch) with a camera comprising: an arcuate band (e.g. watch band) 1001 which is worn around at least two-thirds of the circumference of a person's wrist and/or arm; an enclosure 1002 (e.g. watch housing) on the band; a display 1003 on a first side of the enclosure; and a camera 1004 on a second side (e.g. opposite the first side) of the enclosure, wherein images recorded by the camera are shown on the display; wherein the device has a first configuration in which the center of the enclosure is a first distance from the circumference of the wrist and/or arm, wherein the device has a second configuration in which the center of the enclosure is a second distance from the circumference of the wrist and/or arm, wherein the second distance is greater than (e.g. at least twice) the first distance, and wherein the enclosure is changed from the first configuration to the second configuration by being pivoted out from the circumference of the wrist and/or arm.

In an example, in addition to the enclosure pivoting out from the circumference of the wrist and/or arm in the second configuration, a portion of the band to which the enclosure is attached can be pivoted out from the circumference of the wrist and/or arm in the second configuration. In this example, the enclosure is located between the 315-degree and 45-degree coordinates in the first configuration. In this example, a portion of the band which pivots out from the circumference of the wrist and/or arm in the second configuration is between the 225-degree and 0-degree coordinates. In an example, an end of the enclosure can be reversibly-detached from an end of the band in order to pivot the enclosure outward from the first configuration to the second configuration. Relevant variations discussed elsewhere in the disclosure or in priority-linked disclosures can also be applied to this example.

Figure 11:
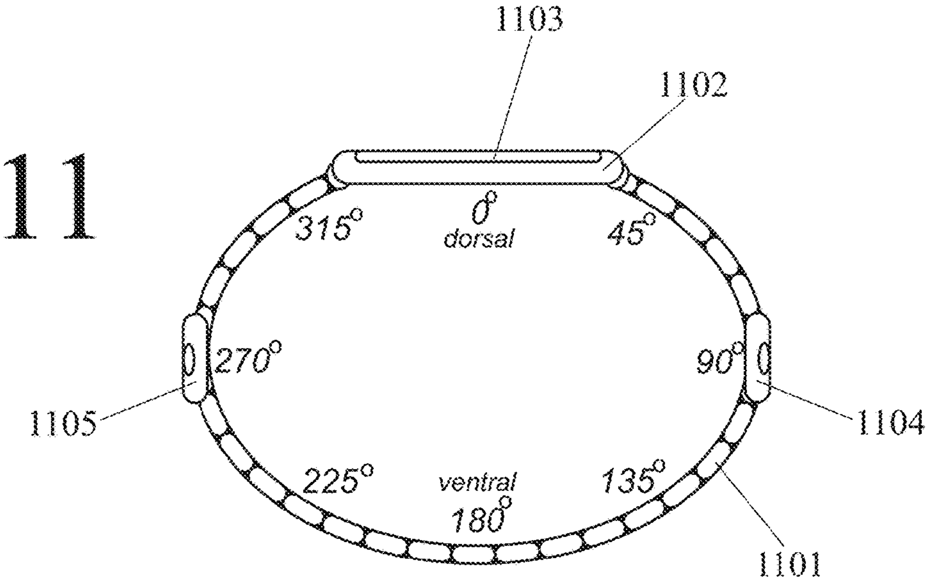
FIG. 11 shows a cross-sectional view of a wrist-worn device (e.g. smart watch) with a dorsal display, a first lateral camera, and a second lateral camera.

FIG. 11 shows a lateral view of a wrist-worn device (e.g. smart watch) with a camera comprising: an arcuate band (e.g. watch band) 1101 which is worn around at least two-thirds of the circumference of a person's wrist and/or arm; an enclosure (e.g. watch housing) 1102 which is held on the dorsal side of the person's wrist and/or arm by the band; a display (e.g. watch display) 1103 on the enclosure;

a first camera 1104 which is held between the dorsal and ventral sides of the person's wrist and/or arm by the band; and a second camera 1105 which is held between the dorsal and ventral sides of the person's wrist and/or arm, on the opposite side of the wrist and/or arm from the first camera, by the band. In this example, the enclosure and display are between the 315-degree and 45-degree coordinates. In this example, the first camera is between the 45-degree and 135-degree coordinates. In this example, the second camera is between the 225-degree and 315-degree coordinates.

In an example, this wrist-worn device can be the integrated combination of a smart watch and its band. In an example, this wrist-worn device can comprise the combination of a modular watch enclosure and a modular band, wherein the modular watch enclosure can be used with other bands and the modular band can be used with other watch enclosures. In other examples, a wrist worn device can be a bracelet, a wrist band, a fitness band, a cuff, or a sleeve.

In an example, a wrist-worn device can be a modular watch band with a ventral-side camera which is in electronic communication with a smart watch enclosure, wherein the enclosure is selected from among different types and/or brands of smart watch enclosures. In an example, a modular smart watch band with a camera can comprise: a band which is worn around at least two-thirds of the circumference of a person's wrist and/or arm, wherein the band holds a watch enclosure with a display on the dorsal side of the person's wrist and/or arm; and a camera on the band on the ventral side of the person's wrist. Relevant variations discussed elsewhere in the disclosure or in priority-linked disclosures can also be applied to this example.

Figure 12:
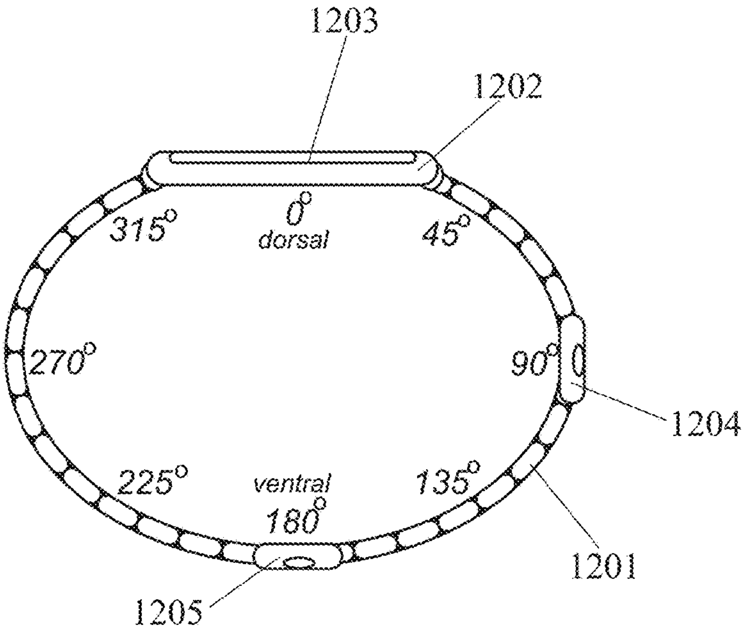
FIG. 12 shows a cross-sectional view of a wrist-worn device (e.g. smart watch) with a dorsal display, a lateral camera, and a ventral camera.

FIG. 12 shows a lateral view of a wrist-worn device (e.g. smart watch) with a camera comprising: an arcuate band (e.g. watch band) 1201 which is worn around at least two-thirds of the circumference of a person's wrist and/or arm; an enclosure (e.g. watch housing) 1202 which is held on the dorsal side of the person's wrist and/or arm by the band; a display (e.g. watch display) 1203 on the enclosure; a first camera 1204 which is held between the dorsal and ventral sides of the person's wrist and/or arm by the band; and a second camera 1205 which is held between on the ventral side of the person's wrist and/or arm by the band. In this example, the enclosure and display are between the 315-degree and 45-degree coordinates. In this example, the first camera is between the 45-degree and 135-degree coordinates. In this example, the second camera is between the 225-degree and 315-degree coordinates.

In an example, this wrist-worn device can be the integrated combination of a smart watch and its band. In an example, this wrist-worn device can comprise the combination of a modular watch enclosure and a modular band, wherein the modular watch enclosure can be used with other bands and the modular band can be used with other watch enclosures. In other examples, a wrist worn device can be a bracelet, a wrist band, a fitness band, a cuff, or a sleeve.

In an example, a wrist-worn device can be a modular watch band with a ventral-side camera which is in electronic communication with a smart watch enclosure, wherein the enclosure is selected from among different types and/or brands of smart watch enclosures. In an example, a modular smart watch band with a camera can comprise: a band which is worn around at least two-thirds of the circumference of a person's wrist and/or arm, wherein the band holds a watch enclosure with a display on the dorsal side of the person's wrist and/or arm; and a camera on the band on the ventral side of the person's wrist. Relevant variations discussed elsewhere in the disclosure or in priority-linked disclosures can also be applied to this example.

Figure 13:
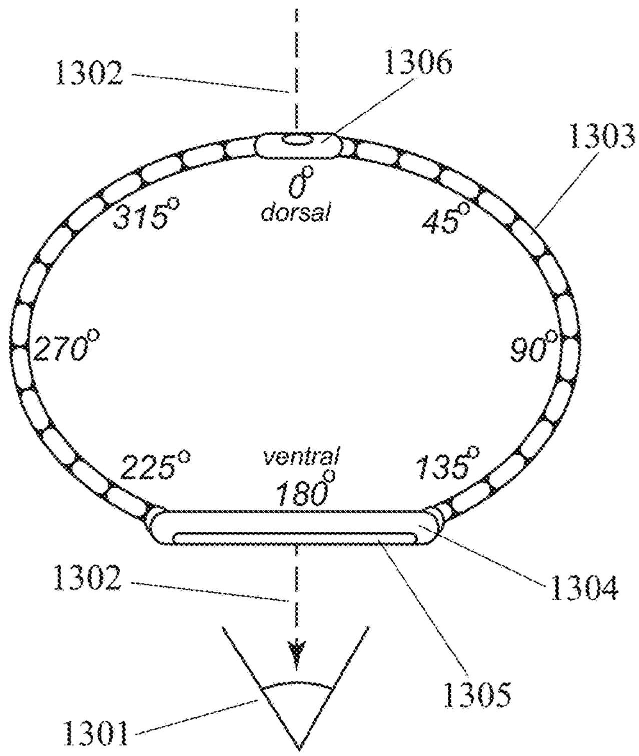
FIG. 13 shows a cross-sectional view of a wrist-worn device (e.g. smart watch) with a ventral display and a dorsal camera.

FIG. 13 shows a lateral view of a wrist-worn device (e.g. smart watch) with a camera comprising: an arcuate band (e.g. watch band) 1303 which is worn around at least two-thirds of the circumference of a person's wrist and/or arm; an enclosure (e.g. watch housing) 1304 which is held on the ventral side of the person's wrist and/or arm by the band; a display (e.g. watch display) 1305 on the enclosure; and a camera 1306 which is held on the dorsal side of the person's wrist and/or arm by the band. FIG. 13 also shows a digitally-transmitted line of sight 1302 between the person's eye 1301 and the environment, wherein this digitally-transmitted line of sight is transmitted via the camera 1306 which records images of the environment and the display 1305 which displays these images to the person's eye. In an example, images from the camera can also be shown on a wirelessly-connected separate device such as a phone or augmented reality eyewear. In this example, the enclosure and display are between the 135-degree and 225-degree coordinates. In this example, the camera is between the 315-degree and 45-degree coordinates.

In an example, this wrist-worn device can be the integrated combination of a smart watch and its band. In an example, this wrist-worn device can comprise the combination of a modular watch enclosure and a modular band, wherein the modular watch enclosure can be used with other bands and the modular band can be used with other watch enclosures. In other examples, a wrist worn device can be a bracelet, a wrist band, a fitness band, a cuff, or a sleeve.

In an example, a wrist-worn device can be a modular watch band with a ventral-side camera which is in electronic communication with a smart watch enclosure, wherein the enclosure is selected from among different types and/or brands of smart watch enclosures. In an example, a modular smart watch band with a camera can comprise: a band which is worn around at least two-thirds of the circumference of a person's wrist and/or arm, wherein the band holds a watch enclosure with a display on the dorsal side of the person's wrist and/or arm; and a camera on the band on the ventral side of the person's wrist. Relevant variations discussed elsewhere in the disclosure or in priority-linked disclosures can also be applied to this example.

Figure 14:
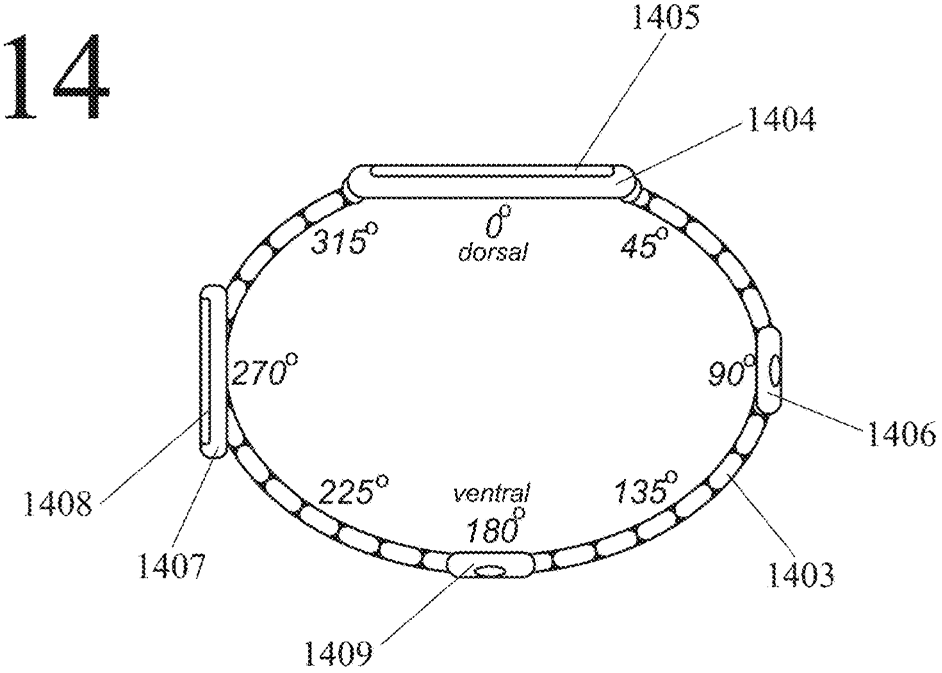
FIG. 14 shows a cross-sectional view of a wrist-worn device (e.g. smart watch) with a dorsal first display, a lateral second display, a lateral camera, and a ventral camera.

FIG. 14 shows a lateral view of a wrist-worn device with a camera comprising: an arcuate band 1401 which is worn around at least two-thirds of the circumference of a person's wrist and/or arm; a first enclosure 1402 which is held on the dorsal side of the person's wrist and/or arm by the band; a first display 1403 on the first enclosure; a first camera 1407 which is held on the ventral side of the person's wrist and/or arm by the band; a second enclosure 1405 which is held between the dorsal and ventral sides of the person's wrist and/or arm by the band; a second display 1406 on the second enclosure; and a second camera 1404 which is held between the dorsal and ventral sides of the person's wrist and/or arm by the band, opposite the second enclosure.

In this example, the first enclosure and first display are between the 315-degree and 45-degree coordinates. In this example, the first camera is between the 135-degree and 225-degree coordinates. In this example, the second enclosure and second display are between the 225-degree and 315-degree coordinates. In this example, the second camera is between the 45-degree and 135-degree coordinates.

In an example, this wrist-worn device can be the integrated combination of a smart watch and its band. In an example, this wrist-worn device can comprise the combination of a modular watch enclosure and a modular band, wherein the modular watch enclosure can be used with other bands and the modular band can be used with other watch enclosures. In other examples, a wrist worn device can be a bracelet, a wrist band, a fitness band, a cuff, or a sleeve.

In an example, a wrist-worn device can be a modular watch band with a ventral-side camera which is in electronic communication with a smart watch enclosure, wherein the enclosure is selected from among different types and/or brands of smart watch enclosures. In an example, a modular smart watch band with a camera can comprise: a band which is worn around at least two-thirds of the circumference of a person's wrist and/or arm, wherein the band holds a watch enclosure with a display on the dorsal side of the person's wrist and/or arm; and a camera on the band on the ventral side of the person's wrist. Relevant variations discussed elsewhere in the disclosure or in priority-linked disclosures can also be applied to this example.

Figure 15:
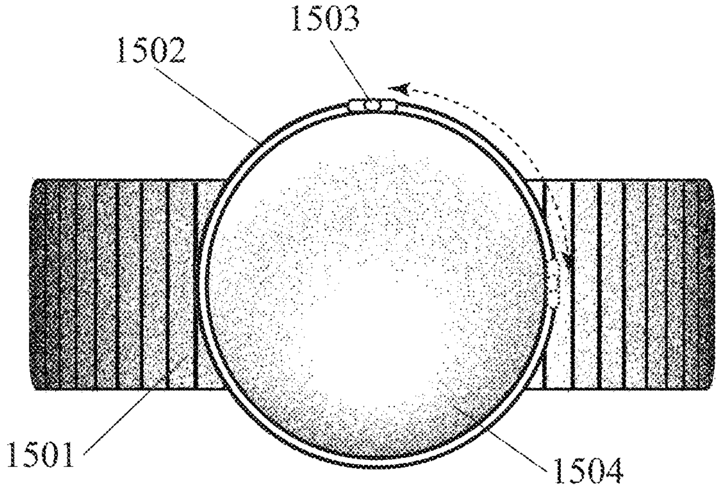
FIG. 15 shows a top-down view of a wrist-worn device (e.g. smart watch) with a moving (e.g. circumferentially-rotating) camera on the rim of a dorsal enclosure.

FIG. 15 shows a top-down view of a wrist-worn device (e.g. smart watch) with a camera comprising: an arcuate band (e.g. watch band) 1501 which is worn around at least two-thirds of the circumference of a person's wrist and/or arm; an enclosure (e.g. watch housing) 1502 which is held on the dorsal side of the person's wrist and/or arm by the band; a display (e.g. watch display) 1504 on the enclosure; and a camera 1503 on a side (e.g. the rim and/or narrow lateral side) of the enclosure, wherein the camera can be moved to point outward in different directions (e.g. along different focal vectors from the center of the enclosure). In an example, the camera can be moved (e.g. slid along) a channel or track around the perimeter of the enclosure. In another example, the camera be on a ring around the enclosure, wherein the camera is moved by rotating the ring relative to the enclosure. In another example, the camera can be moved by rotating the entire enclosure.

In an example, this wrist-worn device can be the integrated combination of a smart watch and its band. In an example, this wrist-worn device can comprise the combination of a modular watch enclosure and a modular band, wherein the modular watch enclosure can be used with other bands and the modular band can be used with other watch enclosures. In other examples, a wrist worn device can be a bracelet, a wrist band, a fitness band, a cuff, or a sleeve. Relevant variations discussed elsewhere in the disclosure or in priority-linked disclosures can also be applied to this example.

Figure 16:
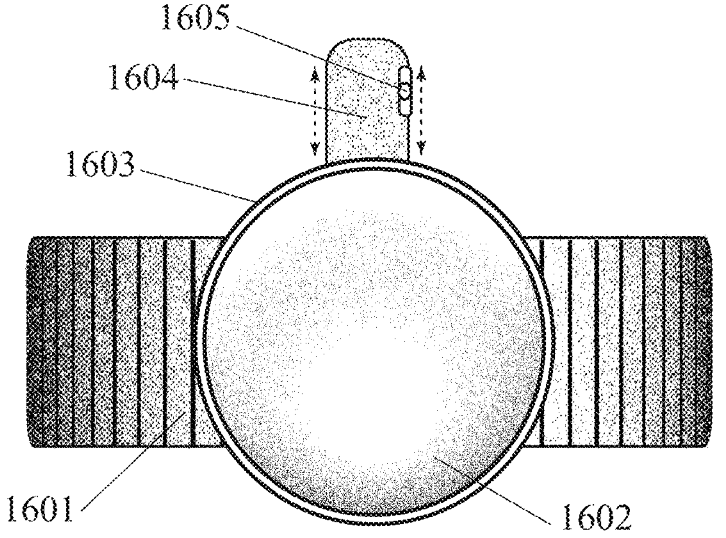
FIG. 16 shows a top-down view of a wrist-worn device (e.g. smart watch) with a camera on a retractable arm which extends out from a dorsal enclosure.

FIG. 16 shows a top-down view of a wrist-worn device (e.g. smart watch) with a camera comprising: an arcuate band (e.g. watch band) 1601 which is worn around at least two-thirds of the circumference of a person's wrist and/or arm; an enclosure (e.g. watch housing) 1603 which is held on the dorsal side of the person's wrist and/or arm by the band; a display (e.g. watch display) 1602 on the enclosure; a movable projection (e.g. arm) 1604, wherein the projection has a first configuration which is retracted into the enclosure and a second configuration which extends out from the enclosure; and a camera 1605 on the movable projection.

In an example, this wrist-worn device can be the integrated combination of a smart watch and its band. In an example, this wrist-worn device can comprise the combination of a modular watch enclosure and a modular band, wherein the modular watch enclosure can be used with other bands and the modular band can be used with other watch enclosures. In other examples, a wrist worn device can be a bracelet, a wrist band, a fitness band, a cuff, or a sleeve. Relevant variations discussed elsewhere in the disclosure or in priority-linked disclosures can also be applied to this example.

Figure 17:
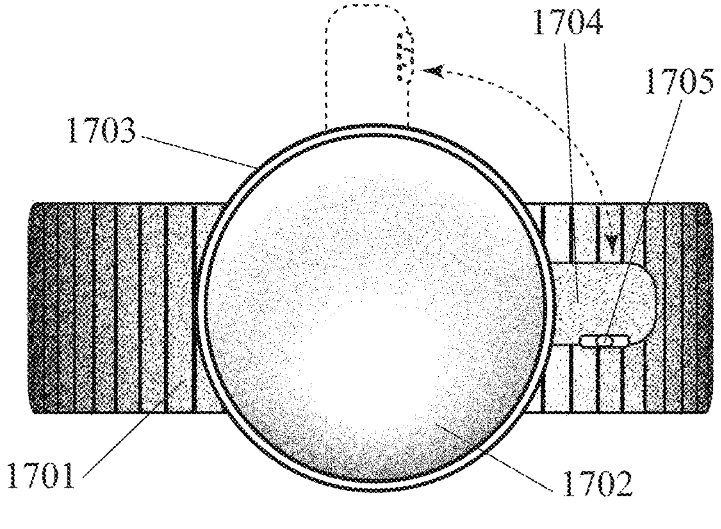
FIG. 17 shows a top-down view of a wrist-worn device (e.g. smart watch) with a camera on a moving (e.g. circumferentially-rotating) arm which extends out from the rim of a dorsal enclosure.

FIG. 17 shows a top-down view of a wrist-worn device (e.g. smart watch) with a camera comprising: an arcuate band (e.g. watch band) 1701 which is worn around at least two-thirds of the circumference of a person's wrist and/or arm; an enclosure (e.g. watch housing) 1703 which is held on the dorsal side of the person's wrist and/or arm by the band; a display (e.g. watch display) 1702 on the enclosure; a movable projection (e.g. arm) 1704 which extends out radially from the enclosure, wherein the projection has a longitudinal axis, wherein the projection has a first configuration in which the longitudinal axis is orthogonal to a central plane of the circumference of the band, and wherein the project has a second configuration in which the longitudinal axis is parallel to the central plane of the circumference of the band; and a camera 1705 on the projection.

In an example, this wrist-worn device can be the integrated combination of a smart watch and its band. In an example, this wrist-worn device can comprise the combination of a modular watch enclosure and a modular band, wherein the modular watch enclosure can be used with other bands and the modular band can be used with other watch enclosures. In other examples, a wrist worn device can be a bracelet, a wrist band, a fitness band, a cuff, or a sleeve. Relevant variations discussed elsewhere in the disclosure or in priority-linked disclosures can also be applied to this example.

Figure 18:
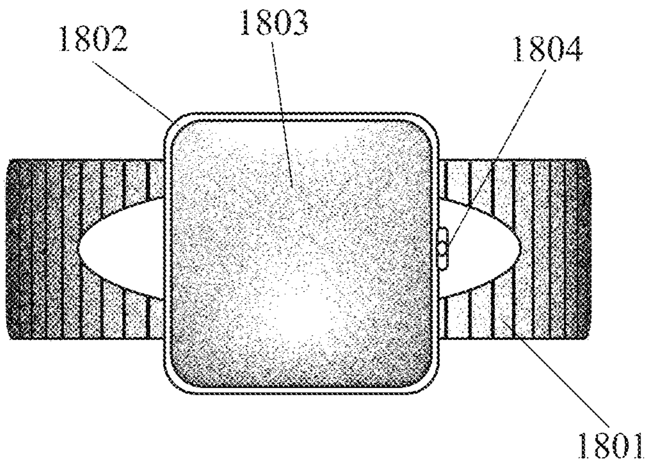
FIGS. 18 through 20 show top-down, side, and cross-sectional views of a wrist-worn device (e.g. smart watch) with a camera on the rim of a dorsal enclosure and a bifurcating band.
Figure 19:
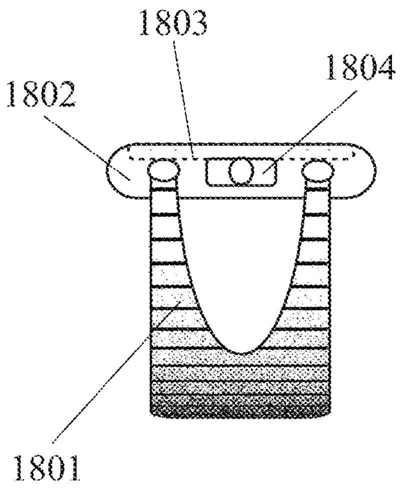
Figure 20:
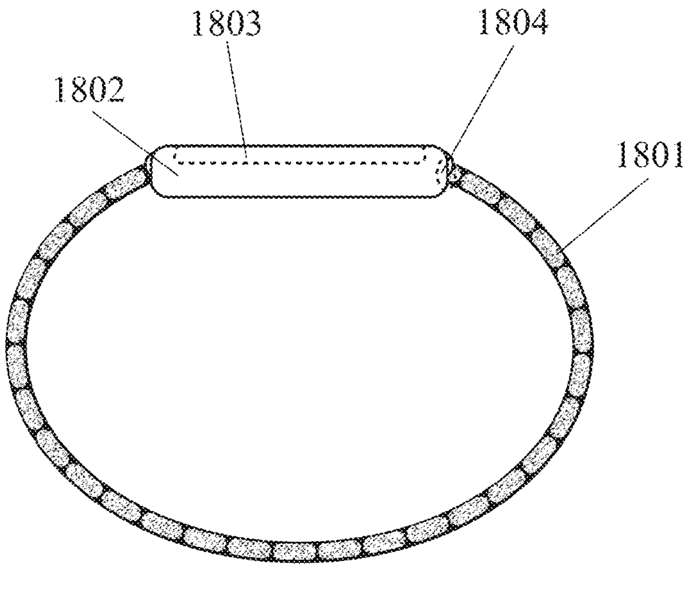

FIGS. 18 through 20 show three views, from three different perspectives, of a wrist-worn device (e.g. smart watch) with a camera comprising: a bifurcating band 1801 which is worn on a person's wrist and/or arm; an enclosure 1802 on the band, wherein portions of the band which connect to the enclosure bifurcate, thereby creating a gap, opening, and/or hole in the portions of the band which are connected to the enclosure; a display 1803 on the enclosure; and a camera 1804 on the rim (e.g. narrow perimeter) of the enclosure. FIG. 18 shows this device from a top-down perspective. FIG. 19 shows this device from a right (or left) side perspective. FIG. 20 shows this device from a proximal-to-distal (or distal-to-proximal) side perspective.

In this example, the bifurcating branches of the band near the enclosure are symmetric with respect to the plane of the central (with respect to width) circumference of the band. In this example, the camera is located on this plane. This enables the enclosure to have low profile (e.g. not stick out very far from the band) without having the band obscure the central focal vector of a camera on the rim of the enclosure. In an example, the thickness of the enclosure can be less than twice the thickness of the band. In this example, the gap, opening, and/or hole in the band which is created by the bifurcation is between 50% and 90% of the width of the band. In this example, this gap, opening, and/or hole is arcuate (e.g. with a conic section shape). In an example, the gap, opening, and/or hole can have a half elliptical shape or parabolic shape. Relevant variations discussed elsewhere in the disclosure or in priority-linked disclosures can also be applied to this example.

Figure 21:
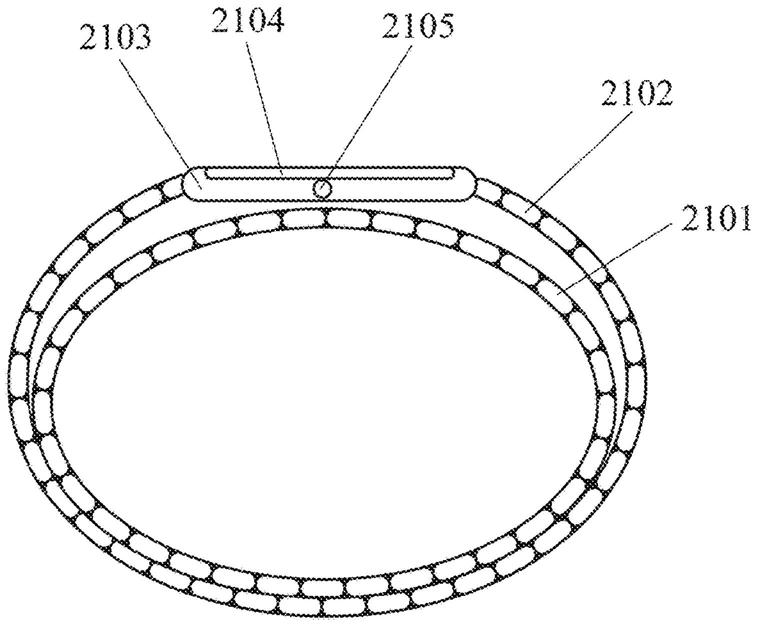
FIGS. 21 and 22 show cross-sectional views of a wrist-worn device (e.g. smart watch) with an inner band, an outer band, and a pivoting dorsal enclosure with a display and camera on the outer band.
Figure 22:
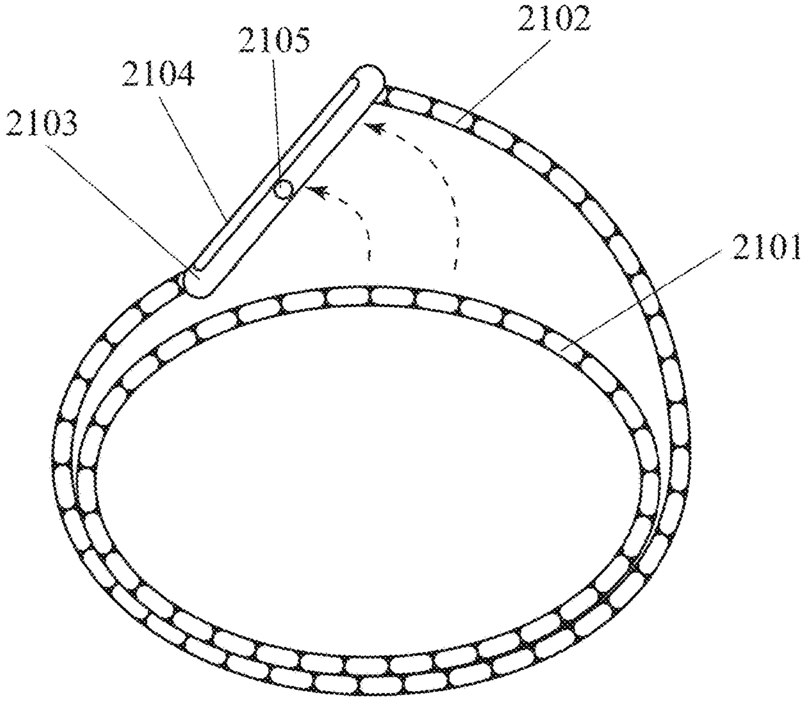

FIGS. 21 and 22 show side views at two different times of a wrist-worn device (e.g. smart watch) with a camera comprising: an inner band 2101 which is worn on a person's wrist and/or arm; an outer band 2102 which is worn on the person's wrist and/or arm, wherein the inner band is at least partially nested within the circumference of the outer band; an enclosure 2103 on the outer band; a display 2104 on the enclosure; and a camera 2105 on the enclosure, wherein the enclosure can be moved (e.g. pivoted and/or rotated) away from the inner band while remaining connected to the outer band. FIG. 21 shows this device at a first time when the enclosure is retracted along the inner band. FIG. 22 shows this device at a second time when the enclosure extends out (e.g. pivots or rotates away from) the inner band. This design can be advantageous compared to a basic flip-up or pop-up design because the enclosure is less likely to snag on an environmental object and break off when it is extended.

In an example, the outer band can be farther from the surface of the wrist and/or arm than the inner band. In an example, the outer band can be more flexible, elastic, and/or undulating than the inner band. In an example, the device can have a first configuration in which the outer band is connected to the inner band at a first number of locations and a second configuration in which the outer band is connected to the inner band at a second number of locations, wherein the second number is less than the first number. In an example, the enclosure can be contiguous with the inner band in the first configuration and can extend out (e.g. pivot or rotate outward) from the inner band in the second configuration. Relevant variations discussed elsewhere in the disclosure or in priority-linked disclosures can also be applied to this example.

Figure 23:
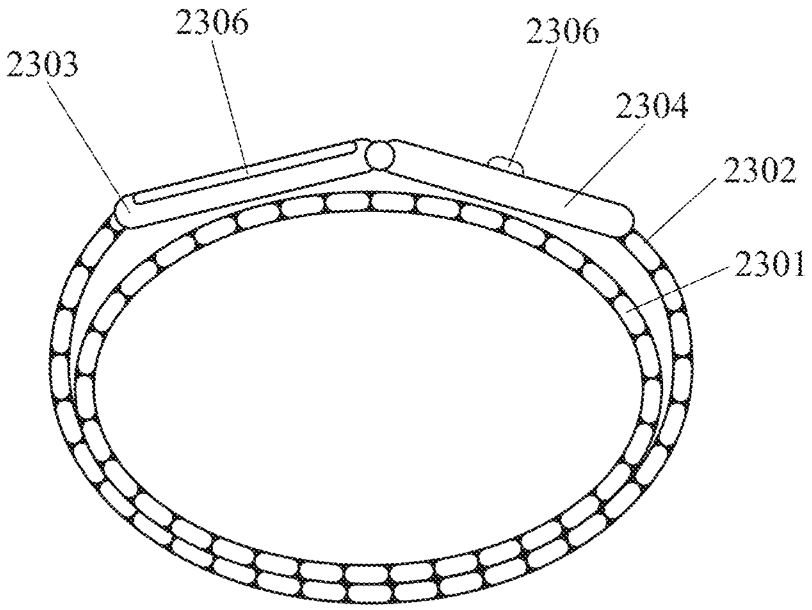
FIGS. 23 and 24 show cross-sectional views of a wrist-worn device (e.g. smart watch) with an inner band, an outer band, and a two-part extendable dorsal enclosure with a display and camera on the outer band.
Figure 24:
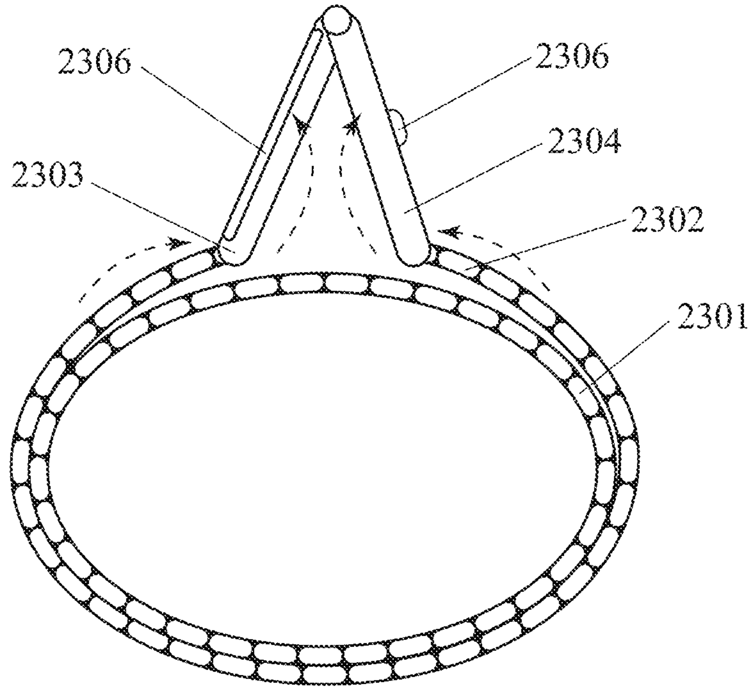

FIGS. 23 and 24 show side views at two different times of a wrist-worn device (e.g. smart watch) with a camera comprising: an inner band 2301 which is worn on a person's wrist and/or arm; an outer band 2302 which is worn on the person's wrist and/or arm, wherein the inner band is at least partially nested within the circumference of the outer band; a first enclosure 2303 on the outer band; a second enclosure on the outer band, wherein the second enclosure is movably-connected to the first enclosure (e.g. by an axle, joint, or hinge); a display 2305 on the first enclosure; and a camera 2306 on the second enclosure, wherein the first and second enclosures can be moved (e.g. pivoted and/or rotated) away from the inner band while remaining connected to the outer band. FIG. 23 shows this device at a first time when the enclosures are retracted along the inner band. FIG. 22 shows this device at a second time when the enclosures extend out (e.g. pivot or rotate away from) the inner band. This design can be advantageous compared to a basic flip-up or pop-up design because the enclosure is less likely to snag on an environmental object and break off when it is extended.

In an example, the outer band can be farther from the surface of the wrist and/or arm than the inner band. In an example, the outer band can be more flexible, elastic, and/or undulating than the inner band. In an example, the device can have a first configuration in which the outer band is connected to the inner band at a first number of locations and a second configuration in which the outer band is connected to the inner band at a second number of locations, wherein the second number is less than the first number. In an example, the enclosures can be contiguous with the inner band in the first configuration and can extend out (e.g. pivot or rotate outward) from the inner band in the second configuration. Relevant variations discussed elsewhere in the disclosure or in priority-linked disclosures can also be applied to this example.

In an example, a wrist-worn device (e.g. smart watch) with a camera can comprise: an arcuate band which is worn on a person's wrist and/or arm; an enclosure which is held on a dorsal side of the person's wrist and/or arm by the band; a display on the enclosure; and a camera which is held on a ventral side of the person's wrist and/or arm by the band. In an example, the device can be a smart watch and the band can be a watch band. In an example, images recorded by the camera cam be shown on the display. In another example, images recorded by the camera can be shown on a display via (augmented reality) eyewear. In an example, the device can further comprise a second camera located between the 45-degree and 135-degree coordinates of the circumference of the wrist and/or arm. In an example, the device can further comprise a second display located between the 225-degree and 315-degree coordinates of the circumference of the wrist and/or arm.

In an example, a wrist-worn device (e.g. smart watch) with a camera can comprise: an arcuate band which is worn on a person's wrist and/or arm; an enclosure which is held on a dorsal side of the person's wrist and/or arm by the band, wherein the enclosure further comprises a first section and a second section, wherein the enclosure has a first configuration in which the center of the second section is a first distance from the band, wherein the enclosure has a second configuration in which the center of the second section is a second distance from the band, and wherein the second distance is greater than the first distance; a display on the second section; and a camera on the second section.

In an example, the second section can flip out, pop out, pivot, and/or rotate away from the band in the second configuration. In an example, in the second section can be recessed within the first section in the first configuration and extend out from the first section in the second configuration. In an example, the second section can have a planoconvex shape. In an example, a straight side of the second section can be connected to the first section by a hinge, axle, or joint. In an example, the second section can unfold and/or unroll in the second configuration.

In an example, the enclosure can further comprise a third section which is connected to the second section, wherein the center of the third section is farther from the band in the second configuration than in the first configuration. In an example, the first section, the second section, and the third section can form a structure with a triangular cross-section in the second configuration. In an example, the plane of the second section and the plane of the third section can be parallel or coplanar in the first configuration and intersect at an angle between 40 degrees and 120 degrees in the second configuration.

In an example, a wrist-worn device (e.g. smart watch) with a camera can comprise: a bifurcating band which is worn on a person's wrist and/or arm; an enclosure, wherein portions of the band which connect to the enclosure bifurcate, thereby creating gaps, openings, and/or holes in the portions of the band which are connected to the enclosure; a display on the enclosure; and a camera on the rim of the enclosure. In an example, bifurcating branches of the band connected to the enclosure can be symmetric with respect to a plane of a central circumference of the band. In an example, the camera can be located on the plane of the central circumference of the band. In an example, the gap, opening, and/or hole can be arcuate. In an example, the gap, opening, and/or hole can have a conic-section shape.

I claim:

1. A wrist-worn device with a camera comprising:

an arcuate band which is worn on a person's wrist and/or arm;

an enclosure which is held on a dorsal side of the person's wrist and/or arm by the band, wherein the enclosure further comprises a first section which is stationary relative to the band; a sliding and pivoting second section; and a pivoting third section; wherein the enclosure has a first configuration in which the first section, the second section, and the third section are substantially parallel to each other; and wherein the enclosure has a second configuration in which the first section, the second section, and the third section form a triangular prism which protrudes out from the band;

a display on the third section; and a camera on the second section.

2. The device in claim 1 wherein a first end of the second section pivots away from the band in the transition to the second configuration.

3. The device in claim 2 wherein a second end of the second section slides along the first section in the transition to the second configuration.

4. The device in claim 2 wherein the first end of the second section is connected to the third section by a hinge, axle, or joint.

5. The device in claim 1 wherein a plane of the second section and a plane of the third section are parallel or coplanar in the first configuration and intersect at an angle between 40 degrees and 120 degrees in the second configuration.

* * * * *